(12) United States Patent
Quan et al.

(10) Patent No.: US 12,435,145 B2
(45) Date of Patent: Oct. 7, 2025

(54) B7-H4 ANTIBODY FORMULATIONS

(71) Applicant: Five Prime Therapeutics, Inc., South San Francisco, CA (US)

(72) Inventors: Yong Quan, South San Francisco, CA (US); Chin-Yi Huang, South San Francisco, CA (US); Harjeet Singh Ganda, South San Francisco, CA (US)

(73) Assignee: Five Prime Therapeutics, Inc., Thousand Oaks, CA (US)

( * ) Notice: Subject to any disclaimer, the term of this patent is extended or adjusted under 35 U.S.C. 154(b) by 1335 days.

(21) Appl. No.: 16/997,577

(22) Filed: Aug. 19, 2020

(65) Prior Publication Data

US 2021/0070861 A1 Mar. 11, 2021

Related U.S. Application Data

(63) Continuation of application No. PCT/US2019/018965, filed on Feb. 21, 2019.

(60) Provisional application No. 62/633,537, filed on Feb. 21, 2018.

(51) Int. Cl.
| | |
|---|---|
| *C07K 16/28* | (2006.01) |
| *A61K 39/00* | (2006.01) |
| *A61K 47/02* | (2006.01) |
| *A61K 47/12* | (2006.01) |
| *A61K 47/22* | (2006.01) |
| *A61K 47/26* | (2006.01) |

(52) U.S. Cl.
CPC .......... *C07K 16/2827* (2013.01); *A61K 47/02* (2013.01); *A61K 47/12* (2013.01); *A61K 47/22* (2013.01); *A61K 47/26* (2013.01); *A61K 2039/505* (2013.01); *C07K 2317/51* (2013.01); *C07K 2317/515* (2013.01); *C07K 2317/565* (2013.01); *C07K 2317/94* (2013.01)

(58) Field of Classification Search
CPC .......... C07K 16/2827; A61K 2039/505; A61K 39/395
See application file for complete search history.

(56) References Cited

U.S. PATENT DOCUMENTS

| | | | |
|---|---|---|---|
| 3,817,837 A | 6/1974 | Rubenstein | |
| 3,850,752 A | 11/1974 | Schuurs | |
| 3,939,350 A | 2/1976 | Kronick | |
| 3,996,345 A | 12/1976 | Ullman | |
| 4,275,149 A | 6/1981 | Litman | |
| 4,277,437 A | 7/1981 | Maggio | |
| 4,366,241 A | 12/1982 | Tom | |
| 4,472,509 A | 9/1984 | Gansow | |
| 4,938,948 A | 7/1990 | Ring | |
| 5,122,464 A | 6/1992 | Wilson | |
| 5,196,066 A | 3/1993 | Kusuda | |
| 5,223,409 A | 6/1993 | Ladner et al. | |
| 5,225,539 A | 7/1993 | Winter | |
| 5,403,484 A | 4/1995 | Ladner | |
| 5,427,908 A | 6/1995 | Dower | |
| 5,516,637 A | 5/1996 | Huang | |
| 5,571,698 A | 11/1996 | Ladner | |
| 5,580,717 A | 12/1996 | Dower | |
| 5,585,097 A | 12/1996 | Bolt | |
| 5,624,821 A | 4/1997 | Winter | |
| 5,648,260 A | 7/1997 | Winter | |
| 5,658,727 A | 8/1997 | Barbas | |
| 5,672,694 A | 9/1997 | Campbell et al. | |
| 5,677,425 A | 10/1997 | Bodmer | |
| 5,693,780 A | 12/1997 | Newman | |
| 5,698,426 A | 12/1997 | Huse | |
| 5,733,743 A | 3/1998 | Johnson et al. | |
| 5,750,753 A | 5/1998 | Kimae | |
| 5,780,225 A | 7/1998 | Wigler | |
| 5,807,715 A | 9/1998 | Morrison | |
| 5,821,047 A | 10/1998 | Garrard | |
| 5,869,046 A | 2/1999 | Presta | |
| 5,965,726 A | 10/1999 | Pavlakis | |
| 5,969,108 A | 10/1999 | Mccafferty | |
| 6,121,022 A | 9/2000 | Presta | |
| 6,165,745 A | 12/2000 | Ward | |
| 6,174,666 B1 | 1/2001 | Pavlakis | |
| 6,194,551 B1 | 2/2001 | Idusogie | |
| 6,277,022 B1 | 8/2001 | Melin | |
| 6,291,664 B1 | 9/2001 | Pavlakis | |
| 6,414,132 B1 | 7/2002 | Pavlakis | |
| 6,602,684 B1 | 8/2003 | Umana | |

(Continued)

FOREIGN PATENT DOCUMENTS

| | | |
|---|---|---|
| CN | 104945508 A | 9/2015 |
| CN | 107405401 A | 11/2017 |

(Continued)

OTHER PUBLICATIONS

Goswami et al. Antibodies 2013, 2, 452-500 (Year: 2013).*
Chang, B.S. and Hershenson, S. 2002. Practical approaches to protein formulation development in "Rationale Design of stable protein formulations—theory and practice" (J.F. Carpenter and M.C. Manning eds.) Kluwer Academic/Plenum publishers, New York. pp. 1-25. (Year: 2002).*
Abdiche et al., Exploring blocking assays using octet, prote on, and biacore biosensors, Analytical Biochem., 386(2):172-180 (2009).

(Continued)

*Primary Examiner* — Vanessa L. Ford
*Assistant Examiner* — Sandra Carter
(74) *Attorney, Agent, or Firm* — MARSHALL, GERSTEIN & BORUN LLP

(57) ABSTRACT

The present disclosure provides pharmaceutical compositions comprising antibodies and antigen-binding fragments thereof that specifically bind to human B7-H4 (and optionally cynomolgus monkey, mouse, and/or rat B7-H4). The present disclosure also prides methods for treating disorders, such as cancer, by administering such pharmaceutical compositions.

19 Claims, 15 Drawing Sheets

Specification includes a Sequence Listing.

(56) References Cited

U.S. PATENT DOCUMENTS

| | | |
|---|---|---|
| 6,737,056 B1 | 5/2004 | Presta |
| 6,794,498 B2 | 9/2004 | Pavlakis |
| 6,891,030 B2 | 5/2005 | Chen |
| 6,946,292 B2 | 9/2005 | Kanda |
| 7,214,775 B2 | 5/2007 | Hanai |
| 7,304,149 B2 | 12/2007 | Murphy |
| 7,504,256 B1 | 3/2009 | Ogawa |
| 7,619,068 B2 | 11/2009 | Pilkington |
| 7,622,565 B2 | 11/2009 | Chen |
| 7,658,921 B2 | 2/2010 | Dall Acqua |
| 7,687,061 B2 | 3/2010 | Hanai |
| 7,709,226 B2 | 5/2010 | Foote |
| 7,875,702 B2 | 1/2011 | Chen |
| 7,888,477 B2 | 2/2011 | Bangur |
| 7,931,896 B2 | 4/2011 | Chen |
| 7,964,195 B2 | 6/2011 | Papkoff |
| 8,129,347 B2 | 3/2012 | Chen |
| 8,182,813 B2 | 5/2012 | Brasel |
| 8,206,715 B2 | 6/2012 | Wong |
| 8,236,767 B2 | 8/2012 | Chen |
| 8,263,079 B2 | 9/2012 | Doody |
| 8,323,645 B2 | 12/2012 | Veiby |
| 8,444,971 B2 | 5/2013 | Papkoff |
| 8,513,199 B2 | 8/2013 | Brasel |
| 8,591,886 B2 | 11/2013 | Ponath |
| 8,609,816 B2 | 12/2013 | Korman |
| 8,652,465 B2 | 2/2014 | Freeman |
| 8,703,916 B2 | 4/2014 | Chen |
| 8,759,490 B2 | 6/2014 | Veiby |
| 8,906,369 B2 | 12/2014 | Papkoff |
| 9,005,616 B2 | 4/2015 | Langermann |
| 9,011,853 B2 | 4/2015 | Langermann |
| 9,121,853 B2 | 9/2015 | Kwon |
| 9,221,910 B2 | 12/2015 | Fertig |
| 9,279,008 B2 | 3/2016 | Scholler |
| 9,296,822 B2 | 3/2016 | Korman |
| 9,421,277 B2 | 8/2016 | Veiby |
| 9,422,351 B2 | 8/2016 | Scholler |
| 9,447,186 B2 | 9/2016 | Zang |
| 9,555,124 B2 | 1/2017 | Chen |
| 9,562,099 B2 | 2/2017 | Leong |
| 9,574,000 B2 | 2/2017 | Langermann |
| 9,676,854 B2 | 6/2017 | Liu |
| 9,926,378 B2 | 3/2018 | Veiby |
| 9,957,312 B2 | 5/2018 | Langermann |
| 10,059,768 B2 | 8/2018 | Leong |
| 11,306,144 B2 | 4/2022 | Kaplan et al. |
| 2003/0055224 A1 | 3/2003 | Gao |
| 2003/0060612 A1 | 3/2003 | Goddard |
| 2003/0165504 A1 | 9/2003 | Retter |
| 2003/0181692 A1 | 9/2003 | Ni |
| 2003/0208058 A1 | 11/2003 | Fiscella |
| 2004/0014194 A1 | 1/2004 | Beyer |
| 2004/0126807 A1 | 7/2004 | Goddard |
| 2005/0163772 A1 | 7/2005 | Dong |
| 2006/0088523 A1* | 4/2006 | Andya .......... A61K 47/26 424/133.1 |
| 2006/0223077 A1 | 10/2006 | Ni |
| 2006/0253928 A1 | 11/2006 | Bakker |
| 2007/0036783 A1 | 2/2007 | Humeau |
| 2007/0178551 A1 | 8/2007 | Gerngross |
| 2007/0218032 A1 | 9/2007 | Kwon |
| 2007/0248600 A1 | 10/2007 | Hansen |
| 2008/0050370 A1 | 2/2008 | Glaser |
| 2008/0060092 A1 | 3/2008 | Dickey |
| 2008/0206235 A1 | 8/2008 | Chen |
| 2009/0005301 A1 | 1/2009 | Ni |
| 2009/0118175 A1 | 5/2009 | Macina |
| 2009/0176317 A1 | 7/2009 | Kwon |
| 2009/0226530 A1* | 9/2009 | Lassner .......... A61P 25/04 424/490 |
| 2011/0020325 A1 | 1/2011 | Kwon |
| 2011/0085970 A1 | 4/2011 | Terrett |
| 2012/0014947 A1 | 1/2012 | Fu |
| 2013/0078234 A1 | 3/2013 | Takahashi |
| 2013/0108651 A1 | 5/2013 | Carven et al. |
| 2014/0037551 A1 | 2/2014 | Zang et al. |
| 2014/0294861 A1 | 10/2014 | Scholler et al. |
| 2014/0322129 A1 | 10/2014 | Leong |
| 2014/0335541 A1 | 11/2014 | Kwon |
| 2014/0356364 A1 | 12/2014 | Liu et al. |
| 2014/0364585 A1 | 12/2014 | Zhang |
| 2015/0315275 A1 | 11/2015 | Liu et al. |
| 2016/0017040 A1 | 1/2016 | Leong |
| 2016/0146806 A1 | 5/2016 | Langermann |
| 2016/0159910 A1 | 6/2016 | Leong |
| 2016/0185870 A1 | 6/2016 | Van Eenennaam |
| 2016/0304581 A1 | 10/2016 | Zang |
| 2016/0304607 A1 | 10/2016 | Sadineni |
| 2017/0015758 A1 | 1/2017 | Hammond |
| 2017/0029525 A1 | 2/2017 | Zang |
| 2017/0044259 A1 | 2/2017 | Tipton et al. |
| 2017/0044268 A1 | 2/2017 | Gurney |
| 2017/0143827 A1 | 5/2017 | Sadineni |
| 2017/0158771 A1 | 6/2017 | Glennie |
| 2017/0204185 A1 | 7/2017 | Chen |
| 2017/0233808 A1 | 8/2017 | Haining |
| 2017/0334999 A1 | 11/2017 | Sathyanarayanan |
| 2018/0106862 A1 | 4/2018 | Whetsel |
| 2018/0106864 A1 | 4/2018 | Moeneclaey |
| 2018/0118831 A1 | 5/2018 | Epstein |
| 2018/0186878 A1 | 7/2018 | Rosenthal |
| 2018/0244781 A1 | 8/2018 | Cuillerot et al. |
| 2019/0085080 A1 | 3/2019 | Kaplan |
| 2020/0081497 A1 | 3/2020 | Hung et al. |
| 2020/0255528 A1 | 8/2020 | Kaplan |
| 2021/0070862 A1 | 3/2021 | Inamdar et al. |
| 2021/0079096 A1 | 3/2021 | Kaplan et al. |
| 2021/0332137 A1 | 10/2021 | Inamdar et al. |
| 2024/0043542 A1 | 2/2024 | Kaplan et al. |

FOREIGN PATENT DOCUMENTS

| | | |
|---|---|---|
| CN | 111094352 A | 5/2020 |
| CN | 111868089 A | 10/2020 |
| EA | 201890285 A1 | 8/2018 |
| EP | 1331266 A1 | 7/2003 |
| WO | 198605807 A1 | 10/1986 |
| WO | 198901036 A1 | 2/1989 |
| WO | 199002809 A1 | 3/1990 |
| WO | 199110737 A1 | 7/1991 |
| WO | 199201047 A1 | 1/1992 |
| WO | 199218619 A1 | 10/1992 |
| WO | 199311236 A1 | 6/1993 |
| WO | 199429351 A2 | 12/1994 |
| WO | 199429351 A3 | 2/1995 |
| WO | 199515982 A2 | 6/1995 |
| WO | 199520401 A1 | 8/1995 |
| WO | 199515982 A3 | 12/1995 |
| WO | 199713844 A1 | 4/1997 |
| WO | 199734631 A1 | 9/1997 |
| WO | 199823289 A1 | 6/1998 |
| WO | 199954342 A1 | 10/1999 |
| WO | 200036107 A2 | 6/2000 |
| WO | 200042072 A2 | 7/2000 |
| WO | 200061739 A1 | 10/2000 |
| WO | 200042072 A3 | 11/2000 |
| WO | 200036107 A3 | 2/2001 |
| WO | 200129246 A1 | 4/2001 |
| WO | 200140269 A2 | 6/2001 |
| WO | 200162891 A2 | 8/2001 |
| WO | 200140269 A3 | 12/2001 |
| WO | 200202587 A1 | 1/2002 |
| WO | 200206317 A2 | 1/2002 |
| WO | 200210187 A1 | 2/2002 |
| WO | 200216581 A2 | 2/2002 |
| WO | 200230954 A1 | 4/2002 |
| WO | 200231140 A1 | 4/2002 |
| WO | 2002060919 A2 | 8/2002 |
| WO | 2002060919 A3 | 8/2002 |
| WO | 2002062203 A2 | 8/2002 |
| WO | 2002071928 A2 | 9/2002 |
| WO | 200216581 A3 | 1/2003 |
| WO | 2003004989 A2 | 1/2003 |

(56) References Cited

FOREIGN PATENT DOCUMENTS

| | | | |
|---|---|---|---|
| WO | 2002062203 A3 | 2/2003 |
| WO | 2003011878 A2 | 2/2003 |
| WO | 2002071928 A3 | 3/2003 |
| WO | 2003004989 A3 | 3/2003 |
| WO | 200162891 A3 | 7/2003 |
| WO | 200206317 A3 | 7/2003 |
| WO | 2003076579 A2 | 9/2003 |
| WO | 2003011878 A3 | 11/2003 |
| WO | 2003097802 A2 | 11/2003 |
| WO | 2003097803 A2 | 11/2003 |
| WO | 2003101400 A2 | 12/2003 |
| WO | 2003104399 A2 | 12/2003 |
| WO | 2003104438 A2 | 12/2003 |
| WO | 2004000221 A2 | 12/2003 |
| WO | 2004000221 A3 | 7/2004 |
| WO | 2004058167 A2 | 7/2004 |
| WO | 2004065540 A2 | 8/2004 |
| WO | 2003076579 A3 | 9/2004 |
| WO | 2004101756 A2 | 11/2004 |
| WO | 2003097802 A3 | 12/2004 |
| WO | 2004113500 A2 | 12/2004 |
| WO | 2004058167 A3 | 1/2005 |
| WO | 2004065540 A3 | 3/2005 |
| WO | 2005035724 A2 | 4/2005 |
| WO | 2004101756 A3 | 6/2005 |
| WO | 2005051990 A2 | 6/2005 |
| WO | 2005052121 A2 | 6/2005 |
| WO | 2003104438 A3 | 7/2005 |
| WO | 2005062788 A2 | 7/2005 |
| WO | 2004113500 A3 | 8/2005 |
| WO | 2005051990 A3 | 8/2005 |
| WO | 2003101400 A3 | 9/2005 |
| WO | 2003104399 A3 | 9/2005 |
| WO | 2003097803 A3 | 5/2006 |
| WO | 2006053110 A2 | 5/2006 |
| WO | 2005035724 A3 | 6/2006 |
| WO | 2005052121 A3 | 6/2006 |
| WO | 2006074418 A2 | 7/2006 |
| WO | 2006098887 A2 | 9/2006 |
| WO | 2005062788 A3 | 10/2006 |
| WO | 2006104677 A2 | 10/2006 |
| WO | 2006105021 A2 | 10/2006 |
| WO | 2006104677 A3 | 11/2006 |
| WO | 2006121991 A2 | 11/2006 |
| WO | 2006133396 A2 | 12/2006 |
| WO | 2007001459 A2 | 1/2007 |
| WO | 2007005874 A2 | 1/2007 |
| WO | 2006053110 A3 | 3/2007 |
| WO | 2006105021 A3 | 3/2007 |
| WO | 2006074418 A3 | 4/2007 |
| WO | 2006121991 A3 | 4/2007 |
| WO | 2007039818 A2 | 4/2007 |
| WO | 2007067991 A2 | 6/2007 |
| WO | 2007005874 A3 | 7/2007 |
| WO | 2007082154 A2 | 7/2007 |
| WO | 2006098887 A3 | 8/2007 |
| WO | 2006133396 A3 | 8/2007 |
| WO | 2007039818 A3 | 8/2007 |
| WO | 2007067991 A3 | 9/2007 |
| WO | 2007001459 A3 | 10/2007 |
| WO | 2008067283 A2 | 6/2008 |
| WO | 2008071447 A2 | 6/2008 |
| WO | 2008083228 A2 | 7/2008 |
| WO | 2008083239 A2 | 7/2008 |
| WO | 2008083239 A3 | 8/2008 |
| WO | 2008067283 A3 | 10/2008 |
| WO | 2007082154 A3 | 11/2008 |
| WO | 2008083228 A3 | 11/2008 |
| WO | 2008/156712 A1 | 12/2008 |
| WO | 2008154333 A2 | 12/2008 |
| WO | 2007001459 A8 | 1/2009 |
| WO | 2009009116 A2 | 1/2009 |
| WO | 2009009116 A3 | 3/2009 |
| WO | 2009036379 A2 | 3/2009 |
| WO | 2009073533 A2 | 6/2009 |
| WO | 2009036379 A3 | 8/2009 |
| WO | 2008154333 A3 | 11/2009 |
| WO | 2009073533 A3 | 11/2009 |
| WO | 2010105256 A1 | 9/2010 |
| WO | 2011020024 A2 | 2/2011 |
| WO | 2011028683 A1 | 3/2011 |
| WO | 2011020024 A3 | 6/2011 |
| WO | 2012009568 A2 | 1/2012 |
| WO | 2012009568 A3 | 4/2012 |
| WO | 2012130831 A1 | 10/2012 |
| WO | 2012145493 A1 | 10/2012 |
| WO | 2013025779 A1 | 2/2013 |
| WO | 2013067492 A1 | 5/2013 |
| WO | 2013079174 A1 | 6/2013 |
| WO | 2014100439 A2 | 6/2014 |
| WO | 2014100483 A1 | 6/2014 |
| WO | 2014100823 A1 | 6/2014 |
| WO | 2014100439 A3 | 9/2014 |
| WO | 2014159835 A1 | 10/2014 |
| WO | 2015017600 A1 | 2/2015 |
| WO | 2015031667 A2 | 3/2015 |
| WO | 2015069770 A1 | 5/2015 |
| WO | 2015031667 A3 | 11/2015 |
| WO | 2016040724 A1 | 3/2016 |
| WO | 2016/070001 A1 | 5/2016 |
| WO | 2016/137985 A1 | 9/2016 |
| WO | 2016168771 A2 | 10/2016 |
| WO | 2016168771 A3 | 12/2016 |
| WO | 2016197204 A1 | 12/2016 |
| WO | 2017/011580 A2 | 1/2017 |
| WO | 2017015623 A2 | 1/2017 |
| WO | 2017019846 A1 | 2/2017 |
| WO | 2017015623 A3 | 3/2017 |
| WO | 2017048878 A1 | 3/2017 |
| WO | 2017058754 A1 | 4/2017 |
| WO | 2017079117 A1 | 5/2017 |
| WO | 2017106656 A1 | 6/2017 |
| WO | 2017129790 A1 | 8/2017 |
| WO | 2017147368 A1 | 8/2017 |
| WO | 2017149150 A1 | 9/2017 |
| WO | 2017201502 A1 | 11/2017 |
| WO | 2018049474 A1 | 3/2018 |
| WO | 2018075978 A1 | 4/2018 |
| WO | 2018078145 A1 | 5/2018 |
| WO | 2018098363 A2 | 5/2018 |
| WO | 2018106862 A1 | 6/2018 |
| WO | 2018106864 A1 | 6/2018 |
| WO | 2018098363 A3 | 9/2018 |
| WO | WO-2019040780 A1 * | 2/2019 | ............. A61P 35/00 |
| WO | 2019/165077 A1 | 8/2019 |
| WO | 2019165075 A1 | 8/2019 |
| WO | 2019169212 A1 | 9/2019 |
| WO | 2020081497 A1 | 4/2020 |

OTHER PUBLICATIONS

Al-Lazikani et al., Standard conformations for the canonical structures of immunoglobulins, J. Molec. Biol., 273(4):927-948 (1997).

Arosio, P. et al., Aggregation mechanism of an IgG2 and two IgG1 monoclonal antibodies at low pH: from oligomers to larger aggregates, Pharm Res., 30(3): 641-54 (2013).

Bricogne, [23] Bayesian statistical viewpoint on structure determination: Basic concepts and examples, Meth Enzymol., 276A:361-423 (1997).

Bricogne, Direct phase determination by entropy maximization and likelihood ranking: status report and perspectives, Acta Crystallogr D. Biol. Crystallogr, 49(Pt 1):37-60 (1993).

Caldas et al. Humanization of the anti-CD18 antibody 6.7: an unexpected effect of a framework residue in binding to antigen, Mol. Immunol., 39(15):941-952 (2003).

Casadevall et al., Immunoglobulin isotype influences affinity and specificity, Proceedings of the National Academy of Sciences, 109(31):12272-12273 (2012).

Champe et al., Monoclonal antibodies that block the activity of leukocyte function-associated antigen 1 recognize three discrete epitopes in the inserted domain of CD11a, J. Biol. Chem., 270(3):1388-1394 (1995).

(56) References Cited

OTHER PUBLICATIONS

Chothia et al., Canonical structures for the hypervariable regions of immunoglobulins, J. Mol. Biol., 196(4):901-917 (1987).
Daugherty et al., "Chapter 8: Formulation and delivery issues for monoclonal antibody therapeutics", Curr. Tren. in Mon. Ant. Dev. Man., 103-129 (2010).
Du et al., Molecular Basis of Recognition of Human Osteopontin by 23C3, a Potential Therapeutic Antibody for Treatment of Rheumatoid Arthritis, Journal of Molecular Biology, 382(4):835-842 (2008).
Fan et al., B7—H4 expression is correlated with tumor progression and clinical outcome in urothelial cell carcinoma, Int. J. Clin. Exp. Pathol., 7: 6768-6775 (2014).
Ferrara et al., Modulation of therapeutic antibody effector functions by glycosylation engineering: influence of Golgi enzyme localization domain and co-expression of heterologous beta1, 4-N-acetylglucosaminyltransferase III and Golgi alpha-mannosidase II, Biotechnol. Bioeng., 93:851-861 (2006).
Gennaro et al., Remington: The Science and Practice of Pharmacy, 20th Edition, (2000).
Hyungjun J. et al., Structure and Cancer Immunotherapy of the B7 Family Member B7x, Cell Reports, Elesvier Ind., US vol. 9, Nr3, pp. 1089-1098 (2014).
Imai-Nishiya et al., Double knockdown of alpha1,6-fucosyltransferase (FUT8) and GDP-mannose 4,6-dehydratase (GMD) in antibody-producing cells: a new strategy for generating fully non-fucosylated therapeutic antibodies with enhanced ADCC, BMC Biotechnol., 7:84 (2007).
Jones et al., Replacing the complementarity-determining regions in a human antibody with those from a mouse, Nature, 321:522-525 (1986).
Jun Gong et al., "Development of PD-1 and PDL1 inhibitors as a form of cancer immunotherapy: a comprehensive review of registration trials and future considerations", Journal for Immuno Therapy of Cancer, vol. 6, No. 8, pp. 1-18 (2018).
Kabat et al., Attempts to locate complementarity-determining residues in the variable positions of light and heavy chains, Ann. N.Y. Acad. Sci., 190:382-391 (1971).
Kabat et al., Sequences of Proteins of Immunological Interest, Fifth Edition, U.S. Department of Health and Human Services, (1991).
Kanda et al., Comparison of biological activity among nonfucosylated therapeutic IgG1 antibodies with three different N-linked Fc oligosaccharides: the high-mannose, hybrid, and complex types, Glycobiology, 17:104-118 (2007).
Kaplan et al., FPA 150, a novel B7-H4 therapeutic antibody with checkpoint blockade and ADCC activities, ESMO 2017 congress, Madrid, Spain; Poster, 1 (2017).
Khan et al., Cross-neutralizing anti-HIV-1 human single chain variable fragments(scFvs) against CD4 binding site and N332 glycan identified from a recombinant phage library, Sci. Rep., 7:45163 (2017).
Konitzer et al., Generation of a highly diverse panel of antagonistic chicken monoclonal antibodies against the GIP receptor, mAbs., 9:536-549 (2017).
Krambeck et al., B7-H4 expression in renal cell carcinoma and tumor vasculature: associations with cancer progression and survival, PNAS, 103:10391-10396 (2006).
Kunik et al., Structural Consensus among Antibodies Defines the Antigen Binding Site, PLOS Computational Biology, 8(2):e1002388(2012).
Lee et al., Molecular-level analysis of the serum antibody repertoire in young adults before and after seasonal influenza vaccination, Nature Medicine, 22:1456-1464 (2016).
Lefranc et al., IMGT, the international ImMunoGeneTics database, Nucleic Acids Res., 27:209-212 (1999).
Lefranc, The IMGT unique numbering for Immunoglobulins, t-cell receptors, and Ig-like domains, the Immunologist., 7(4):132-136 (1999).
Liu et al., B7-H4 expression in bladder urothelial carcinoma and immune escape mechanisms, Oncology Letters, 8:2527-2534 (2014).
Longmore et al., Product-identification and substrate-specificity studies of the GDP-L-fucose:2-acetamido-2-deoxy-beta-D-glucoside (FUC goes to Asn-linked GlcNAc) 6-alpha-L-fucosyltransferase in a Golgi-rich fraction from porcine liver, Carbohydr Res., 100:365-92 (1982).
MacCallum et al., Antibody-antigen interactions: contact analysis and binding site topography, J. Mol. Biol., 262(5):732-45 (1996).
Martin A "Protein Sequence and Structure Analysis of Antibody Variable Domains," in Antibody Engineering, Kontermann and Dubel, eds., Chapter 31, pp. 422-439, Springer-Verlag, Berlin (2001).
Niwa et al., Enhanced natural killer cell binding and activation by low-fucose IgG1 antibody results in potent antibody-dependent cellular cytotoxicity induction at lower antigen density, Clinical Cancer Research, 11(6):2327-36 (2005).
Niwa et al., Enhancement of the antibody-dependent cellular cytotoxicity of low-fucose IgG1 Is independent of FcgammaRIIIa functional polymorphism, Clin. Cancer Res., 10:6248-6255 (2004).
Pozsgai, E., et al., ß-Sarcoglycan Gene Transfer Leads to Functional Improvement in a Model of LGMD2E (S61.002), Neurology, 82(10):1-3 (2014).
Presta et al., Engineering therapeutic antibodies for improved function, Biochem Soc. Trans., 30:487-490 (2002).
Raju, Glycosylation Variations with Expression Systems and Their Impact on Biological Activity of Therapeutic Immunoglobulins, BioProcess Int., 1:44-53 (2003).
Riechmann et al., Reshaping human antibodies for therapy, Nature, 332(6162):323-327 (1988).
Roguska et al., Humanization of murine monoclonal antibodies through variable domain resurfacing, Proc. Natl. Acad. Sci., U.S.A., 91(3):969-973 (1994).
Routier et al., The glycosylation pattern of humanized IgGI antibody (D1.3) expressed in CHO cells, Glycoconjugate J., 14:201-207 (1997).
Roversi et al., Modelling prior distributions of atoms for macromolecular refinement and completion, Acta. Crystallogr D. Biol. Crystallogr, 56(Pt 10):1316-1323 (2000).
Shields et al., Lack of fucose on human IgG1 N-linked oligosaccharide improves binding to human Fcgamma RIII and antibody-dependent cellular toxicity, J. Biol. Chem., 277:26733-26740 (2002).
Shimazaki, The Japanese Journal of Zootechnical Science, 1990, vol. 61, No. 7, pp. 655-660.
Shinkawa et al., The absence of fucose but not the presence of galactose or bisecting N-acetylglucosamine of human IgG1 complex-type oligosaccharides shows the critical role of enhancing antibody-dependent cellular cytotoxicity, J. Biol. Chem., 278:3466-3473 (2003).
Stanton et al., Clinical significance of tumor-infiltrating lymphocytes in breast cancer, J. Immunotherapy cancer, 4:59 (2016).
Tramontano et al., Framework residue 71 is a major determinant of the position and conformation of the second hypervariable region in the VH domains of immunoglobulins, J. Mol. Biol., 215(1):175-182 (1990).
Umana et al., Engineered glycoforms of an antineuroblastoma IgG1 with optimized antibody-dependent cellular cytotoxic activity, Nat. Biotechnol., 17:176-180 (1999).
Wang et al., Antibody Structure, Instability, and Formulation, Journal of Pharmaceutical Sciences, 96(1):1-26 (2007).
Xu et al., B7-H3 and B7-H4 are independent predictors of a poor prognosis in patients with pancreatic cancer, Oncology Letters, 11:1841-1846 (2016).
Abadi, Y.M. et al. (Mar. 2013). "Host B7x Promotes Pulmonary Metastasis of Breast Cancer," Journal of Immunology 190(7):3806-3814.
Abdiche, Y.N. et al. (2016, e-pub. Feb. 8, 2016). "Assessing Kinetic and Epitopic Diversity Across Orthogonal Monoclonal Antibody Generation Platforms," mAbs 8(2):264-277.
Abdiche, Y.N. et al. (Mar. 15, 2009, e-pub. Dec. 7, 2008). "Exploring Blocking Assays Using Octet, ProteOn, and Biacore Blosensors," Analytical Biochem 386(2):172-180.
Al-Lazikani, B. et al. (1997). "Standard Conformations for the Canonical Structures of Immunoglobulins," J. Mol. Biol. 273:927-948.

(56) References Cited

OTHER PUBLICATIONS

Ames, R.S. et al. (Aug. 18, 1995), "Conversion of Murine Fabs Isolated From a Combinatorial Phage Display Library to Full Length Immunoglobulins," J. Immunol. Methods 184(2):177-186.
Anderson, G.L. et al. (Jan. 6, 2010). "Assessing Lead Time of Selected Ovarian Cancer Biomarkers: a Nested Case-control Study," Journal of the National Cancer Institute 102(1):26-38.
Arigami, T. et al. (2010). "Expression of B7-H4 in Blood of Patients With Gastric Cancer Predicts Tumor Progression and Prognosis," J. Surgical Oncology 102:748-752.
Arnold, J.N. et al. (2007, e-pub. Oct. 9, 2006). "The Impact of Glycosylation on the Biological Function and Structure of Human Immunoglobulins," Annual Review of Immunology 25:21-50.
ATCC Catalog No. PTA-5180—"Mouse Hybridoma: Ovr110 A57. 1," 2 pages.
Ausubel, F. et al. (1987). Current Protocols in Molecular Biology, Greene Publishing and Wiley Interscience, New York, TOC, 7 pages.
Awadallah, N. et al. (Mar. 2008). "Detection of B7-H4 and P53 in Pancreatic Cancer: Potential Role as a Cytological Diagnostic Adjunct," Pancreas 36(2):200-206.
Azuma, T. et al. (Oct. 20, 2009). "Potential Role of Decoy B7-H4 in the Pathogenesis of Rheumatoid Arthritis: a Mouse Model Informed by Clinical Data," PLOS Medicine 6(10):e1000166, pp. 1-15.
Balwit, J.M. et al. (2011). "The iSBTc/SITC Primer on Tumor Immunology and Biological Therapy of Cancer: A Summary of the 2010 Program," J. Translational Medicine 9:18, 15 pages.
Barach, Y.S. et al. (Jan. 2011). "T Cell Conihibition in Prostate Cancer: New Immune Evasion Pathways and Emerging Therapeutics," Trends Mo. Med. 17(1):47-55, 18 pages.
Boyd, S.D. et al. (2016, e-pub. Apr. 8, 2016). "Deep Sequencing and Human Antibody Repertoire Analysis," Current Opinion in Immunology 40:103-109.
Bregar, A. et al. (2017, e-pub. Mar. 25, 2017). "Characterization of Immune Regulatory Molecules B7-H4 and PD-L1 in Low and High Grade Endometrial Tumors," Gynecologic Oncology 145(3):446-452.
Bricogne, G. (1997). "Bayesian Statistical Viewpoint on Structure Determination: Basic Concepts and Examples," Meth Enzymol 276:361-423.
Bricogne, G. (Jan. 1, 1993). "Direct Phase Determination by Entropy Maximization and Likelihood Ranking: Status Report and Perspectives," Acta Crystallogr D Biol Crystallogr D49(Pt 1):37-60.
Brinkman, U. et al. (May 11, 1995). Phage Display of Disulfide-Stabilized Fv Fragments, J Immunol Methods 182:41-50.
Burton, D.R. et al. (1994). "Human Antibodies From Combinatorial Libraries," Advances in Imniunology 57:191-280.
Carreno, B. et al. (Jun. 2005). "Therapeutic Opportunities in the B7/CD28 Family of Ligands and Receptors," Current Opinion in Pharmacology 5(4):424-430.
Champe, M. et al. (Jan. 20, 1995). "Monoclonal Antibodies That Block the Activity of Leukocyte Function-Associated Antigen 1 Recognize Three Discrete Epitopes in the Inserted Domain of CD11a," J Biol Chem 270:1388-1394.
Chayen, N.E. (Oct. 15, 1997). The Role of Oil in Macromolecular Crystallization, Structure 5(10):1269-1274.
Chen, C. et al. (2011). "Overexpression of B7-H4 in Tumor Infiltrated Dendritic Cells," Journal of Immunoassay and Immunochemistry 32(4):353-364.
Chen, C. et al. (2012). "Induced Expression of B7-H4 on the Surface of Lung Cancer Cell by the Tumor-associated Macrophages: a Potential Mechanism of Immune Escape," Cancer Letters 317(1):99-105.
Chen, C. et al. (Jul. 12, 2016). "Nuclear Localization of B7-H4 in Pulmonary Adenocarcinomas Presenting as a Solitary Pulmonary Nodule," Oncotarget 7(36):58563-58568.
Chen, C. et al. (May 2012), "Increase of Circulating B7-H4-expressing CD68+ Macrophage Correlated With Clinical Stage of Lung Carcinomas," Journal of Immunotherapy 35(4):354-358.
Chen, C. et al. (Sep. 2017). "Analysis of B7-H4 Expression in Metastatic Pleural Adenocarcinoma and Therapeutic Potential of Its Antagonists," BMC Cancer 17(1):652, 6 pages.
Chen, L.J. et al. (Apr. 2011, e-pub. Apr. 26, 2011). "B7-H4 Expression Associates With Cancer Progression and Predicts Patient's Survival in Human Esophageal Squamous Cell Carcinoma," Cancer Immunology Immunotherapy 60(7):1047-1055.
Chen, X. et al. (Feb. 2017), "Increased B7-H4 Expression During Esophageal Squamous Cell Carcinogenesis is Associated with IL-6/STAT3 Signaling Pathway Activation in Mice," Oncology Letters 13(4):2207-2215.
Chen, Y. et al. (Aug. 19, 2014). "The Coexpression and Clinical Significance of Costimulatory Molecules B7-H1, B7-H3, and B7-H4 in Human Pancreatic Cancer," OncoTargets and Therapy 7:1465-1472.
Cheung, R.C. et al. (Jun. 1990). "Epitope-Specific Antibody Response to the Surface Antigen of Duck Hepatitis B Virus in Infected Ducks," Virology 176(2):546-552.
Chinnadurai, R. et al. (Dec. 2010). "B7-H4 Mediates Inhibition of T Cell Responses by Activated Murine Hepatic Stellate Cells," Hepatology 52(6):2177-2185.
Choi, I.H. et al. (2003). "Genomic Organization and Expression Analysis of B7-H4, an Immune Inhibitory Molecule of the B7 Family," Journal of Immunology 171(9):4650-4654.
Chothia, C. et al. (Aug. 20, 1987). "Canonical Structures for the Hypervariable Regions of Immunoglobulins," J. Mol. Biol. 196(4):901-917.
Chothia, C. et al. (Oct. 5, 1992). "Structural Repertoire of the Human VH Segments," J Mol Biol 227(3):799-817.
Chumsae, C. et al. (Aug. 19, 2014). "Discovery of a Chemical Modification by Citric Acid in a Recombinant Monoclonal Antibody," Analytical Chemistry 86(18):8932-8936.
Clackson, T. et al. (Aug. 15, 1991). "Making Antibody Fragments Using Phage Display Libraries," Nature 352:624-628.
Coales, S.J. et al. (Mar. 2009). "Epitope Mapping by Amide Hydrogen/Deuterium Exchange Coupled With Immobilization of Antibody, On-Line Proteolysis, Liquid Chromatography and Mass Spectrometry," Rapid Commun. Mass Spectrom. 23(5):639-647.
Cockett, M.I. et al. (Jul. 1990). "High Level Expression of Tissue Inhibitor of Metalloproteinases in Chinese Hamster Ovary Cells Using Glutamine Synthetase Gene Amplification," Bio/Technology 8(7):662-667 (Jul. 1990).
Conroy, P.J. et al. (2017, e-pub. Jan. 11, 2017). "Antibodies: From Novel Repertoires to Defining and Refining the Structure of Biologically Important Targets," Methods 116:12-22.
Cui, Y. et al. (Nov. 7, 2016). "B7-H4 is Predictive of Poor Prognosis in Patients With Gastric Cancer," Medical Science Monitor 22:4233-4237.
Cunningham, B.C. et al. (Jun. 2, 1989). "High-Resolution Epitope Mapping of hGH-Receptor Interactions by Alanine-Scanning Mutagenesis," Science 244:1081-1085.
Dall'Acqua, W.F. et al. (Aug. 18, 2006). "Properties of Human IgG1s Engineered for Enhanced Binding to the Neonatal Fc Receptor (FcRn)," J Biol Chem 281(33):23514-23524.
Damschroder, M.M. et al. (2004, e-pub. Jun. 26, 2004). "Analysis of Human and Primate CD2 Molecules by Protein Sequence and Epitope Mapping With Anti-Human CD2 Antibodies," 41:998-1000.
Dangaj, D. et al. (Aug. 1, 2013, e-pub. May 2013). "Novel Recombinant Human B7-H4 Antibodies Overcome Tumoral Immune Escape to Potentiate T-cell Antitumnor Responses," Cancer Research 73(15):4820-4829.
Dangaj, D. et al. (Aug. 2013). "Blocking the B7-H4 Pathway With Novel Recombinant Antibodies Enhances T Cell-Mediated Antitumor Responses," OncoImmunology 2:8 e25913, 3 pages.
Davies, J. et al. (Aug. 20, 2001). "Expression of GnTIII in a Recombinant Anti-CD20 CHO Production Cell Line: Expression of Antibodies With Altered Glycoforms Leads to an Increase in ADCC Through Higher Affinity for FC gamma RIII," Biotechnol. Bioeng. 74(4):288-294.
Driessens, G. et al. (May 2009). "Costimulatory and Coinhibitory Receptors in Anti-Tumor Immunity," Immunol. Rev. 229(1):126-144, 28 pages.

(56) References Cited

OTHER PUBLICATIONS

D'Aria, M. et al. (May 2009). "Abstract # 1601: B7-H4 (DD-O110) is Overexpressed in Endocervical Adenorcarcinoma in situ and invasive Adenocarcinoma," Cancer Research, retrieved from https//cacerres.aacrjournals.org/content/59/9_Supplement/1601, last visited Apr. 30, 2020, 4 pages.
Epstein, A.L. (2012). "B7-H4 as a Target for Breast Cancer Immunotherapy," Research Grant W81XWH-11-1-0466, 26 pages.
Estep, P. et al. (Mar./Apr. 2013, e-pub. Mar. 1, 2013). "High Throughput Solution-Based Measurement of Antibody-Antigen Affinity and Epitope Binning," MAbs 5(2):270-278.
Fan, M. et al. (Oct. 1, 2014, e-pub. Sep. 15, 2014). "B7-H4 Expression Is Correlated With Tumor Progression and Clinical Outcome in Urothelial Cell Carcinoma," International Journal of Clinical and Experimental Pathology 7(10):6768-6775.
Ferrara, C. et al. (2006, e-pub. Jan. 24, 2006). "Modulation of Therapeutic Antibody Effector Functions by Glycosylation Engineering: Influence of Golgi Enzyme Localization Domain and Co-Expression of Heterologous β, 4-N-Acetylglucosaminyltransferase III and Golgi α-Mannosidase," Biotechnology and Bioengineering 93(5):851-861.
Ferrara, F. et al. (Apr. 2015, e-pub. Dec. 20, 2014). "Recombinant Renewable Polyclonal Antibodies," mAbs 7(1):32-41.
Ferreira, M.M. et al. (Mar. 2016, e-pub. Jan. 28, 2016). "Circulating Tumor Cell Technologies," Molecular Oncology 10(3):374-394.
Filies, D. B. et al. (2007). "The New B7s: Playing a Pivotal Role in Tumor Immunity," J. Immunother. 30:251-260.
Foecking, M.K. et al. (1986). "Powerful and Versatile Enhancer-Promoter Unit for Mammalian Expression Vectors," Gene 45(1):101-105.
Fukuda, T. et al. (2016). "Higher Preoperative Serum Levels of PD-L1 and B7-H4 are Associated with Invasive and Metastatic Potential and Predictable for Poor Response to VEGF-Targeted Therapy and Unfavorable Prognosis of Renal Cell Carcinoma," Cancer Medicine 5(8):1810-1820.
Gao, A. et al. (2015). "Effect of VTCN1 on Progression and Metastasis of Ovarian Carcinoma in Vitro and Vivo," Biomedicine & Pharmacotherapy 73:129-134.
GCC Office Action, dated Jan. 20, 2020, for GCC Patent Application No. GC2018-35987, 6 pages.
Geng, Y. et al. (2015). "Expression of Costimulatory Molecules B7-H1, B7-H4 and Foxp3+ Tregs in Gastric Cancer and Its Clinical Significance," International Journal of Clinical Oncology, 20(2):273-281.
Giegé, R. et al. (Jul. 1, 1994). Crystallogenesis of Biological Macromolecules: Facts and Perspectives, Acta Crystallogr D Biol Crystallogr D50(Pt 4):339-350.
Goding, J.W. (1986). "Production of Monoclonal Antibodies," Chapter 3 in Monoclonal Antibodies: Principles and Practice, Academic Press, New York, pp. 59-103.
Goldberg, A. et al. (Dec. 2009). "Abstract C243: B7-H4 Protein Expression in Invasive Ductal Carcinoma and its Association With Tumor Progression," Molecular Cancer Therapeutics, retrieved from https://mct.aacrjournals.org/content/8/12_Supplement/C243, last visited Apr. 30, 2020, 4 pages.
Hammerling, G.J. et al. (1981). "Production of Antibody-Producing Hybridomas in the Rodent Systems," in Research Monographs in Immunology, Elsevier/North-Holland Biomedical Press 3:563-587.
Han, S. et al. (Apr. 2017, e-pubs. Mar. 1, 2017). "Roles of Immune Inhibitory Molecule B7-H4 in Cervical Cancer," Oncology Reports 37(4):2308-2316, 12 pages.
Han, S. et al. (Aug. 2018). "Negative Roles of B7-H3 and B7-H4 in the Microenvironment of Cervical Cancer," Experimental Cell Research, 21 pages.
Hansen, J.D. et al. (2009, e-pub. Dec. 9, 2008). "The B7 Family of Immunoregulatory Receptors: A Comparative and Evolutionary Perspective," Molecular Immunology 46(3):457-472.
Harlow, E. et al. (1988). Antibodies: A Laboratory Manual, Cold Spring Harbor Press, 89 pages.

He, C. et al. (2011). "The Inhibitory Role of B7-H4 in Antitumor Immunity: Association With Cancer Progression and Survival," Clinical & Developmental Immunology 2011:695834, 8 pages.
Herber, D.L. et al. (Jun. 1, 2007). "Meeting Report: Mechanism and Therapeutic Reversal of immune Suppression in Cancer," Cancer Res. 67(11):5067-5069, 7 pages.
Huang, C. et al. (Apr. 2016, e-pub. Feb. 2, 2016). "B7-H3, B7-H4, Foxp3 and IL-2 Expression in Cervical Cancer: Associations With Patient Outcome and Clinical Significance," Oncology Reports 35(4):2183-2190, 11 pages.
Huang, H. et al. (Apr. 4, 2017). "Clinical Significance of the B7-H4 as a Novel Prognostic Marker in Breast Cancer," Gene, 17 pages.
Ichikawa, M. et al. (Sep. 1, 2005). "Role of B7-H1 and B7-H4 Molecules in Down-Regulating Effector Phase of T-Cell Immunity: Novel Cancer Escaping Mechanisms," Frontiers in Bioscience 10:2856-2860.
Iida, S. et al. (Feb. 18, 2009). "Two Mechanisms of the Enhanced Antibody-dependent Cellular Cytotoxicity (ADCC) Efficacy of Non-fucosylated Therapeutic Antibodies in Human Blood," BMC Cancer 9:58, 12 pages.
Iizuka, A. et al. (Nov. 2016, e-pub. Sep. 12, 2016). "Unstable B7-H4 Cell Surface Expression and T-cell Redirection as a Means of Cancer Therapy," Oncology Reports 36(5):2625-2632, 13 pages.
Imai-Nishiya, H. et al. (Nov. 30, 2007). "Double Knockdown of α1,6-Fucosyltransferase (FUTB) and GDP-Man Nose 4,6-Dehydratase (GMO) in Antibody-Producing Cells: A New Strategy for Generating Fully Non-Fucosylated Therapeutic Antibodies With Enhanced ADCC," BMC Biotechnology 7:84, 13 pages.
International Preliminary Report on Patentability, issued Aug. 27, 2020, for PCT Application No. PCT/US2019/018965, filed Feb. 21, 2019, 7 pages.
International Preliminary Report on Patentability, issued Aug. 27, 2020, for PCT Application No. PCT/US2019/018966, filed Feb. 21, 2019, 11 pages.
International Preliminary Report on Patentability, issued Sep. 8, 2020, for PCT Application No. PCT/US2019/020189, filed Mar. 1, 2019, 6 pages.
International Search Report and Written Opinion, mailed Dec. 12, 2018, for PCT Application No. PCT/US2018/047805, filed Aug. 23, 2018, 25 pages.
International Search Report and Written Opinion, mailed Jan. 28, 2020, for PCT Application No. PCT/US2019/056210, filed Oct. 15, 2019, 14 pages.
International Search Report and Written Opinion, malled Jun. 12, 2019, for PCT Application No. PCT/US2019/018965 filed Feb. 21, 2019, 11 pages.
International Search Report and Written Opinion, mailed Jun. 14, 2019, for PCT Application No. PCT/US2019/018963 filed Feb. 21, 2019, 11 pages.
International Search Report and Written Opinion, mailed May 17, 2019, for PCT Application No. PCT/US2019/020189, filed Mar. 1, 2019, 9 pages.
Janakiram, M. et al. (Mar. 2017). "The Third Group of the B7-CD28 Immune Checkpoint Family: HHLA2, TMIGD2, B7x, and B7-H3," Immunological Reviews 276(1):26-39, 28 pages.
Jennewein, M.F. et al. (May 2017). "The Immunoregulatory Roles of Antibody Glycosylation," Trends in Immunology 38(5):358-372, 21 pages.
Jeon, H. et al. (Nov. 2014). "Structure and Cancer Immunotherapy of the B7 Family Member B7x," Cell Reports 9(3):1089-1098.
Jiang, J. et al. (2010, e-pub. Aug. 20, 2010). "Tumor Expression of B7-H4 Predicts Poor Survival of Patients Suffering From Gastric Cancer," Cancer Immunology 59(11):1707-1714.
Jiang, J.T. et al. (2011). "B7-H4 Expression and Increased Death Risk of Cancer Patients: A Meta-Analysis," Journal of Cancer Research and Clinical Oncology 8:229-234.
Jones, P.T. et al. (May 29, 1986). "Replacing the Complementarity-Determining Regions in a Human Antibody With Those From a Mouse," Nature 321:522-525.
Kabat, E.A. et al. (1971). "Attempts to Locate Complementarity-Determining Residues in the Variable Positions of Light and Heavy Chains," Ann NY Acad Sci 190:382-391.

(56) References Cited

OTHER PUBLICATIONS

Kabat, E.A. et al. (1991). Sequences of Proteins of Immunological Interest, 5th ed., Public Health Service, National Institutes of Health, Bethesda, MD. TOC, 21 pages.

Kamimura, Y. et al. (Aug. 2009, e-pub. Aug. 31, 2009). "Possible Involvement of Soluble B7-H4 in T Cell-mediated Inflammatory Immune Responses," Biochemical and Biophysical Research Communications 389(2):349-353.

Kanda, Y. et al. (Jan. 2007, e-pub. Sep. 29, 2006). "Comparison of Biological Activity Among Nonfucosylated Therapeutic Igg1 Antibodies With Three Different N-Linked Fc Oligosaccharides: The High-Mannose, Hybrid, and Complex Types," Glycobiology 17(1):104-118.

Kaplan, C. et al. (2017). "FPA 150, a Novel B7-H4 Therapeutic Antibody with Checkpoint Blockade and ADCC Activities," Five Prime Therapeutics ADIMAB, 1 page.

Kaplan, C.D. et al. (Sep. 10, 2017). "6PD-FPA150, a Novel B7-H4 Therapeutic Antibody with Checkpoint Blockade and ADCC Activities," European Society for Medical Oncology2 Abstract, 2 pages.

Kettleborough, C.A. et al. (Apr. 1994). "Isolation of Tumor Cell-Specific Single-Chain Fv From Immunized Mice Using Phage-Antibody Libraries and the Re-Construction of Whole Antibodies From These Antibody Fragments," Eur. J. Immunol. 24(4):952-958.

Khan, L. et al. (Mar. 23, 2017). "Cross-Neutralizing Anti-HIV-1 Human Single Chain Variable Fragments(scFvs) Against CD4 Binding Site and N332 Glycan Identified From a Recombinant Phage Library," Sci. Rep. 7:451163, 12 pages.

Kim, J.Y. et al. (May 7, 2017). "Immune Signature of Metastatic Breast Cancer: Identifying Predictive Markers of Immunotherapy Response," Oncotarget 8(29):47400-47411.

Kim, S.J. et al. (Dec. 2007). "Guided Selection of Human Antibody Light Chains Against TAG-72 Using a Phage Display Chain Shuffling Approach," J Microbiol 45(6):572-577.

Kirkland, T.N. et al. (Dec. 1, 1986). "Analysis of the Fine Specificity and Cross-Reactivity of Monoclonal Anti-Lipid A Antibodies," J Immunol 137(11):3614-3619.

Kitamura, H. et al. (Jan.-Mar. 2008). "Prognostic Biomarkers of Renal Cell Carcinoma: Recent Advances," Indian J. Urol. 24(1):10-15, retrieved from https://www.ncbi.nlm.gove/pmc/articles/PMC2684243/?report-printable, last visited Apr. 30, 2020, 12 pages.

Klatte, T et al. (May 20-25, 2006). "Best of the 2006 AUA Annual Meeting: Highlights from the 2006 Annual Meeting of the Am. Urological Assoc.," 8(3):120-164.

Konitzer, J.D. et al. (2017, e-pub. Feb. 3, 2017). "Generation of a Highly Diverse Panel of Antagonistic Chicken Monoclonal Antibodies Against the GIP Receptor," mAbs 9(3):536-549.

Krambeck, A.E. et al. (Jul. 5, 2006). "B7-H4 Expression in Renal Cell Carcinoma and Tumor Vasculature: Associations With Cancer Progression and Survival," Proc. Nat. Acad. Sci. USA 103(27):10391-10396.

Kryczek, I. et al. (Apr. 17, 2006), "B7-H4 Expression Identifies a Novel Suppressive Macrophage Population in Human Ovarian Carcinoma," The Journal of Experimental Medicine 203(4):871-881.

Kryczek, I. et al. (Sep. 15, 2007). "Relationship Between B7-H4, Regulatory T Cells, and Patient Outcome in Human Ovarian Carcinoma," Cancer Research 67(18):8900-8905.

Kuroki, M et al. (Aug. 1992). "Biochemical Characterization of 25 Distinct Carcinoembryonic Antigen (CEA) Epitopes Recognized by 57 Monoclonal Antibodies and Categorized Into Seven Groups in Terms of Domain Structure of the CEA Molecule," Hybridoma 11(4):391-407.

Kuroki, M et al. (Oct. 1992, e-pub. Jul. 7, 2009). "Determination of Epitope Specificities of a Large Number of Monoclonal Antibodies by Solid-Phase Mutual Inhibition Assays Using Biotinylated Antigen," Immunol Invest 21(6):523-538.

Kuroki, M. et al. (Aug. 15, 1990). "Serological Mapping of the TAG-72 Tumor-Associated Antigen Using 19 Distinct Monoclonal Antibodies," Cancer Res 50:4872-4879.

Köhler, G. et al. (Aug. 7, 1975). "Continuous Cultures of Fused Cells Secreting Antibody of Predefined Specificity," Nature 256:495-497.

Lee, J. et al. (Dec. 2016). "Molecular-Level Analysis of the Serum Antibody Repertoire in Young Adults Before and After Seasonal Influenza Vaccination," Nature Medicine 22(12):1456-1464, 39 pages.

Lefranc, M.-P. (1999). "The IMGT Unique Numbering for Immunoglobulins, T-Cell Receptors, and Ig-Like Domains," The Immunologist 7(4):132-136.

Lefranc, M.-P. et al. (1999). "IMGT, the International ImMunoGeneTics Databse," Nucleic Acids Res 27(1):209-212.

Leong, S. R. et al. (Apr. 8, 2015). "An Anti-B7-H4 Antibody-drug Conjugate for the Treatment of Breast Cancer," Molecular Pharmaceutics 12(6):1717-1729, 56 pages.

Leung, J. et al. (Jan. 2017, e-pub. Jan. 10, 2017). "Synergistic Effects of Host B7-H4 Deficiency and Gemcitabine Treatment on Tumor Regression and Anti-tumor T Cell Immunity in a Mouse Model," Cancer Immunology 66(4):491-502.

Leung, J. et al. (Jun. 2013). "Host B7-H4 Regulates Antitumor T Cell Responses Through Inhibition of Myeloid-derived Suppressor Cells in a 4T1 Tumor Transplantation Model," Journal of Immunology 190(12):6651-6661, and supplemental information.

Li, J. et al (Apr. 17, 2018). "Co-inhibitory Molecule B7 Superfamily Member 1 Expressed by Tumor-infiltrating Myeloid Cells Induces Dysfunction of Anti-tumor CD8+ T Cells," Immunity Cell Press 48:773-786.

Li, Y. et al. (Jan. 28, 2009). "Summary of the Primer on Tumor Immunology and the Biological Therapy of Cancer," J. Translational Medicine 7:11, 5 pages.

Liu, J. et al. (2015, e-pub. Aug. 28, 2015). "Expression of Immune Checkpoint Molecules in Endometrial Carcinoma," Experimental and Therapeutic Medicine 10(5):1947-1952, 11 pages.

Liu, L. et al. (2016, e-pub. Jul. 13, 2016). "B7-H4 Expression in Human Infiltrating Ductal Carcinoma-Associated Macrophages," Molecular Medicine Report 14(3):2135-2142, 12 pages.

Liu, W-H. et al. (2014, e-pub. Sep. 11, 2014). "B7-H4 Expression in Bladder Urothelial Carcinoma and Immune Escape Mechanisms," Oncology Letters 8(6):2527-2534, 12 pages.

Liu, Y. et al. (Mar./Apr. 2014. e-pub. Dec. 6, 2013). "High-Throughput Screening for Developability During Early-Stage Antibody Discovery Using Self-Interaction Nanoparticle Spectroscopy," MAbs 6(2):483-492.

Loke, P. et al. (Aug. 6, 2004). "Emerging Mechanisms of Immune Regulation: The Extended B7 Family and Regulatory T Cells," Arthritis Research & Therapy 6(5):208-214.

Longmore, G.D. et al. (Mar. 1, 1982). "Product-Identification and Substrate-Specificity Studies of the GDP-L-fucose:2-acetamido-2-deoxy-beta-D-glucoside (FUC Goes to Asn-Linked GlcNAc) 6-alpha-L-fucosyltransferase in a Golgi-Rich Fraction From Porcine Liver," Carbohydr Res 100:365-392.

MacCallum, R.M. et al. (1996). "Antibody-Antigen Interactions: Contact Analysis and Binding Site Topography," J. Mol. Biol. 262:732-745.

MacGregor, H.-L. et al. (Jun. 15, 2017, e-pub. Mar. 21, 2017). "Molecular Pathways: Evaluating the Potential for B7-H4 as an Immunoregulatory Target," Clinical Cancer Research 23(12):2934-2941.

Mao, Y. et al. (Jun. 2006). "Recombinant Human B7-H4 Expressed in *Escherichia coli* Inhibits T Lymphocyte Proliferation and IL-2 Secretion in Vitro," Acta Pharmacologica Sinica 27(6):741-746.

Martin, A.C.R. (2001). "Protein Sequence and Structure Analysis of Antibody Variable Domains," in Antibody Engineering, Kontermann and Dithel, eds., Chapter 31, pp. 422-439.

Matsunaga, T. et al. (2011). "Increased B7-H1 and B7-H4 Expressions on Circulating Monocytes and Tumor-associated Macrophages Are Involved in Immune Evasion in Patients With Gastric Cancer," Yonago Acta Medica 54(1):1-10.

McPherson, A. (1990). "Current Approaches to Macromolecular Crystallization," Eur J Biochem 189:1-23.

McPherson, A. (Oct. 25, 1976). "Crystallization of Proteins from Polyethylene Glycol," J Biol Chem 251(20):6300-6303.

(56) References Cited

OTHER PUBLICATIONS

Meng, Z. et al. (Jun. 19, 2017). "B7-H4 as an Independent Prognostic Indicator of Cancer Patients: a Metaanalysis," Oncotarget 8(40):68825-68836.
Miyatake, T. et al. (2007, e-pub. May 16, 2007). "B7-H4 (DD-O110) Is Overexpressed in High Risk Uterine Endometrioid Adenocarcinomas and Inversely Correlated With Tumor T-cell Infiltration," Gynecologic Oncology 106(1):119-127.
Miyatake, T. et al. (Apr. 2006). "B7-H4 (DD-O110) Immunocytochemistry Improves the Sensitivity of Cancer Cell Detection in Pelvic Wash Specimens of Metastatic Ovarian Cancer," Cancer Research, Abstract 4502, retrieved from https://cancerres.aacrjounals.org/content/66/8_Supplement/1056.4, last visited Apr. 30, 2020, 4 pages.
Miyatake, T. et al. (May 2005). "B7-H4 (DD-0110) is Overexpressed in Uterine Endometrioid Carcinomas Independent of Tumor Grade, T Cell Infiltration, or Apoptotic Index," Cancer Research, Abstract 3604, retrieved from https://canceres.aacrjournals.org/content/65/9_Supplement/849.5, last visited May 1, 2020, 4 pages.
Moldenhauer, G. et al. (Aug. 1990). "Identity of HML-1 Antigen on Intestinal Intraepithelial T Cells and of B-ly7 Antigen on Hairy Cell Leukaemia," Scand J Immunol 32(2):77-82.
Morel, G.A. et al. (Jan. 1988). "Monoclonal Antibodies to Bovine Serum Albumin: Affinity and Specificity Determinations," Mol Immunol 25(1):7-15.
Mugler, K.C. et al. (Dec. 2007), "B7-H4 Expression in a Range of Breast Pathology: Correlation With Tumor T-cell Infiltration," Applied Immunohistochemistry and Molecular Morphology 15(4):363-370.
Murillo, O. et al. (Nov. 15, 2013). "Potentiation of Therapeutic Immune Responses Against Malignancies With Monoclonal Antibodies," Clinical Cancer Research 9:5454-5464.
Niwa, R. et al. (Mar. 15, 2005). "Enhanced Natural Killer Cell Binding and Activation by Low-fucose IgG1 Antibody Results in Potent Antibody-dependent Cellular Cytotoxicity Induction at Lower Antigen Density," Clinical Cancer Research 11(6):2327-2336.
Niwa, R. et al. (Sep. 15, 2004). "Enhancement of the Antibody-Dependent Cellular Cytotoxicity of Low-Fucose IgG1 Is Independent of FcγRIIIa Functional Polymorphism," Clin Cancer Res 10:6248-6255.
Ohaegbulam, K. et al. (Sep. 20, 2017). "Tumor-expressed Immune Checkpoint B7X Promotes Cancer Progression and Antigen-Specific CD8 T Cell Exhaustion and Suppressive Innate Immune Cells," Oncotarget 8(47):82740-82753.
Palena, C. et al. (2010). "Review Article: Vaccines Against Human Carcinomas: Strategies to Improve Antitumor Immune Responses," J. Biomedicine and Biotechnology 2010(380697):1-12.
Parola, C. et al. (2018). "Integrating High-Throughput Screening and Sequencing for Monoclonal Antibody Discovery and Engineering," Immunology 153:31-41.
Persic, L. et al. (Mar. 10, 1997). "An Integrated Vector System for the Eukaryotic Expression of Antibodies or Their Fragments After Selection From Phage Display Libraries," Gene 187(1):9-18.
Podojil, J. et al. (Mar. 2017). "Potential Targeting of B7-H4 for the Treatment of Cancer," Immunological Reviews 276(1):40-51, 22 pages.
Prasad, D. V.R. et al. (Jun. 2003). "B7S1, a Novel B7 Family Member That Negatively Regulates T Cell Activation," Immunity 18(6):863-873.
Presta, L.G. et al. (2002). "Engineering Therapeutic Antibodies for Improved Function," Biochemical Society Transactions 30(4):487-490.
Qian, Y. et al. (2011, e-pub. Dec. 29, 2010). "B7-H4 Expression in Various Tumors Determined Using a Novel Developed Monoclonal Antibody," Clinical and Experimental Medicine 11(3):163-170.
Qian, Y. et al. (Jul. 25, 2011). "Development of a Novel Monoclonal Antibody to B7-H4: Characterization and Biological Activity," European Journal of Medical Research 16(7):295-302.
Rabinovich, G.A. et al. (2007). "Immunosuppressive Strategies That Are Mediated by Tumor Cells," Annu. Rev. Immunol. 25:267-296, 34 pages.

Rader, C. et al. (Jul. 1998). ". A Phage Display Approachfor Rapid Antibody Humanization: Designed Combinatorial V Gene Libraries," PNAS 95:8910-8915.
Rahbar, R. et al. (Feb. 2015, e-pub. Dec. 19, 2014). "B7-H4 Expression by Nonhematopoietic Cells in the Tumor Microenvironment Promotes Antitumor Immunity," Cancer Immunology Research 3(2):184-195.
Rahbar, R. et al. (Jan. 2016, Jan. 4, 2016). "B7-H4 Is a Positive Regulator of Antitumor Immunity," Oncoimmunology, 5(1):e1050575, 3 pages.
Raju, T.S. (Apr. 2003). "Glycosylation Variations with Expression Systems and Their Impact on Biological Activity of Therapeutic Immunoglobulins," BioProcess International 1(4): 44-53.
Riechmann, L. et al. (Mar. 24, 1988). "Reshaping Human Antibodies for Therapy," Nature 332:323-329.
Roguska, M.A. et al. (Feb. 1994). "Humanization of Murine Monoclonal Antibodies Through Variable Domain Resurfacing," Proc. Natl. Acad. Sci. USA 91(3):969-973.
Roguska, M.A. et al. (Oct. 1996). "A Comparison of Two Murine Monoclonal Antibodies Humanized by CDR-Grafting and Variable Domain Resurfacing," Protein Eng. 9(10):895-904.
Routier, F.H. et al. (1997). "The Glycosylation Pattern of a Humanized IgGI Antibody (D1.3) Expressed in CHO Cells," Glycoconjugate Journal 14:201-207.
Roversi, P et al. (2000). "Modelling Prior Distributions of Atoms for Macro-Molecular Refinement and Completion," Acta Crystallogr D Biol Crystallogr D56:1316-1323.
Sadun, R.E. et al. (Jul. 1, 2007). "Immune Signatures of Murine and Human Cancers Reveal Unique Mechanisms of Tumor Escape and New Targets for Cancer Immunotherapy." Cancer Therapy: Preclinical 13(13):4016-4025.
Salceda, S. et al. (May 2005, e-pub. Mar. 9, 2005). "The Immunomodulatory Protein B7-H4 Is Overexpressed in Breast and Ovarian Cancers and Promotes Epithelial Cell Transformation," Experimental Cell Research 306(1):128-141.
Sambrook, J. et al. (2001). "Molecular Cloning: A Laboratory Manual," 3rd edition, J.F. Sambrook and D.W. Russell, ed., Cold Spring Harbor Laboratory Press: Cold Spring Harbor, NY, 2:107 pages.
Sankin, A. et al. (Oct. 2018). "The Expanding Repertoire of Targets for Immune Checkpoint Inhibition in Bladder Cancer: What Lies Beneath the Tip of the Iceberg, PD-L1," Urologic Oncology 36(10):459-468, 19 pages.
Schalper, K. et al. (Jan. 15, 2017, e-pubs. Jul. 20, 2016). "Differential Expression and Significance of PD-L1, IDO-1, and B7-H4 in Human Lung Cancer," Clinical Cancer Research 23(2):370-378.
Seliger, B. et al. (Dec. 2008). "The Complex Role of B7 Molecules in Tumor Immunology," Trends Mol. Med. 14(12):550-559, 19 pages.
Shaffer, D. et al. (2015). "Dissecting the Tumor Micro-environment in Triple Negative Breast Cancer Identifies a Mutually Exclusive Expression Pattern of the Immune Co-inhibitory Molecules B7-H 4 and PD-L1," Journal for Immunotherapy of Cancer 3(2):017, 1 page.
Sheehan, J. et al. (Feb. 6, 2015). "Phage and Yeast Display," Microbiol. Spectr. 3(1):AID-0028-2014, 17 pages.
Shen, L. et al. (Aug. 2017). "B7-H4 Is a Prognostic Biomarker for Poor Survival in Patients With Pancreatic Cancer," Human Pathology 66:79-85.
Shi, H. et al. (2014) "Serum B7-H4 Expression Is a Significant Prognostic Indicator for Patients With Gastric Cancer," World Journal of Surgical Oncology, 12:188, 5 pages.
Shields, R.L. et al. (Jul. 26, 2002, e-pub. May 1, 2002). "Lack of Fucose on Human IgG1 N-Linked Oligosaccharide Improves Binding to Human FcγRIII and Antibody-dependent Cellular Toxicity," J. Biol. Chem. 277:26733-26740.
Shields, R.L. et al. (Mar. 2, 2001). "High Resolution Mapping of the Binding Site on Human IgG1 for FcγRI, FcγII. FcγIII, and FcRn and Design of IgG1 Variants With Improved Binding to the FcγR," J. Biol. Chem. 276(9):6591-6604.
Shinkawa, T. et al. (Jan. 31, 2003). "The Absence of Fucose But Not the Presence of Galactose or Bisecting N-Acetylglucosamine of Human IgG1 Complex-Type Oligosaccharides Shows the Critical

(56) References Cited

OTHER PUBLICATIONS

Role of Enhancing Antibody-Dependent Cellular Cytotoxicity," Journal of Biological Chemistry 278(5):3466-3473.
Shrestha, R. et al. (Jul. 13, 2018), "Monitoring Immune Checkpoint Regulators as Predictive Biomarkers in Hepatocellular Carcinoma," Frontiers in Oncology 8(269):1-17.
Sica, G. et al. (Jun. 2003). "B7-H4, a Molecule of the B7 Family, Negatively Regulates T Cell Immunity," Immunity 18(6):849-861.
Siegel, R.W. et al. (2004). "High Efficiency Recovery and Epitope-Specific Sorting of an scFv Yeast Display Library," J Immunol Methods 286(1-2):141-153.
Simon, I. et al. (Aug. 2007, e-pub. May 11, 2007). "B7-H4 Is Over-expressed in Early-stage Ovarian Cancer and is Independent of CA125 Expression," Gynecologic Oncology 106(2):334-341.
Simon, I. et al. (Feb. 1, 2006). "B7-H4 Is a Novel Membrane-bound Protein and a Candidate Serum and Tissue Biomarker for Ovarian Cancer," Cancer Research, 66(3):1570-1575.
Simon, I. et al. (May 2005). "Evaluation of B7-H4 (DD-O110) as a Prognostic Marker in Tissue and Serum of Ovarian Cancer Patients," Cancer Research, Abstract 4882, retrieved from https://cancerres.aacrjournals.org/content/65/9_Supplement/1153.2, last visited Apr. 30, 2020, 4 pages.
Smith, J. et al. (Jul. 2014). "B7-H4 as a Potential Target for Immunotherapy for Gynecologic Cancers: A Closer Look," Gynecologic Oncology 134(1):181-189, 20 pages.
Smith, J. et al. (Nov. 2016, e-pub. Oct. 4, 2016). "Tumor Regression and Delayed Onset Toxicity Following B7-H4 Car T Cell Therapy," Molecular Therapy 24(11):1987-1999.
Smith, P. et al. (Apr. 17, 2012, e-pub. Apr. 2, 2012). "Mouse Model Recapitulating Human Fcγ Receptor Structural and Functional Diversity," PNAS 109(16):6181-6186, 6 pages.
Song, X. et al. (Apr. 5, 2016). "Prognostic Role of High B7-H4 Expression in Patients With Solid Tumors: A Meta-Analysis," Oncotarget 7(47):76523-76533.
Sood, A.K. (2010, e-pub. Sep. 10, 2009). "PDEF and PDEF-Induced Proteins as Candidate Tumor Antigens for T Cell and Antibody-Mediated Immunotherapy of Breast Cancer," Immunol. Res. 46:206-215.
Sun, Y. et al. (Aug. 2006). "B7-H3 and B7-H4 Expression in Non-small-cell Lung Cancer," Lung Cancer 53(2):143-151.
Tan, Z. et al. (Feb. 23, 2017). "Prognostic Role of B7-H4 in Patients With Non-Small Cell Lung Cancer: A Meta-Analysis," Oncotarget 8(16):27137-27144.
Terrett, J. et al. (May 2008). "Preclinical Development of Anti B7-H4 Therapeutic Antibodies," Cancer Research, Abstract 4986, retrieved from https://canerres.acorjournals.org/content/68/9_Supplement/4986, last visited Apr. 30, 2020, 3 pages.
Thompson, R. et al. (Aug. 1, 2008). "Serum-Soluble B7x Is Elevated in Renal Cell Carcinoma Patients and Is Associated With Advanced Stage," Cancer Research 68(15):6054-6058.
Thompson, R.H. et al. (2005). "B7-H1, Glycoprotein Blockade: A Novel Strategy to Enhance Immunotherapy in Patients With Renal Cell Carcinoma," Urology 66(Suppl. 5A):10-14.
Tramontano, A et al. (Sep. 1990). "Framework Residue 71 Is a Major Determinant of the Position and Conformation of the Second Hypervariable Region in the VH Domains of Immunoglobulins," J Mol Biol 215(1):175-182.
Tringler, B. et al. (Jan. 2006, e-pub. Oct. 26, 2005). "B7-H4 Overexpression in Ovarian Tumors," Gynecologic Oncology 100(1):44-52.
Tringler, B. et al. (Mar. 1, 2005). "B7-H4 is Highly Expressed in Ductal and Lobular Breast Cancer," Clinical Cancer Research 11(5):1842-1848.
Umaña, P. et al. (Feb. 1999). "Engineered Glycoforms of an Antineuro-Blastoma IgG 1 With Optimized Antibody-Dependent Cellular Cytotoxic Activity," Nat. Biotechnol. 17:176-180.
Van Regenmortel, M.H.V. (Jan. 12, 2018). "Development of a Preventive HIV Vaccine Requires Solving Inverse Problems Which Is Unattainable by Rational Vaccine Design," Front. Immunol. 8(2009):1-11.
Verhoeyen, M. et al. (Mar. 25, 1988). "Reshaping Human Antibodies: Grafting an Antilysozyme Activity," Science 239(4857):1534-1536.
Von Horsten, H.H. et al. (2010, e-pub. Jul. 15, 2010). "Production of Non-Fucosylated Antibodies by Co-expression of Heterologous GDP-6-Deoxy-D-Lyxo-4-Hexulose Reductase," Glycobiology 20(12):1607-1618.
Wagener, C et al. (Mar. 30, 1984). "Use of Biotin-Labeled Monoclonal Antibodies and Avidin-Peroxidase Conjugates for the Determination of Epitope Specificities in a Solid-Phase Competitive Enzyme Immunoassay," J Immunol Methods 68(1-2):269-274.
Wagener, C. et al. (May 1983). "Monoclonal Antibodies for Carcinoembryonic Antigen and Related Antigens as a Model System: A Systematic Approach for the Determination of Epitope Specificities of Monoclonal Antibodies," J Immunol 130(5):2308-2315.
Wang, L. et al. (2016, e-pub. Jun. 1, 2016). "Could B7-H4 Serve as a Target to Activate Anti-Cancer Immunity?" International Immunopharmacology 38:97-103.
Wang, L. et al. (Jul. 2018), "B7-H4 Overexpression Contributes to Poor Prognosis and Drug-Resistance in Triple-Negative Breast Cancer," Cancer Cell International 18:100, 12 pages.
Wang, L. et al. (Sep. 2015, e-pub. Sep. 28, 2015). "Roles of Coinhibitory Molecules B7-H3 and B7-H4 in Esophageal Squamous Cell Carcinoma," Tumour Biology pp. 1-11.
Wilcox, R.A. et al. (2009). "CD14+ hla-DR-/Lo Myeloid-Derived Suppressor Cells Express Immunosuppressive B7-H Family Members and Are Depleted Following Taxane-Based Chemotherapy in Melanoma," Blood 114(22):464, Abstract 464, retrieved from https://ashpublication.org/blood/article/114/22/464/64311/CD14-hlaDRlo-MyeloidDerived-Suppressor-Cell, last visited Apr. 30, 2020, 6 pages.
Wu, T.C. et al. (No Date). "Abstract 547: Development of Antigen-Targeted Vaccines and Immune Checkpoint Inhibitors for Cancer Therapy," Immune Response Modifiers: Cancer Vaccines, 1 page.
Xu, H. et al. (Mar. 2016, e-pub. Jan. 19, 2016). "B7-H3 and B7-H4 Are Independent Predictors of a Poor Prognosis in Patients With Pancreatic Cancer," Oncology Letters 11(3):1841-1846, 10 pages.
Xu, Y. et al. (2013, e-pub. Sep. 17, 2013). "Addressing Polyspecificity of Antibodies Selected From an In Vitro Yeast Presentation System: A FACS-Based, High-Throughput Selection and Analytical Tool," PEDS (26)10:663-670.
Yamane-Ohnuki, N. et al. (2004, e-pub. Aug. 6, 2004). "Establishment of FUT8 Knockout Chinese hamster Ovary Cells: An Ideal Host Cell Line for Producing Completely Defucosylated Antibodies With Enhances Antibody-Dependent Cellular Cytotoxicity," Biotech. Bloeng. 87:614-622.
Ye, Y. et al. (Aug. 2018). "Does B7-H4 Expression Correlate With Clinicopathologic Characteristics and Survival in Ovarian Cancer?: A Systematic Review and Prisma-compliant Meta-analysis," Medicine 97(32):e11821, 8 pages.
Zang, X. et al. (Dec. 4, 2007). "B7-H3 and B7x Are Highly Expressed in Human Prostate Cancer and Associated With Disease Spread and Poor Outcome," Proc. Nat. Acad. Sci. USA 104(49):19458-19463.
Zang, X. et al. (Sep. 2, 2003). "B7x: a Widely Expressed B7 Family Member That Inhibits T Cell Activation," Proc. Nat. Acad. Sci. USA 100(18):10388-10392.
Zhang, L. et al. (Nov. 2013, e-pub. Jan. 14, 2013). "The Costimulatory Molecule B7-H4 Promote Tumor Progression and Cell Proliferation Through Translocating Into Nucleus," Oncogene 32(46):5347-5358.
Zhang, N. et al. (Aug. 2014). "Preparation and Characterization of Monocional Antibody Against Human B7-H4 Molecule," Monocional Antibodies in Immunodiagnosis and Immunotherapy 33(4):270-274.
Zhang, S. et al. (Oct. 2015). "Circulating B7-H4 in Serum Predicts Prognosis in Patients With Hepatocellular Carcinoma," Genetics and Molecular Research 14(4):13041-13048.
Zhang, X. et al. (Jan. 3, 2017). "B7-H4 Promotes Tumor Growth and Metastatic Progression in Lung Cancer by Impacting Cell Proliferation and Survival," Oncotarget 8(12):18861-18871.
Zhou, D. et al. (Apr. 2018, e-pub. Feb. 13, 2018). "Silencing of B7-H4 Suppresses the Tumorigenicity of the Mgc-803 Human

(56) References Cited

OTHER PUBLICATIONS

Gastric Cancer Cell Line and Promotes Cell Apoptosis via the Mitochondrial Signaling Pathway." International Journal of Oncology 52(4):1267-1276, 12 pages.

Zhou, T. et al. (Jun. 4, 2015), "Structural Repertoire of HIV-1-Neutralizing Antibodies Targeting the CD4 Supersite in 14 Donors," Cell 161:1280-1292, 46 pages.

Zhu, J. et al. (May 2013). "B7-H4 Expression Is Associated With Cancer Progression and Predicts Patient Survival in Human Thyroid Cancer," Asian Pacific Journal of Cancer Prevention 14(5):3011-3015.

Zou, W. (Apr. 2005, e-pub. Mar. 18, 2015). "Immunosuppressive Networks in the Tumour Environment and Their Therapeutic Relevance," Nature Reviews 5:263-274.

Yamane-Ohnuki et al., Establishment of FUT8 knockout Chinese hamster ovary cells: an ideal host cell line for producing completely defucosylated antibodies with enhanced antibody-dependent cellular cytotoxicity, Biotech. Bioeng., 87(5):614-622 (2004).

Zhu et al., B7-H4 expression is associated with cancer progression and predicts patient survival in human thyroid cancer, Asian Pacific J. Cancer Prev., 14:3011-3015 (2011).

"Specialized knowledge in pharmaceutics (I), 7th Version", Practicing Pharmacist Qualification Certification Center under State Food and Drug Administration China medical science press, 6 pages (2015).

Genbank, immunoglobulin, partial [*Homo sapiens*] CAA69703.1 (Jul. 26, 2016).

Shao et al., Construction of anti-B7-H4-scFv library and screening and identification of anti-B7-H4-scFv, Chin J. Cell Mol. Immunol, 32 (09):1260-1266 (2016).

Xiaoju et al., Screening and Identification of Antigen Epitope of hB7-H4 Recognized by Monoclonal Antibody with 12 phage Display Peptide Library, Letters in Biotechnology, 26(4):505-509 (Jul. 31, 2015).

Kang et al., Rapid Formulation Development for Monoclonal Antibodies, BioProcess International, 14(4):1-4 (Apr. 2016).

Wang W., Instability, stabilization, and formulation of liquid protein pharmaceuticals, International Journal of Pharmaceutics, 185(2):129-188 (Aug. 1999).

Freshwater et al., Evaluation of dosing strategy for pembrolizumab for oncology indications, Journal for Immunotherapy of Cancer: 5:43; 9 pages (2017).

International Application No. PCT/US2018/047805, International Preliminary Report on Patentability, mailed Mar. 5, 2020.

International Application No. PCT/US2019/056210, International Preliminary Report on Patentability, mailed Apr. 29, 2021.

International Application No. PCT/US2019/018963, International Preliminary Report on Patentability, mailed Sep. 3, 2020.

Li et al., Progress in molecular typing of triple negative breast cancer, Journal of New Medicine, No. 2 (2018).

Uchiyama S., Liquid formulation for antibody drugs, Biochimica et Biophysica Acta (BBA)—Proteins and Proteomics, 1844(11):2041-2052 (Nov. 2014).

Whitaker et al., A Formulation Development Approach to Identify and Select Stable Ultra-High-Concentration Monoclonal Antibody Formulations With Reduced Viscosities, Journal of Pharmaceutical Sciences, 106(11):3230-3241 (Nov. 2017).

\* cited by examiner

B7-H4 ANTIBODY FORMULATIONS

CROSS REFERENCE TO RELATED APPLICATIONS

This application is a Continuation application of International Patent Application No. PCT/US2019/018965, filed on Feb. 21, 2019, which claims the benefit of U.S. Provisional Application No. 62/633,537, filed on Feb. 21, 2018, the contents of which are incorporated herein by reference their entirety.

SUBMISSION OF SEQUENCE LISTING ON ASCII TEXT FILE

The content of the following submission on ASCII text file is incorporated herein by reference in its entirety: a computer readable form (CRF) of the Sequence Listing (file name: 204122000201SEQLIST.TXT, date recorded: Aug. 17, 2020, size: 29 KB).

1. FIELD

Pharmaceutical compositions comprising B7-H4 antibodies and methods of using such formulations are provided.

2. BACKGROUND

B7-H4 (also known as B7x, B7-S1, and VTCN1) is an immune regulatory molecule that shares homology with other B7 family members, include PD-L1. It is a type I transmembrane protein comprised of both IgV and IgC ectodomains. While B7-H4 expression in healthy tissues is relatively limited at the protein level, B7-H4 is expressed in several solid tumors such as gynecological carcinomas of the breast, ovary, and endometrium. Expression of B7-H4 in tumors tends to correlate with poor prognosis. The receptor for B7-H4 is unknown, but it is believed to be expressed on T cells. B7-H4 is believed to directly inhibit T cell activity.

Given the expression and function of B7-H4, antibodies that specifically bind to B7-H4 are being developed for therapies involving the modulation of B7-H4, e.g., for the treatment of cancer. Accordingly, there is a need for pharmaceutical compositions comprising B7-H4 antibodies and antigen-binding fragments thereof for administration of such treatments.

3. SUMMARY

Provided herein are pharmaceutical compositions comprising an antibody or antigen-binding fragment thereof that specifically binds to human B7-H4.

In certain aspects, a pharmaceutical composition comprises (i) an antibody or antigen-binding fragment thereof that specifically binds to human B7-H4, (ii) a buffer selected from the group consisting of acetate or citrate, and (iii) a sugar, wherein the pH of the composition is about 4.5 to about 6 or is 4.5 to 6.

In certain aspects, the antibody or antigen-binding fragment thereof comprises the CDRs of 20502.

In certain aspects, a pharmaceutical composition comprises (i) an antibody or antigen-binding fragment thereof that specifically binds to human B7-H4 and comprises the CDRs of 20502, (ii) a buffer, and (iii) a pH of about 4.5 to about 6 or 4.5 to 6.

In certain aspects, the CDRs of 20502 are the Kabat-defined CDRs, the Chothia-defined CDRs, or the AbM-defined CDRs. In certain aspects, the antibody or antigen-binding fragment thereof comprises the heavy chain variable region (VH) complementarity determining region (CDR) 1, VH CDR2, VH CDR3 and light chain variable region (VL) CDR1, CDR2, and CDR3 sequences of SEQ ID NOs: 5-10, respectively.

In certain aspects, a pharmaceutical composition comprises an antibody or antigen-binding fragment thereof that specifically binds to human B7-H4, wherein the composition comprises no more than 45% of acidic variants of the antibody or antigen-binding fragment thereof after 6 months at 5° C. In certain aspects, a pharmaceutical composition comprises an antibody or antigen-binding fragment thereof that specifically binds to human B7-H4, wherein the composition comprises no more than 40% of acidic variants of the antibody or antigen-binding fragment thereof after 6 months at 5° C. In certain aspects, a pharmaceutical composition comprises an antibody or antigen-binding fragment thereof that specifically binds to human B7-H4, wherein the composition comprises about 35% to about 45% of acidic variants of the antibody or antigen-binding fragment thereof after 6 months at 5° C. In certain aspects, a pharmaceutical composition comprises an antibody or antigen-binding fragment thereof that specifically binds to human B7-H4, wherein the composition comprises 35% to 45% of acidic variants of the antibody or antigen-binding fragment thereof after 6 months at 5° C. In certain aspects, the composition comprises no more than 20% of basic variants of the antibody or antigen-binding fragment thereof after 6 months at 5° C.

In certain aspects, a pharmaceutical composition comprises an antibody or antigen-binding fragment thereof that specifically binds to human B7-H4, wherein the composition comprises no more than 20% of basic variants of the antibody or antigen-binding fragment thereof after 6 months at 5° C. In certain aspects, a pharmaceutical composition comprises an antibody or antigen-binding fragment thereof that specifically binds to human B7-H4, wherein the composition comprises about 9% to about 18% of basic variants of the antibody or antigen-binding fragment thereof after 6 months at 5° C. In certain aspects, a pharmaceutical composition comprises an antibody or antigen-binding fragment thereof that specifically binds to human B7-H4, wherein the composition comprises 9% to 18% of basic variants of the antibody or antigen-binding fragment thereof after 6 months at 5° C. In certain aspects, the composition comprises no more than 45% of acidic variants of the antibody or antigen-binding fragment thereof after 6 months at 5° C. In certain aspects, the composition comprises no more than 40% of acidic variants of the antibody or antigen-binding fragment thereof after 6 months at 5° C.

In certain aspects, a pharmaceutical composition comprises an antibody or antigen-binding fragment thereof that specifically binds to human B7-H4, wherein the composition comprises no more than 60% of acidic and basic variants of the antibody or antigen-binding fragment thereof after 6 months at 5° C. In certain aspects, the composition comprises no more than 55% of acidic and basic variants of the antibody or antigen-binding fragment thereof after 6 months at 5° C. In certain aspects, the composition comprises no more than 45% of acidic variants of the antibody or antigen-binding fragment thereof after 6 months at 5° C. In certain aspects, the composition comprises no more than 40% of acidic variants of the antibody or antigen-binding fragment thereof after 6 months at 5° C. In certain aspects, the composition comprises no more than 20% of basic variants of the antibody or antigen-binding fragment thereof after 6 months at 5° C.

In certain aspects, the pharmaceutical composition comprises about 30% to about 40% of acidic variants of the antibody or antigen-binding fragment thereof after 6 months at 5° C. In certain aspects, the pharmaceutical composition comprises 30% to 40% of acidic variants of the antibody or antigen-binding fragment thereof after 6 months at 5° C. In certain aspects, the pharmaceutical composition comprises about 35% to about 40% of acidic variants of the antibody or antigen-binding fragment thereof after 6 months at 5° C. In certain aspects, the pharmaceutical composition comprises 35% to 40% of acidic variants of the antibody or antigen-binding fragment thereof after 6 months at 5° C.

In certain aspects, the pharmaceutical composition comprises about 10% to about 17% of basic variants of the antibody or antigen-binding fragment thereof after 6 months at 5° C. In certain aspects, the pharmaceutical composition comprises 10% to 17% of basic variants of the antibody or antigen-binding fragment thereof after 6 months at 5° C. In certain aspects, the pharmaceutical composition comprises about 11% to about 16% of basic variants of the antibody or antigen-binding fragment thereof after 6 months at 5° C. In certain aspects, the pharmaceutical composition comprises 11% to 16% of basic variants of the antibody or antigen-binding fragment thereof after 6 months at 5° C.

In certain aspects, the composition comprises no more than 55% of acidic and basic variants of the antibody or antigen-binding fragment thereof after 6 months at 5° C.

In certain aspects, the antibody or antigen-binding fragment thereof comprises the CDRs of 20502. In certain aspects, the CDRs of 20502 are the Kabat-defined CDRs, the Chothia-defined CDRs, or the AbM-defined CDRs. In certain aspects, the antibody or antigen-binding fragment thereof comprises the heavy chain variable region (VH) complementarity determining region (CDR) 1, VH CDR2, VH CDR3 and light chain variable region (VL) CDR1, CDR2, and CDR3 sequences of SEQ ID NOs: 5-10, respectively.

In certain aspects, the pH of the composition is about 4.5 to about 6 or is 4.5 to 6.

In certain aspects, the composition comprises a buffer. In certain aspects, the buffer is acetate or citrate.

In certain aspects, the composition further comprises a sugar. In certain aspects, the sugar is selected from the group consisting of sucrose, sorbitol, and trehalose.

In certain aspects, the concentration of the buffer is about 15 to about 25 mM. In certain aspects, the concentration of the buffer is 15 to 25 mM. In certain aspects, the concentration of the buffer is about 18 mM to about 22 mM. In certain aspects, the concentration of the buffer is 18 mM to 22 mM. In certain aspects, the concentration of the buffer is about 20 mM. In certain aspects, the concentration of the buffer is 20 mM.

In certain aspects, the concentration of the sugar is about 225 mM to about 300 mM. In certain aspects, the concentration of the sugar is 225 mM to 300 mM. In certain aspects, the concentration of the sugar is about 250 mM to about 290 mM. In certain aspects, the concentration of the sugar is 250 mM to 290 mM. In certain aspects, the concentration of the sugar is about 270 mM. In certain aspects, the concentration of the sugar is 270 mM.

In certain aspects, the concentration of the sugar is about 10 to about 15 times the concentration of the buffer. In certain aspects, the concentration of the sugar is 10 to 15 times the concentration of the buffer. In certain aspects, the concentration of the sugar is about 13.5 times the concentration of the buffer. In certain aspects, the concentration of the sugar is 13.5 times the concentration of the buffer.

In certain aspects, the composition further comprises a surfactant. In certain aspects, the surfactant is polysorbate. In certain aspects, the polysorbate is polysorbate 20. In certain aspects, the concentration of the polysorbate is about 0.025% to about 0.075% weight/volume (w/v). In certain aspects, the composition further comprises a surfactant. In certain aspects, the surfactant is polysorbate. In certain aspects, the polysorbate is polysorbate 20. In certain aspects, the concentration of the polysorbate is 0.025% to 0.075% weight/volume (w/v). In certain aspects, the concentration of the polysorbate is about 0.035% to about 0.065% weight/volume (w/v). In certain aspects, the concentration of the polysorbate is 0.035% to 0.065% weight/volume (w/v). In certain aspects, the concentration of the polysorbate is about 0.005% weight/volume (w/v). In certain aspects, the concentration of the polysorbate is 0.005% weight/volume (w/v).

In certain aspects, the concentration of the antibody or antigen-binding fragment thereof (including acidic and basic variants thereof) is about 5 mg/ml to about 30 mg/ml. In certain aspects, the concentration of the antibody or antigen-binding fragment thereof (including acidic and basic variants thereof) is 5 mg/ml to 30 mg/ml. In certain aspects, the concentration of the antibody or antigen-binding fragment thereof (including acidic and basic variants thereof) is about 10 to about 25 mg/ml. In certain aspects, the concentration of the antibody or antigen-binding fragment thereof (including acidic and basic variants thereof) is 10 to 25 mg/ml. In certain aspects, the concentration of the antibody or antigen-binding fragment thereof (including acidic and basic variants thereof) is about 20 mg/ml. In certain aspects, the concentration of the antibody or antigen-binding fragment thereof (including acidic and basic variants thereof) is 20 mg/ml.

In certain aspects, the pH of the composition is about 5.0 to about 6.0. In certain aspects, the pH of the composition is 5.0 to 6.0. In certain aspects, the pH is about 5. In certain aspects, the pH is 5. In certain aspects, the pH is about 5.5. In certain aspects, the pH is 5.5.

In certain aspects, the composition is a liquid. In certain aspects, the composition is for parenteral administration. In certain aspects, the composition is for intravenous administration.

In certain aspects, the buffer is acetate and the excipient is sucrose. In certain aspects, the composition comprises about 20 mM acetate, about 270 mM sucrose, about 20 mg/ml of the antibody or antigen-binding fragment thereof, and about 0.05% polysorbate 20, wherein the pH is about 5.0. In certain aspects, the composition comprises a concentration of sucrose that is about 13.5 times the concentration of acetate, about 20 mg/ml of the antibody or antigen-binding fragment thereof, and about 0.05% polysorbate 20, wherein the pH is about 5.0. In certain aspects, the composition comprises 20 mM acetate, 270 mM sucrose, 20 mg/ml of the antibody or antigen-binding fragment thereof, and 0.05% polysorbate 20, wherein the pH is 5.0. In certain aspects, the composition comprises a concentration of sucrose that is 13.5 times the concentration of acetate, 20 mg/ml of the antibody or antigen-binding fragment thereof, and 0.05% polysorbate 20, wherein the pH is 5.0.

In certain aspects, the buffer is citrate and the excipient is sucrose. In certain aspects, the composition comprises about 20 mM citrate, about 270 mM sucrose, about 20 mg/ml of the antibody or antigen-binding fragment thereof, and about 0.05% polysorbate 20, wherein the pH is about 5.5. In certain aspects, the composition comprises a concentration of sucrose that is about 13.5 times the concentration of citrate, about 20 mg/ml of the antibody or antigen-binding fragment thereof, and about 0.05% polysorbate 20, wherein the pH is about 5.5. In certain aspects, the composition comprises 20 mM citrate, 270 mM sucrose, 20 mg/ml of the antibody or antigen-binding fragment thereof, and 0.05% polysorbate 20, wherein the pH is 5.5. In certain aspects, the composition comprises a concentration of sucrose that is 13.5 times the concentration of citrate, 20 mg/ml of the antibody or antigen-binding fragment thereof, and 0.05% polysorbate 20, wherein the pH is 5.5.

In certain aspects, the antibody comprises a VH comprising the amino acid sequence set forth in SEQ ID NO:11 and/or a VL comprising the amino acid sequence set forth in SEQ ID NO:12. In certain aspects, the antibody or antigen-binding fragment thereof comprises a heavy chain comprising the amino acid sequence set forth in SEQ ID NO:21 and/or a light chain comprising the amino acid sequence set forth in SEQ ID NO:22.

In certain aspects, at least 95% of the antibodies or antigen-binding fragments thereof in the composition are afucosylated. In certain aspects, fucosylation is undetectable in the composition.

In certain aspects, the composition comprises a full length antibody.

In certain aspects, the composition comprises an antigen-binding fragment. In certain aspects, the antigen-binding fragment comprises a Fab, Fab', F(ab')$_2$, single chain Fv (scFv), disulfide linked Fv, V-NAR domain, IgNar, intrabody, IgGΔCH2, minibody, F(ab')$_3$, tetrabody, triabody, diabody, single-domain antibody, DVD-Ig, Fcab, mAb$^2$, (scFv)$_2$, or scFv-Fc.

In certain aspects, the antibody or antigen-binding fragment thereof specifically binds to cynomolgus monkey B7-H4. In certain aspects, the antibody or antigen-binding fragment thereof specifically binds to rat B7-H4. In certain aspects, the antibody or antigen-binding fragment thereof specifically binds to mouse B7-H4.

In certain aspects, the antibody or antigen-binding fragment thereof specifically binds to the IgV domain of human B7-H4.

In certain aspects, the pI of the antibody or antigen-binding fragment thereof is about 8.2. In certain aspects, the pI of the antibody or antigen-binding fragment thereof is 8.2.

In certain aspects, a pharmaceutical composition consists of (i) an antibody comprising a heavy chain comprising the amino acid sequence set forth in SEQ ID NO:21 and/or a light chain comprising the amino acid sequence set forth in SEQ ID NO:22, (ii) about 20 mM acetate, (iii) about 270 mM sucrose, and (iv) about 0.05% weight/volume polysorbate 20, wherein the pH of the composition is about 5.0. In certain aspects, a pharmaceutical composition consists of (i) an antibody comprising a heavy chain comprising the amino acid sequence set forth in SEQ ID NO:21 and/or a light chain comprising the amino acid sequence set forth in SEQ ID NO:22, (ii) 20 mM acetate, (iii) 270 mM sucrose, and (iv) 0.05% weight/volume polysorbate 20, wherein the pH of the composition is 5.0.

In certain aspects, a pharmaceutical composition consists of (i) an antibody comprising a heavy chain comprising the amino acid sequence set forth in SEQ ID NO:21 and/or a light chain comprising the amino acid sequence set forth in SEQ ID NO:22, (ii) about 20 mM citrate, (iii) about 270 mM sucrose, and (iv) about 0.05% weight/volume polysorbate 20, wherein the pH of the composition is about 5.5. In certain aspects, a pharmaceutical composition consists of (i) an antibody comprising a heavy chain comprising the amino acid sequence set forth in SEQ ID NO:21 and/or a light chain comprising the amino acid sequence set forth in SEQ ID NO:22, (ii) 20 mM citrate, (iii) 270 mM sucrose, and (iv) 0.05% weight/volume polysorbate 20, wherein the pH of the composition is 5.5.

In certain aspects, a syringe or vial comprises a pharmaceutical composition provided herein.

In certain aspects, a method of treating a B7-H4 expressing cancer in a subject comprises administering to the subject a pharmaceutical composition provided herein. In certain aspects, the cancer is a solid tumor. In certain aspects, the cancer is selected from the group consisting of breast cancer, ductal carcinoma, endometrial carcinoma, ovarian cancer, non-small cell lung cancer, pancreatic cancer, thyroid cancer, kidney cancer, and bladder cancer. In certain aspects, the breast cancer is triple negative breast cancer or hormone receptor positive breast cancer. In certain aspects, the non-small cell lung cancer is squamous cell carcinoma.

In certain aspects, the subject is human.

In certain aspects, the pharmaceutical composition is administered parenterally. In certain aspects, the pharmaceutical composition is administered intravenously.

4. BRIEF DESCRIPTION OF THE FIGURES

FIG. 1 shows the unfolding temperature (Tm1) of the B7-H4 antibody "20502" (afucosylated) under different pH conditions measured by the UNit system. (See Example 3.)

FIG. 2 shows the impact of buffer pH on aggregate formation of the B7-H4 antibody "20502" (afucosylated) at 40° C. as determined by size-exclusion high-performance liquid chromatography (SE-HPLC). The formulation for each pH is listed in Table 13. The percentage of high molecular weight (HMW) was about 0 at TO for all pHs tested. (See Example 3.)

FIG. 3 shows the impact of buffer pH on fragment formation at 40° C. as determined by SE-HPLC. The formulation for each pH is listed in Table 13. The percentage of low molecular weight (LMW) was about 0 at TO for all pHs tested. (See Example 3.)

FIG. 4 shows the impact of buffer pH on aggregate formation (as determined by SE-HPLC) at 40° C. in formulations containing 20 mM citrate, 270 mM sucrose, and 0.05% polysorbate 20 (PS20). (See Example 4.)

FIG. 5 shows the impact of buffer pH on fragment formation (as determined by SE-HPLC) at 40° C. in formulations containing 20 mM citrate, 270 mM sucrose, and 0.05% PS20. The percentage of LMW was about 0 at TO for all pHs tested. (See Example 4.)

5. DETAILED DESCRIPTION

Figure 1:
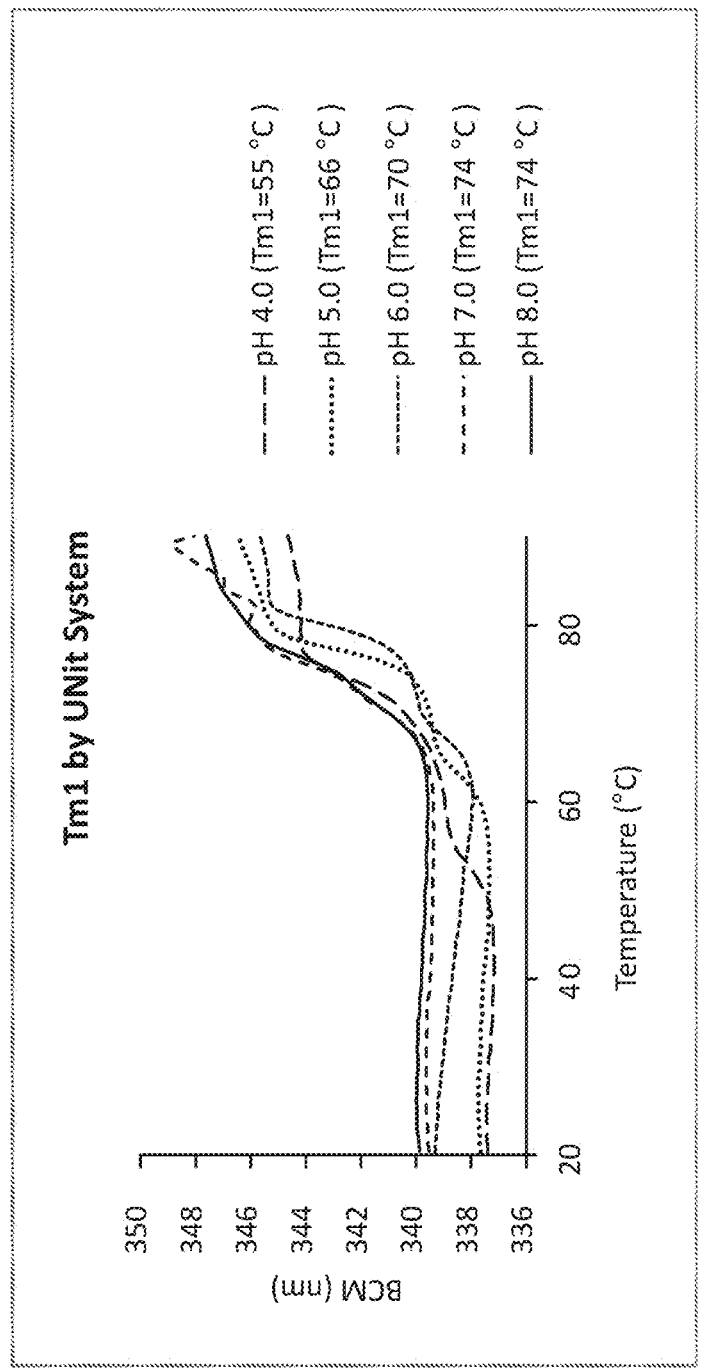

Provided herein are pharmaceutical compositions comprising an antibody or antigen-binding fragment thereof that specifically binds to human B7-H4. The pharmaceutical compositions can be stable e.g., under long-term storage conditions, through repeated freeze-thaw cycles (e.g., at least 5 cycles), and/or through agitation.

As provided herein, a pharmaceutical composition comprising a B7-H4 antibody or antigen-binding fragment thereof can have a pH of about 4.5 to about 6, a B7-H4 antibody or antigen-binding fragment thereof (e.g., at a concentration of about 5 to about 25 mg/ml), a buffer (including but not limited to acetate or citrate), an excipient (including but not limited to sucrose, trehalose, and sorbitol), and/or a surfactant (including but not limited to polysorbate, e.g., polysorbate 20 (PS20)).

In a particular embodiment, a liquid aqueous pharmaceutical composition containing 20 mg/mL of an anti-B7-H4 antibody (e.g., afucosylated antibody 20502) in 20 mM acetate, 270 mM sucrose, and 0.05% PS20 with a pH of 5.0 is provided herein. In another particular embodiment, a liquid aqueous pharmaceutical composition containing 20 mg/mL of an anti-B7-H4 antibody (e.g., afucosylated antibody 20502) in 20 mM citrate, 270 mM sucrose, and 0.05% PS20 with a pH of 5.5 is provided herein.

The pharmaceutical compositions provided herein can be useful for treating conditions such as cancer.

5.1 Terminology

As used herein, the term "B7-H4" refers to mammalian B7-H4 polypeptides including, but not limited to, native B7-H4 polypeptides and isoforms of B7-H4 polypeptides. "B7-H4" encompasses full-length, unprocessed B7-H4 polypeptides as well as forms of B7-H4 polypeptides that result from processing within the cell. A "B7-H4 polynucleotide," "B7-H4 nucleotide," or "B7-H4 nucleic acid" refer to a polynucleotide encoding B7-H4.

The term "antibody" means an immunoglobulin molecule that recognizes and specifically binds to a target, such as a protein, polypeptide, peptide, carbohydrate, polynucleotide, lipid, or combinations of the foregoing through at least one antigen recognition site within the variable region of the immunoglobulin molecule. As used herein, the term "antibody" encompasses intact polyclonal antibodies, intact monoclonal antibodies, chimeric antibodies, humanized antibodies, human antibodies, fusion proteins comprising an antibody, and any other modified immunoglobulin molecule so long as the antibodies exhibit the desired biological activity. An antibody can be of any the five major classes of immunoglobulins: IgA, IgD, IgE, IgG, and IgM, or subclasses (isotypes) thereof (e.g. IgG1, IgG2, IgG3, IgG4, IgA1 and IgA2), based on the identity of their heavy-chain constant domains referred to as alpha, delta, epsilon, gamma, and mu, respectively. The different classes of immunoglobulins have different and well known subunit structures and three-dimensional configurations. Antibodies can be naked or conjugated to other molecules such as toxins, radioisotopes, etc.

The term "antibody fragment" refers to a portion of an intact antibody. An "antigen-binding fragment," "antigen-binding domain," or "antigen-binding region," refers to a portion of an intact antibody that binds to an antigen. An antigen-binding fragment can contain an antigenic recognition site of an intact antibody (e.g., complementarity determining regions (CDRs) sufficient to specifically bind antigen). Examples of antigen-binding fragments of antibodies include, but are not limited to Fab, Fab', F(ab')2, and Fv fragments, linear antibodies, and single chain antibodies. An antigen-binding fragment of an antibody can be derived from any animal species, such as rodents (e.g., mouse, rat, or hamster) and humans or can be artificially produced.

The terms "anti-B7-H4 antibody," "B7-H4 antibody" and "antibody that binds to B7-H4" refer to an antibody that is capable of specifically binding B7-H4 with sufficient affinity such that the antibody is useful as a diagnostic and/or therapeutic agent in targeting B7-H4. As used herein, the terms "specifically binding," "immunospecifically binding," "immunospecifically recognizing," and "specifically recognizing" are analogous terms in the context of antibodies or antigen-binding fragments thereof. These terms indicate that the antibody or antigen-binding fragment thereof binds to an epitope via its antigen-binding domain and that the binding entails some complementarity between the antigen binding domain and the epitope. Accordingly, an antibody that "specifically binds" to human B7-H4 (SEQ ID NO:1) may also bind to B7-H4 from other species (e.g., cynomolgus monkey, mouse, and/or rat B7-H4) and/or B7-H4 proteins produced from other human alleles, but the extent of binding to an un-related, non-B7-H4 protein (e.g., other B7 protein family members such as PD-L1) is less than about 10% of the binding of the antibody to B7-H4 as measured, e.g., by a radioimmunoassay (RIA). In a specific embodiment, an antibody or antigen-binding fragment thereof for use in a formulation provided herein specifically binds to human, cynomolgus monkey, mouse, and rat B7-H4.

A "monoclonal" antibody or antigen-binding fragment thereof refers to a homogeneous antibody or antigen-binding fragment population involved in the highly specific recognition and binding of a single antigenic determinant, or epitope. This is in contrast to polyclonal antibodies that typically include different antibodies directed against different antigenic determinants. The term "monoclonal" antibody or antigen-binding fragment thereof encompasses both intact and full-length monoclonal antibodies as well as antibody fragments (such as Fab, Fab', F(ab')2, Fv), single chain (scFv) mutants, fusion proteins comprising an antibody portion, and any other modified immunoglobulin molecule comprising an antigen recognition site. Furthermore, "monoclonal" antibody or antigen-binding fragment thereof refers to such antibodies and antigen-binding fragments thereof made in any number of manners including but not limited to by hybridoma, phage selection, recombinant expression, and transgenic animals.

As used herein, the terms "variable region" or "variable domain" are used interchangeably and are common in the art. The variable region typically refers to a portion of an antibody, generally, a portion of a light or heavy chain, typically about the amino-terminal 110 to 120 amino acids or 110 to 125 amino acids in the mature heavy chain and about 90 to 115 amino acids in the mature light chain, which differ in sequence among antibodies and are used in the binding and specificity of a particular antibody for its particular antigen. The variability in sequence is concentrated in those regions called complementarity determining regions (CDRs) while the more highly conserved regions in the variable domain are called framework regions (FR). Without wishing to be bound by any particular mechanism or theory, it is believed that CDRs of the light and heavy chains are primarily responsible for the interaction and specificity of the antibody with antigen. In certain embodiments, the variable region is a human variable region. In certain embodiments, the variable region comprises rodent or murine CDRs and human framework regions (FRs). In particular embodiments, the variable region is a primate (e.g., non-human primate) variable region. In certain embodiments, the variable region comprises rodent or murine CDRs and primate (e.g., non-human primate) framework regions (FRs).

The terms "VL" and "VL domain" are used interchangeably to refer to the light chain variable region of an antibody.

The terms "VH" and "VH domain" are used interchangeably to refer to the heavy chain variable region of an antibody.

The term "Kabat numbering" and like terms are recognized in the art and refer to a system of numbering amino acid residues in the heavy and light chain variable regions of an antibody or an antigen-binding fragment thereof. In certain aspects, CDRs can be determined according to the Kabat numbering system (see, e.g., Kabat E A & Wu T T (1971) Ann NY Acad Sci 190: 382-391 and Kabat E A et al., (1991) Sequences of Proteins of Immunological Interest, Fifth Edition, U.S. Department of Health and Human Services, NIH Publication No. 91-3242). Using the Kabat numbering system, CDRs within an antibody heavy chain molecule are typically present at amino acid positions 31 to 35, which optionally can include one or two additional amino acids, following 35 (referred to in the Kabat numbering scheme as 35A and 35B) (CDR1), amino acid positions 50 to 65 (CDR2), and amino acid positions 95 to 102 (CDR3). Using the Kabat numbering system, CDRs within an antibody light chain molecule are typically present at amino acid positions 24 to 34 (CDR1), amino acid positions 50 to 56 (CDR2), and amino acid positions 89 to 97 (CDR3). In a specific embodiment, the CDRs of the antibodies described herein have been determined according to the Kabat numbering scheme.

Chothia refers instead to the location of the structural loops (Chothia and Lesk, J. Mol. Biol. 196:901-917 (1987)). The end of the Chothia CDR-H1 loop when numbered using the Kabat numbering convention varies between H32 and H34 depending on the length of the loop (this is because the Kabat numbering scheme places the insertions at H35A and H35B; if neither 35A nor 35B is present, the loop ends at 32; if only 35A is present, the loop ends at 33; if both 35A and 35B are present, the loop ends at 34). The AbM hypervariable regions represent a compromise between the Kabat CDRs and Chothia structural loops, and are used by Oxford Molecular's AbM antibody modeling software.

| Loop | Kabat | AbM | Chothia |
|---|---|---|---|
| L1 | L24-L34 | L24-L34 | L24-L34 |
| L2 | L50-L56 | L50-L56 | L50-L56 |

| Loop | Kabat | AbM | Chothia |
|---|---|---|---|
| L3 | L89-L97 | L89-L97 | L89-L97 |
| H1 | H31-H35B | H26-H35B | H26-H32 . . . 34 |
| | | | (Kabat Numbering) |
| H1 | H31-H35 | H26-H35 | H26-H32 |
| | | | (Chothia Numbering) |
| H2 | H50-H65 | H50-H58 | H52-H56 |
| H3 | H95-H102 | H95-H102 | H95-H102 |

As used herein, the term "constant region" and "constant domain" are interchangeable and have their common meanings in the art. The constant region is an antibody portion, e.g., a carboxyl terminal portion of a light and/or heavy chain which is not directly involved in binding of an antibody to antigen but which can exhibit various effector functions, such as interaction with the Fc receptor. The constant region of an immunoglobulin molecule generally has a more conserved amino acid sequence relative to an immunoglobulin variable domain. In certain aspects, an antibody or antigen-binding fragment comprises a constant region or portion thereof that is sufficient for antibody-dependent cell-mediated cytotoxicity (ADCC).

As used herein, the term "heavy chain" when used in reference to an antibody can refer to any distinct type, e.g., alpha (α), delta (δ), epsilon (ε), gamma (γ), and mu (μ), based on the amino acid sequence of the constant domain, which give rise to IgA, IgD, IgE, IgG, and IgM classes of antibodies, respectively, including subclasses of IgG, e.g., IgG1, IgG2, IgG3, and IgG4. Heavy chain amino acid sequences are well known in the art. In specific embodiments, the heavy chain is a human heavy chain.

As used herein, the term "light chain" when used in reference to an antibody can refer to any distinct type, e.g., kappa (κ) or lambda (λ) based on the amino acid sequence of the constant domains. Light chain amino acid sequences are well known in the art. In specific embodiments, the light chain is a human light chain.

The term "chimeric" antibodies or antigen-binding fragments thereof refers to antibodies or antigen-binding fragments thereof wherein the amino acid sequence is derived from two or more species. Typically, the variable region of both light and heavy chains corresponds to the variable region of antibodies or antigen-binding fragments thereof derived from one species of mammals (e.g. mouse, rat, rabbit, etc.) with the desired specificity, affinity, and capability while the constant regions are homologous to the sequences in antibodies or antigen-binding fragments thereof derived from another (usually human) to avoid eliciting an immune response in that species.

The term "humanized" antibody or antigen-binding fragment thereof refers to forms of non-human (e.g. murine) antibodies or antigen-binding fragments that are specific immunoglobulin chains, chimeric immunoglobulins, or fragments thereof that contain minimal non-human (e.g., murine) sequences. Typically, humanized antibodies or antigen-binding fragments thereof are human immunoglobulins in which residues from the complementary determining region (CDR) are replaced by residues from the CDR of a non-human species (e.g. mouse, rat, rabbit, hamster) that have the desired specificity, affinity, and capability ("CDR grafted") (Jones et al., Nature 321:522-525 (1986); Riechmann et al., Nature 332:323-327 (1988); Verhoeyen et al., Science 239:1534-1536 (1988)). In some instances, certain Fv framework region (FR) residues of a human immunoglobulin are replaced with the corresponding residues in an antibody or fragment from a non-human species that has the desired specificity, affinity, and capability. The humanized antibody or antigen-binding fragment thereof can be further modified by the substitution of additional residues either in the Fv framework region and/or within the non-human CDR residues to refine and optimize antibody or antigen-binding fragment thereof specificity, affinity, and/or capability. In general, the humanized antibody or antigen-binding fragment thereof will comprise variable domains containing all or substantially all of the CDR regions that correspond to the non-human immunoglobulin whereas all or substantially all of the FR regions are those of a human immunoglobulin consensus sequence. The humanized antibody or antigen-binding fragment thereof can also comprise at least a portion of an immunoglobulin constant region or domain (Fc), typically that of a human immunoglobulin. Examples of methods used to generate humanized antibodies are described in U.S. Pat. No. 5,225,539; Roguska et al., Proc. Natl. Acad. Sci., USA, 91(3):969-973 (1994), and Roguska et al., Protein Eng. 9(10):895-904 (1996). In some embodiments, a "humanized antibody" is a resurfaced antibody.

The term "human" antibody or antigen-binding fragment thereof means an antibody or antigen-binding fragment thereof having an amino acid sequence derived from a human immunoglobulin gene locus, where such antibody or antigen-binding fragment is made using any technique known in the art. This definition of a human antibody or antigen-binding fragment thereof includes intact or full-length antibodies and fragments thereof.

An "afucosylated" antibody or antigen-binding fragment thereof or an antibody or antigen-binding fragment thereof "lacking fucose" refers to an IgG1 or IgG3 isotype antibody or antigen-binding fragment thereof that lacks fucose in its constant region glycosylation. Glycosylation of human IgG1 or IgG3 occurs at Asn297 as core fucosylated biantennary complex oligosaccharide glycosylation terminated with up to 2 Gal residues. In some embodiments, an afucosylated antibody lacks fucose at Asn297. These structures are designated as G0, G1 (a 1,6 or a 1,3), or G2 glycan residues, depending on the amount of terminal Gal residues. See, e.g., Raju, T. S., BioProcess Int. 1: 44-53 (2003). CHO type glycosylation of antibody Fc is described, e.g., in Routier, F. F L, Glycoconjugate J. 14: 201-207 (1997).

Methods of measuring fucose include any methods known in the art. For purposes herein, fucose is detected by the method described in Example 1 of WO2015/017600, which is herein incorporated by reference in its entirety. Briefly, glycan analysis is performed by releasing glycans from the antibody (e.g., by enzymatic release), labeling the glycans with anthranilic acid (2-AA), and then purifying the labeled glycans. Normal phase HPLC with fluorescent detection is used to separate the glycans and measure the relative amount of each glycan in the antibody. The glycans may be positively identified as lacking or including fucose by mass spectrometry. In some embodiments, fucose is undetectable in a composition comprising a plurality of afucosylated antibodies or antigen-binding fragments thereof. In some embodiments, an afucosylated antibody or antigen-binding fragment thereof has enhanced ADCC activity, which may be measured by the assay provided in Example 12 herein. In some embodiments, an afucosylated antibody or antigen-binding fragment thereof has enhanced affinity for Fc gamma RIIIA In some embodiments, an afucosylated antibody or antigen-binding fragment thereof has enhanced affinity for Fc gamma RIIIA(V158). In some embodiments, an afucosylated antibody or antigen-binding fragment thereof has enhanced affinity for Fc gamma RIIIA(F158). Affinity for Fc gamma RIIIA or its alleles may be measure by the assay provided in Example 10 herein.

"Binding affinity" generally refers to the strength of the sum total of non-covalent interactions between a single binding site of a molecule (e.g., an antibody or antigen-binding fragment thereof) and its binding partner (e.g., an antigen). Unless indicated otherwise, as used herein, "binding affinity" refers to intrinsic binding affinity which reflects a 1:1 interaction between members of a binding pair (e.g., antibody or antigen-binding fragment thereof and antigen). The affinity of a molecule X for its partner Y can generally be represented by the dissociation constant (KD). Affinity can be measured and/or expressed in a number of ways known in the art, including, but not limited to, equilibrium dissociation constant (KD), and equilibrium association constant (KA). The KD is calculated from the quotient of $k_{off}/k_{on}$, whereas KA is calculated from the quotient of $k_{on}/k_{off}$. $k_{on}$ refers to the association rate constant of, e.g., an antibody or antigen-binding fragment thereof to an antigen, and $k_{off}$ refers to the dissociation of, e.g., an antibody or antigen-binding fragment thereof from an antigen. The $k_{on}$ and $k_{off}$ can be determined by techniques known to one of ordinary skill in the art, such as BIAcore® or KinExA.

As used herein, an "epitope" is a term in the art and refers to a localized region of an antigen to which an antibody or antigen-binding fragment thereof can specifically bind. An epitope can be, for example, contiguous amino acids of a polypeptide (linear or contiguous epitope) or an epitope can, for example, come together from two or more non-contiguous regions of a polypeptide or polypeptides (conformational, non-linear, discontinuous, or non-contiguous epitope). In certain embodiments, the epitope to which an antibody or antigen-binding fragment thereof specifically binds can be determined by, e.g., NMR spectroscopy, X-ray diffraction crystallography studies, ELISA assays, hydrogen/deuterium exchange coupled with mass spectrometry (e.g., liquid chromatography electrospray mass spectrometry), array-based oligo-peptide scanning assays, and/or mutagenesis mapping (e.g., site-directed mutagenesis mapping). For X-ray crystallography, crystallization may be accomplished using any of the known methods in the art (e.g., Giegé R et al., (1994) Acta Crystallogr D Biol Crystallogr 50(Pt 4): 339-350; McPherson A (1990) Eur J Biochem 189: 1-23; Chayen N E (1997) Structure 5: 1269-1274; McPherson A (1976) J Biol Chem 251: 6300-6303). Antibody/antigen-binding fragment thereof: antigen crystals can be studied using well known X-ray diffraction techniques and can be refined using computer software such as X-PLOR (Yale University, 1992, distributed by Molecular Simulations, Inc.; see, e.g., Meth Enzymol (1985) volumes 114 & 115, eds Wyckoff H W et al.; U.S. 2004/0014194), and BUSTER (Bricogne G (1993) Acta Crystallogr D Biol Crystallogr 49(Pt 1): 37-60; Bricogne G (1997) Meth Enzymol 276A: 361-423, ed Carter C W; Roversi P et al., (2000) Acta Crystallogr D Biol Crystallogr 56(Pt 10): 1316-1323). Mutagenesis mapping studies can be accomplished using any method known to one of skill in the art. See, e.g., Champe M et al., (1995) J Biol Chem 270: 1388-1394 and Cunningham B C & Wells J A (1989) Science 244: 1081-1085 for a description of mutagenesis techniques, including alanine scanning mutagenesis techniques.

A polypeptide, antibody, polynucleotide, vector, cell, or composition which is "isolated" is a polypeptide, antibody, polynucleotide, vector, cell, or composition which is in a form not found in nature. Isolated polypeptides, antibodies, polynucleotides, vectors, cell or compositions include those which have been purified to a degree that they are no longer in a form in which they are found in nature. In some embodiments, an antibody, polynucleotide, vector, cell, or composition which is isolated is substantially pure. As used herein, "substantially pure" refers to material which is at least 50% pure (i.e., free from contaminants), at least 90% pure, at least 95% pure, at least 98% pure, or at least 99% pure.

The terms "polypeptide," "peptide," and "protein" are used interchangeably herein to refer to polymers of amino acids of any length. The polymer can be linear or branched, it can comprise modified amino acids, and it can be interrupted by non-amino acids. The terms also encompass an amino acid polymer that has been modified naturally or by intervention; for example, disulfide bond formation, glycosylation, lipidation, acetylation, phosphorylation, or any other manipulation or modification, such as conjugation with a labeling component. Also included within the definition are, for example, polypeptides containing one or more analogs of an amino acid (including, for example, unnatural amino acids, etc.), as well as other modifications known in the art. It is understood that, because the polypeptides of this invention are based upon antibodies, in certain embodiments, the polypeptides can occur as single chains or associated chains.

As used herein, the term "host cell" can be any type of cell, e.g., a primary cell, a cell in culture, or a cell from a cell line. In specific embodiments, the term "host cell" refers to a cell transfected with a nucleic acid molecule and the progeny or potential progeny of such a cell. Progeny of such a cell may not be identical to the parent cell transfected with the nucleic acid molecule, e.g., due to mutations or environmental influences that may occur in succeeding generations or integration of the nucleic acid molecule into the host cell genome.

The term "pharmaceutical formulation" or "pharmaceutical composition" refers to a preparation which is in such form as to permit the biological activity of the active ingredient to be effective, and which contains no additional components which are unacceptably toxic to a subject to which the formulation would be administered. The formulation can be sterile.

The term "drug product" refers to a finished dosage form, e.g., a liquid formulation containing a drug substance, generally, but not necessarily, in association with one or more other ingredients.

The term "drug substance" refers to an active ingredient, e.g., a B7-H4 antibody or antigen-binding fragment thereof (e.g., afucosylated antibody 20502) that is intended to furnish pharmacological or biological activity or other direct effect in the diagnosis, cure, mitigation, treatment, or prevention of disease, but does not include intermediates used in the synthesis of such ingredient.

As used herein, "buffer" refers to a component in a solution that allows the solution to resist changes in pH b. Buffers include, for example, acetate, citrate, succinate, and histidine.

A "stable" formulation is one in which the active ingredient (e.g., a B7-H4 antibody or antigen-binding fragment thereof) therein substantially retains its physical stability and/or chemical stability and/or biological activity upon storage. Stability can be measured at a selected condition (e.g., temperature) for a selected time period. Formulations provided herein can be stable at room temperature (about 25° C.) for at least 6 months and/or stable at about 2-8° C. for at least 1 year. Formulations provided herein can also be stable following freezing (to, e.g., −70° C.) and thawing of the formulation, hereinafter referred to as a "freeze/thaw cycle." Formulations provided herein can also be stable after agitation.

The terms "administer", "administering", "administration", and the like, as used herein, refer to methods that may be used to enable delivery of a drug, e.g., an anti-B7-H4 antibody or antigen-binding fragment thereof to the desired site of biological action (e.g., intravenous administration). Administration techniques that can be employed with the agents and methods described herein are found in e.g., Goodman and Gilman, The Pharmacological Basis of Therapeutics, current edition, Pergamon; and Remington's, Pharmaceutical Sciences, current edition, Mack Publishing Co., Easton, Pa.

As used herein, the terms "subject" and "patient" are used interchangeably. The subject can be an animal. In some embodiments, the subject is a mammal such as a non-human animal (e.g., cow, pig, horse, cat, dog, rat, mouse, monkey or other primate, etc.). In some embodiments, the subject is a cynomolgus monkey. In some embodiments, the subject is a human.

The term "therapeutically effective amount" refers to an amount of a drug, e.g., an anti-B7-H4 antibody or antigen-binding fragment thereof effective to treat a disease or disorder in a subject. In the case of cancer, the therapeutically effective amount of the drug can reduce the number of cancer cells; reduce the tumor size or burden; inhibit, to some extent, cancer cell infiltration into peripheral organs; inhibit, to some extent, tumor metastasis; inhibit, to some extent, tumor growth; relieve, to some extent, one or more of the symptoms associated with the cancer; and/or result in a favorable response such as increased progression-free survival (PFS), disease-free survival (DFS), overall survival (OS), complete response (CR), partial response (PR), or, in some cases, stable disease (SD), a decrease in progressive disease (PD), a reduced time to progression (TTP), or any combination thereof. To the extent the drug can prevent growth and/or kill existing cancer cells, it can be cytostatic and/or cytotoxic.

Terms such as "treating," "treatment," "to treat," "alleviating," and "to alleviate" refer to therapeutic measures that cure, slow down, lessen symptoms of, and/or halt progression of a pathologic condition or disorder. Thus, those in need of treatment include those already diagnosed with or suspected of having the disorder. In certain embodiments, a subject is successfully "treated" for cancer according to the methods of the present invention if the patient shows one or more of the following: a reduction in the number of or complete absence of cancer cells; a reduction in the tumor size; inhibition of or an absence of cancer cell infiltration into peripheral organs including, for example, the spread of cancer into soft tissue and bone; inhibition or an absence of tumor metastasis; inhibition or an absence of tumor growth; relief of one or more symptoms associated with the specific cancer; reduced morbidity and mortality; improvement in quality of life; reduction in tumorigenicity, tumorigenic frequency, or tumorigenic capacity, of a tumor; reduction in the number or frequency of cancer stem cells in a tumor; differentiation of tumorigenic cells to a non-tumorigenic state; increased progression-free survival (PFS), disease-free survival (DFS), overall survival (OS), complete response (CR), partial response (PR), stable disease (SD), a decrease in progressive disease (PD), a reduced time to progression (TTP), or any combination thereof.

The terms "cancer" and "cancerous" refer to or describe the physiological condition in mammals in which a population of cells are characterized by unregulated cell growth.

Examples of cancer include, but are not limited to, gynecological cancers (e.g., breast cancer (including triple negative breast cancer, ductal carcinoma, ovarian cancer, and endometrial cancer), non-small cell lung cancer, pancreatic cancer, thyroid cancer, kidney cancer (e.g., renal cell carcinoma) and bladder cancer (e.g., urothelial cell carcinoma). The cancer can be a "cancer that expresses B7-H4" or a "B7-H4 expressing cancer." Such terms refer to a cancer comprising cells that express B7-H4. The cancer may be a primary tumor or may be advanced or metastatic cancer.

A "refractory" cancer is one that progresses even though an anti-tumor treatment, such as a chemotherapy, is administered to the cancer patient.

A "recurrent" cancer is one that has regrown, either at the initial site or at a distant site, after a response to initial therapy.

A "relapsed" patient is one who has signs or symptoms of cancer after remission. Optionally, the patient has relapsed after adjuvant or neoadjuvant therapy.

As used in the present disclosure and claims, the singular forms "a," "an," and "the" include plural forms unless the context clearly dictates otherwise.

It is understood that wherever embodiments are described herein with the language "comprising," otherwise analogous embodiments described in terms of "consisting of" and/or "consisting essentially of" are also provided. In this disclosure, "comprises," "comprising," "containing" and "having" and the like can have the meaning ascribed to them in U.S. patent law and can mean "includes," "including," and the like; "consisting essentially of" or "consists essentially" likewise has the meaning ascribed in U.S. patent law and the term is open-ended, allowing for the presence of more than that which is recited so long as basic or novel characteristics of that which is recited are not changed by the presence of more than that which is recited, but excludes prior art embodiments Unless specifically stated or obvious from context, as used herein, the term "or" is understood to be inclusive. The term "and/or" as used in a phrase such as "A and/or B" herein is intended to include both "A and B," "A or B," "A," and "B." Likewise, the term "and/or" as used in a phrase such as "A, B, and/or C" is intended to encompass each of the following embodiments: A, B, and C; A, B, or C; A or C; A or B; B or C; A and C; A and B; B and C; A (alone); B (alone); and C (alone).

As used herein, the terms "about" and "approximately," when used to modify a numeric value or numeric range, indicate that deviations of 5% to 10% above and 5% to 10% below the value or range remain within the intended meaning of the recited value or range.

Any compositions or methods provided herein can be combined with one or more of any of the other compositions and methods provided herein.

5.2 Pharmaceutical Compositions Comprising B7-H4 Antibodies

Provided herein are pharmaceutical compositions (e.g., aqueous pharmaceutical compositions) comprising an anti-B7-H4 antibody or an antigen-binding fragment thereof (e.g., as discussed in Section 5.3 below).

In certain embodiments, a pharmaceutical composition provided herein is stable to multiple freeze-thaw cycles. A freeze-thaw cycle can comprise freezing the pharmaceutical composition (e.g., at a temperature of about −70° C.) and then thawing the pharmaceutical composition (e.g., at room temperature). The pharmaceutical composition can be stable through at least five freeze-thaw cycles. The freeze-thaw cycles (e.g., the at least five freeze-thaw cycles) can result in no change in appearance, soluble aggregates, or subvisible particulate matter.

In certain embodiments, a pharmaceutical composition provided herein is stable through agitation. The agitation can comprise shaking (e.g. at about 300 rotations per minute on an orbital shaker) for about three days at room temperature. The agitation can result in no change in appearance, soluble aggregates, charge variant profiles, or subvisible particulate matter.

In certain embodiments, a pharmaceutical composition provided herein is stable under long-term storage conditions. The long-term storage conditions can comprise storage at about 5° C. (e.g., about 2° C. to about 8° C.) for about 6 months or about 1 year. The long-term storage conditions can comprise storage at about 25° C. for about 6 months or about 1 year. The long-term storage conditions can comprise storage at about 40° C. for about 3 months, about 6 months or about 1 year.

In certain embodiments, a pharmaceutical composition provided herein is stable to multiple (e.g., at least five) freeze-thaw cycles, stable through agitation, and/or stable under long-term storage conditions.

In certain embodiments, a pharmaceutical composition provided herein is stable when stored at about −70° C. and when stored at about 2° C. to about 8° C. for about 1 year.

In certain embodiments, the pharmaceutical composition can contain an B7-H4 antibody or an antigen-binding fragment thereof. In certain embodiments, the concentration of the B7-H4 antibody or antigen-binding fragment thereof (including acidic and basic variants thereof) in the formulation is about 5 mg/ml to about 30 mg/ml. In certain embodiments, the concentration of the B7-H4 antibody or antigen-binding fragment thereof (including acidic and basic variants thereof) in the pharmaceutical composition is about 10 mg/ml to about 25 mg/ml. In certain embodiments, the concentration of the B7-H4 antibody or antigen-binding fragment thereof (including acidic and basic variants thereof) in the pharmaceutical composition is about 20 mg/ml.

In certain embodiments, the concentration of the B7-H4 antibody or antigen-binding fragment thereof (including acidic and basic variants thereof) in the formulation is 5 mg/ml to 30 mg/ml. In certain embodiments, the concentration of the B7-H4 antibody or antigen-binding fragment thereof (including acidic and basic variants thereof) in the pharmaceutical composition is 10 mg/ml to 25 mg/ml. In certain embodiments, the concentration of the B7-H4 antibody or antigen-binding fragment (including acidic and basic variants thereof) thereof in the pharmaceutical composition is 20 mg/ml.

As provided herein, the pharmaceutical composition can contain a buffer. In certain embodiments, the buffer is acetate. In certain embodiments, the buffer is citrate. In certain embodiments, the concentration of the buffer (e.g., acetate or citrate) is about 15 mM to about 25 mM. In certain embodiments, the concentration of the buffer (e.g., acetate or citrate) is about 18 mM to about 22 mM. In certain embodiments, the concentration of the buffer (e.g., acetate or citrate) is about 20 mM.

In certain embodiments, the concentration of the buffer (e.g., acetate or citrate) is 15 mM to 25 mM. In certain embodiments, the concentration of the buffer (e.g., acetate or citrate) is 18 mM to 22 mM. In certain embodiments, the concentration of the buffer (e.g., acetate or citrate) is 20 mM.

As provided herein, the pharmaceutical composition can contain an excipient, for example, a sugar such as sucrose, sorbitol, or trehalose. In some embodiments, the concentration of the excipient (e.g., sucrose) is about 225 mM to about 300 mM. In some embodiments, the concentration of the excipient (e.g., sucrose) is about 250 mM to about 290 mM. In some embodiments, the concentration of the excipient (e.g., sucrose) is about 270.

In some embodiments, the concentration of the excipient (e.g., sucrose) is 225 mM to mM. In some embodiments, the concentration of the excipient (e.g., sucrose) is 250 mM to 290 mM. In some embodiments, the concentration of the excipient (e.g., sucrose) is 270.

As provided herein, the pharmaceutical composition can contain a buffer (e.g. acetate or citrate) and an excipient such as a sugar (e.g., sucrose). In some embodiments, the concentration of the excipient such as a sugar (e.g., sucrose) is about 10 to about 15 times the concentration of the buffer (e.g., acetate or citrate). In some embodiments, the concentration of the excipient such as a sugar (e.g., sucrose) is about 13.5 times the concentration of the buffer (e.g., acetate or citrate).

In some embodiments, the concentration of the excipient such as a sugar (e.g., sucrose) is 10 to 15 times the concentration of the buffer (e.g., acetate or citrate). In some embodiments, the concentration of the excipient such as a sugar (e.g., sucrose) is 13.5 times the concentration of the buffer (e.g., acetate or citrate).

As provided herein, the pharmaceutical composition can contain a surfactant, for example, a polysorbate. The polysorbate can be, e.g., polysorbate 20 (PS20). In some embodiments, the concentration of the surfactant (e.g., PS20) is about 0.025-0.075% weight by volume (w/v). In some embodiments, the concentration of the surfactant (e.g., PS20) is about 0.035 to about 0.065% w/v. In some embodiments, the concentration of the surfactant (e.g., PS20) is about 0.05% w/v.

In some embodiments, the concentration of the surfactant (e.g., PS20) is 0.025-0.075% weight by volume (w/v). In some embodiments, the concentration of the surfactant (e.g., PS20) is 0.035 to 0.065% w/v. In some embodiments, the concentration of the surfactant (e.g., PS20) is 0.05% w/v.

As provided herein, in some embodiments, the pharmaceutical composition has a pH of about 4.5 to about 6. In some embodiments, the pH of the pharmaceutical composition is about 5 to about 6. In some embodiments, the pH of the pharmaceutical composition is about 5. In some embodiments, the pH of the pharmaceutical composition is about 5.5. In some embodiments, the pH of the pharmaceutical composition is about 6.

In some embodiments, the pharmaceutical composition has a pH of 4.5 to 6. In some embodiments, the pH of the pharmaceutical composition is 5 to 6. In some embodiments, the pH of the pharmaceutical composition is 5. In some embodiments, the pH of the pharmaceutical composition is 5.5. In some embodiments, the pH of the pharmaceutical composition is 6.

As provided herein, the pharmaceutical composition can be a liquid. The pharmaceutical composition (e.g., liquid pharmaceutical composition) can be for parenteral administration, e.g., for intravenous administration.

In one embodiment, the pharmaceutical composition comprises about 5 mg/mL to about 30 mg/mL of a B7-H4 antibody or fragment thereof (e.g., afucosylated antibody 20502) in about 15 mM to about 25 mM acetate, about 225 mM to about 300 mM sucrose, and about 0.025% to about 0.075% PS20. In one embodiment, the pharmaceutical composition has a pH of about 4.5 to about 6, e.g., about 5. In one embodiment, the pharmaceutical composition is a liquid.

In one embodiment, the pharmaceutical composition comprises 5 mg/mL to 30 mg/mL of a B7-H4 antibody or fragment thereof (e.g., afucosylated antibody 20502) in 15 mM to 25 mM acetate, 225 mM to 300 mM sucrose, and 0.025% to 0.075% PS20. In one embodiment, the pharmaceutical composition has a pH of 4.5 to 6, e.g., 5. In one embodiment, the pharmaceutical composition is a liquid.

In one embodiment, the pharmaceutical composition comprises about 10 mg/mL to about 25 mg/mL of a B7-H4 antibody or fragment thereof (e.g., afucosylated antibody 20502) in about 18 mM to about 22 mM acetate, about 250 mM to about 290 mM sucrose, and about 0.035% to about 0.065% PS20. In one embodiment, the pharmaceutical composition has a pH of about 4.5 to about 6, e.g., about 5. In one embodiment, the pharmaceutical composition is a liquid.

In one embodiment, the pharmaceutical composition comprises 10 mg/mL to 25 mg/mL of a B7-H4 antibody or fragment thereof (e.g., afucosylated antibody 20502) in 18 mM to 22 mM acetate, 250 mM to 290 mM sucrose, and 0.035% to 0.065% PS20. In one embodiment, the pharmaceutical composition has a pH of 4.5 to 6, e.g., 5. In one embodiment, the pharmaceutical composition is a liquid.

In one embodiment, the pharmaceutical composition comprises 20 mg/mL of a B7-H4 antibody or fragment thereof (e.g., afucosylated antibody 20502) in 20 mM acetate, 270 mM sucrose, and 0.05% PS20. In one embodiment, the pharmaceutical composition has a pH of 5.0. In one embodiment, the pharmaceutical composition is a liquid.

In one embodiment, the pharmaceutical composition comprises about 5 mg/mL to about 30 mg/mL of a B7-H4 antibody or fragment thereof (e.g., afucosylated antibody 20502) in about 15 mM to about 25 mM citrate, about 225 mM to about 300 mM sucrose, and about 0.025% to about 0.075% PS20. In one embodiment, the pharmaceutical composition has a pH of about 4.5 to about 6, e.g. about 5.5. In one embodiment, the pharmaceutical composition is a liquid.

In one embodiment, the pharmaceutical composition comprises 5 mg/mL to 30 mg/mL of a B7-H4 antibody or fragment thereof (e.g., afucosylated antibody 20502) in 15 mM to 25 mM citrate, 225 mM to 300 mM sucrose, and 0.025% to 0.075% PS20. In one embodiment, the pharmaceutical composition has a pH of 4.5 to 6, e.g. 5.5. In one embodiment, the pharmaceutical composition is a liquid.

In one embodiment, the pharmaceutical composition comprises about 10 mg/mL to about 25 mg/mL of a B7-H4 antibody or fragment thereof (e.g., afucosylated antibody 20502) in about 18 mM to about 22 mM citrate, about 250 mM to about 290 mM sucrose, and about 0.035% to about 0.065% PS20. In one embodiment, the pharmaceutical composition has a pH of about 4.5 to about 6, e.g. about 5.5. In one embodiment, the pharmaceutical composition is a liquid.

In one embodiment, the pharmaceutical composition comprises 10 mg/mL to 25 mg/mL of a B7-H4 antibody or fragment thereof (e.g., afucosylated antibody 20502) in 18 mM to 22 mM citrate, 250 mM to 290 mM sucrose, and 0.035% to 0.065% PS20. In one embodiment, the pharmaceutical composition has a pH of 4.5 to 6, e.g. 5.5. In one embodiment, the pharmaceutical composition is a liquid.

In one embodiment, the liquid pharmaceutical composition comprises 20 mg/mL of an antibody or fragment thereof (e.g., afucosylated antibody 20502) in 20 mM citrate, 270 mM sucrose, and 0.05% PS20. In one embodiment, the liquid pharmaceutical composition has a pH of 5.5.

In some embodiments, a pharmaceutical composition comprises an antibody or antigen-binding fragment thereof that specifically binds to human B7-H4 (e.g., afucosylated antibody 20502), wherein the composition comprises no more than 40% of acidic variants of the antibody or antigen-binding fragment thereof and/or no more than 20% of basic variants of the antibody or antigen-binding fragment thereof after 6 months at 5° C.

In some embodiments, a pharmaceutical composition comprises an antibody or antigen-binding fragment thereof that specifically binds to human B7-H4 (e.g., afucosylated antibody 20502), wherein the composition comprises about 30% to about 45%, about 30% to about 40%, or about 35% to about 40% acidic variants of the antibody or antigen-binding fragment thereof and/or about 11% to about 16%, about 10% to about 17%, or about 9% to about 18% of basic variants of the antibody or antigen-binding fragment thereof after 6 months at 5° C. In some embodiments, a pharmaceutical composition comprises an antibody or antigen-binding fragment thereof that specifically binds to human B7-H4 (e.g., afucosylated antibody 20502), wherein the composition comprises 30% to 45%, 30% to 40%, or 35% to 40% acidic variants of the antibody or antigen-binding fragment thereof and/or 11% to 16%, 10% to 17%, or 9% to 18% of basic variants of the antibody or antigen-binding fragment thereof after 6 months at 5° C.

In some embodiments, a pharmaceutical composition comprises an antibody or antigen-binding fragment thereof that specifically binds to human B7-H4, wherein the composition comprises no more than 60% or 55% of acidic and basic variants of the antibody or antigen-binding fragment thereof after 6 months at 5° C. In some embodiments, the composition also comprises no more than 40% of acidic variants and/or no more than 20% of basic variants of the antibody or antigen-binding fragment thereof after 6 months at 5° C.

In some embodiments, pharmaceutical compositions are provided, wherein the pharmaceutical composition comprises afucosylated anti-B7-H4 antibodies or antigen-binding fragments thereof and a pharmaceutically acceptable carrier. In specific embodiments, pharmaceutical compositions are provided, wherein the pharmaceutical composition comprises afucosylated anti-B7-H4 antibodies or antigen-binding fragments e.g., wherein at least 80% of the antibodies in the composition are afucosylated. In specific embodiments, pharmaceutical compositions are provided, wherein the pharmaceutical composition comprises afucosylated anti-B7-H4 antibodies or antigen-binding fragments e.g., wherein at least 85% of the antibodies in the composition are afucosylated. In specific embodiments, pharmaceutical compositions are provided, wherein the pharmaceutical composition comprises afucosylated anti-B7-H4 antibodies or antigen-binding fragments e.g., wherein at least 90% of the antibodies in the composition are afucosylated. In specific embodiments, pharmaceutical compositions are provided, wherein the pharmaceutical composition comprises afucosylated anti-B7-H4 antibodies or antigen-binding fragments e.g., wherein at least 95% of the antibodies in the composition are afucosylated. In specific embodiments, pharmaceutical compositions are provided, wherein the pharmaceutical composition comprises afucosylated anti-B7-H4 antibodies or antigen-binding fragments e.g., wherein at least 96% of the antibodies in the composition are afucosylated. In specific embodiments, pharmaceutical compositions are provided, wherein the pharmaceutical composition comprises afucosylated anti-B7-H4 antibodies or antigen-binding fragments e.g., wherein at least 97% of the antibodies in the composition are afucosylated. In specific embodiments, pharmaceutical compositions are provided, wherein the pharmaceutical composition comprises afucosylated anti-B7-H4 antibodies or antigen-binding fragments e.g., wherein at least 98% of the antibodies in the composition are afucosylated. In specific embodiments, pharmaceutical compositions are provided, wherein the pharmaceutical composition comprises afucosylated anti-B7-H4 antibodies or antigen-binding fragments e.g., wherein at least 99% of the antibodies in the composition are afucosylated. In specific embodiments, pharmaceutical compositions are provided, wherein the pharmaceutical composition comprises afucosylated anti-B7-H4 antibodies or antigen-binding fragments wherein fucose is undetectable in the composition.

In some embodiments, pharmaceutical compositions are provided, wherein the pharmaceutical composition comprises (i) an isolated antibody or antigen-binding fragment thereof that specifically binds to human B7-H4, comprising (a) the heavy chain variable region (VH) complementarity determining region (CDR) 1, VH CDR2, VH CDR3 and light chain variable region (VL) CDR1, CDR2, and CDR3 sequences of SEQ ID NOs:5-10, respectively, (b) a variable heavy chain region comprising the amino acid sequence of SEQ ID NO:11 and a variable light chain region comprising the amino acid sequence of SEQ ID NO:12, or (c) a heavy chain comprising the amino acid sequence of SEQ ID NO:21 and a light chain comprising the amino acid sequence of SEQ ID NO:22, and (ii) a pharmaceutically acceptable excipient.

Also provided herein is a pharmaceutical composition, wherein the pharmaceutical composition comprises (i) antibodies or antigen-binding fragments thereof that specifically bind to human B7-H4 and comprise the heavy chain variable region (VH) complementarity determining region (CDR) 1, VH CDR2, VH CDR3 and light chain variable region (VL) CDR1, CDR2, and CDR3 sequences of SEQ ID NOs:5-10, respectively and (ii) a pharmaceutically acceptable excipient, wherein at least 80%, at least 85%, at least 90%, at least 95%, at least 96%, at least 97%, at least 98%, or at least 99% of the antibodies or antigen-binding fragments thereof in the composition are afucosylated. In one embodiment, (i) the antibody or antigen-binding fragment thereof comprises a variable heavy chain region comprising the amino acid sequence of SEQ ID NO:11 and a variable light chain region comprising the amino acid sequence of SEQ ID NO:12 or (ii) the antibody comprises a heavy chain comprising the amino acid sequence of SEQ ID NO:21 and a light chain comprising the amino acid sequence of SEQ ID NO:22.

5.3 B7-H4 Antibodies

Provided herein are pharmaceutical compositions comprising antibodies (e.g., monoclonal antibodies, such as chimeric, humanized, or human antibodies) and antigen-binding fragments thereof which specifically bind to B7-H4 (e.g., human B7-H4). Exemplary B7-H4 antibodies and antigen-binding fragments thereof that can be used in the pharmaceutical compositions provided herein are known in the art. The amino acid sequences for human, cynomolgus monkey, murine, and rat B7-H4 are known in the art and also provided herein as represented by SEQ ID NOs:1-4, respectively.

Human B7-H4:
(SEQ ID NO: 1)
MASLGQILFWSIISIIIILAGAIALIIGFGISGRHSITVTTVASAGNIGE

DGILSCTFEPDIKLSDIVIQWLKEGVLGLVHEFKEGKDELSEQDEMFRGR

TAVFADQVIVGNASLRLKNVQLTDAGTYKCYIITSKGKGNANLEYKTGAF

SMPEVNVDYNASSETLRCEAPRWFPQPTVVWASQVDQGANFSEVSNTSFE

LNSENVTMKVVSVLYNVTINNTYSCMIENDIAKATGDIKVTESEIKRRSH

LQLLNSKASLCVSSFFAISWALLPLSPYLMLK

Cynomolgus monkey B7-H4:
(SEQ ID NO: 2)
MASLGQILFWSIISIIFILAGAIALIIGFGISGRHSITVTTVASAGNIGE

DGILSCTFEPDIKLSDIVIQWLKEGVIGLVHEFKEGKDELSEQDEMFRGR

TAVFADQVIVGNASLRLKNVQLTDAGTYKCYIITSKGKGNANLEYKTGAF

SMPEVNVDYNASSETLRCEAPRWFPQPTVVWASQVDQGANFSEVSNTSFE

LNSENVTMKVVSVLYNVTINNTYSCMIENDIAKATGDIKVTESEIKRRSH

LQLLNSKASLCVSSFLAISWALLPLAPYLMLK

Murine B7-H4
(SEQ ID NO: 3)
MASLGQIIFWSIINIIILAGAIALIIGFGISGKHFITVTTFTSAGNIGE

DGTLSCTFEPDIKLNGIVIQWLKEGIKGLVHEFKEGKDDLSQQHEMFRGR

TAVFADQVVVGNASLRLKNVQLTDAGTYTCYIRTSKGKGNANLEYKTGAF

SMPEINVDYNASSESLRCEAPRWFPQPTVAWASQVDQGANFSEVSNTSFE

LNSENVTMKVVSVLYNVTINNTYSCMIENDIAKATGDIKVTDSEVKRRSQ

LQLLNSGPSPCVFSSAFVAGWALLSLSCCLMLR

Rat B7-H4
(SEQ ID NO: 4)
MASLGQIIFWSIINVIIILAGAIVLIIGFGISGKHFITVTTFTSAGNIGE

DGTLSCTFEPDIKLNGIVIQWLKEGIKGLVHEFKEGKDDLSQQHEMFRGR

TAVFADQVVVGNASLRLKNVQLTDAGTYTCYIHTSKGKGNANLEYKTGAF

SMPEINVDYNASSESLRCEAPRWFPQPTVAWASQVDQGANFSEVSNTSFE

LNSENVTMKVVSVLYNVTINNTYSCMIENDIAKATGDIKVTDSEVKRRSQ

LELLNSGPSPCVSSVSAAGWALLSLSCCLMLR

In certain embodiments, an antibody or antigen-binding fragment thereof in the pharmaceutical compositions provided herein specifically binds to human B7-H4. In certain embodiments, an antibody or antigen-binding fragment thereof in the pharmaceutical compositions provided herein specifically binds to human and cynomolgus monkey B7-H4. In certain embodiments, an antibody or antigen-binding fragment thereof in the pharmaceutical compositions provided herein specifically binds to human, murine, and rat B7-H4. In certain embodiments, an antibody or antigen-binding fragment thereof in the pharmaceutical compositions provided herein to human, cynomolgus monkey, murine, and rat B7-H4.

B7-H4 contains an IgC ectodomain (amino acids 153-241 of SEQ ID NO:1) and an IgV ectodomain (amino acids 35-146 of SEQ ID NO:1). In certain embodiments, an antibody or antigen-binding fragment thereof in the pharmaceutical compositions provided herein specifically binds to the IgV domain of human B7-H4. Accordingly, provided herein are pharmaceutical compositions comprising antibodies and antigen-binding fragments thereof that specifically bind to a polypeptide consisting of amino acids 35-146 of SEQ ID NO:1.

In certain embodiments, an antibody or antigen-binding fragment thereof in the pharmaceutical compositions provided herein specifically binds to human B7-H4 and comprises the six CDRs of the 20502 antibody listed as provided in Tables 1 and 2.

TABLE 1

VH CDR Amino Acid Sequences[1]

| Antibody | VH CDR1 (SEQ ID NO:) | VH CDR2 (SEQ ID NO:) | VH CDR3 (SEQ ID NO:) |
|---|---|---|---|
| 20502 | GSIKSGSYYWG (SEQ ID NO: 5) | NIYYSGSTYYNPSLRS (SEQ ID NO: 6) | AREGSYPNQFDP (SEQ ID NO: 7) |

[1]The VH CDRs in Table 1 are determined according to Kabat.

TABLE 2

VL CDR Amino Acid Sequences[2]

| Antibody | VL CDR1 (SEQ ID NO:) | VL CDR2 (SEQ ID NO:) | VL CDR3 (SEQ ID NO:) |
|---|---|---|---|
| 20502 | RASQSVSSNLA (SEQ ID NO: 8) | GASTRAT (SEQ ID NO: 9) | QQYHSFPFT (SEQ ID NO: 10) |

[2]The VL CDRs in Table 2 are determined according to Kabat.

In certain embodiments, an antibody or antigen-binding fragment thereof in the pharmaceutical compositions provided herein specifically binds to human B7-H4 and comprises the VH of the 20502 antibody listed in Table 3.

TABLE 3

Variable Heavy Chain (VH) Amino Acid Sequences

| Antibody | VH Amino Acid Sequence (SEQ ID NO) |
|---|---|
| 20502 | QLQLQESGPGLVKPSETLSLTCTVSGGSIKSGSYYWGWIRQPPGKGLEWIGNIYYSGSTYYNPSLRSRVTISVDTSKNQFSLKLSSVTAADTAVYYCAREGSYPNQFDPWGQGTLVTVSS (SEQ ID NO: 11) |

In certain embodiments, an antibody or antigen-binding fragment thereof in the pharmaceutical compositions provided herein specifically binds to human B7-H4 and comprises the VL of the 20502 listed in Table 4.

TABLE 4

Variable Light Chain (VL) Amino Acid Sequences

| Antibody | VL Amino Acid Sequence (SEQ ID NO) |
|---|---|
| 20502 | EIVMTQSPATLSVSPGERATLSCRASQSVSSNLAWYQQKPGQAPRLLIYGASTRATGIPARFSGSGSGTEFTLTISSLQSEDFAVYYCQQYHSFPFTFGGGTKVEIK (SEQ ID NO: 12) |

In certain embodiments, an antibody or antigen-binding fragment thereof in the pharmaceutical compositions provided herein specifically binds to human B7-H4 and comprises the VH and the VL of the 20502 antibody listed in Tables 3 and 4.

In certain embodiments, an antibody or antigen-binding fragment thereof in the pharmaceutical compositions provided herein specifically binds to human B7-H4 and comprises the VH framework regions of the 20502 antibody listed in Table 5.

TABLE 5

VH FR Amino Acid Sequences[3]

| Antibody | VH FR1 (SEQ ID NO:) | VH FR2 (SEQ ID NO:) | VH FR3 (SEQ ID NO:) | VH FR4 (SEQ ID NO:) |
|---|---|---|---|---|
| 20502 | QLQLQESGPGLV KPSETLSLTCTV SG (SEQ ID NO: 13) | WIRQPPG KGLEWIG (SEQ ID NO: 14) | RVTISVDT SKNQFSLK LSSVTAAD TAVYYC (SEQ ID NO: 15) | WGQGTLVT VSS (SEQ ID NO: 16) |

[3]The VH framework regions described in Table 5 are determined based upon the boundaries of the Kabat numbering system for CDRs. Accordingly, the VH CDRs are determined by Kabat and the framework regions are the amino acid residues surrounding the CDRs in the variable region in the format FR1, CDR1, FR2, CDR2, FR3, CDR3, and FR4.

In certain embodiments, an antibody or antigen-binding fragment thereof in the pharmaceutical compositions provided herein specifically binds to human B7-H4 and comprises the VL framework regions of the 20502 antibody listed in Table 6.

TABLE 6

VL FR Amino Acid Sequences[4]

| Anti-body | VL FR1 (SEQ ID NO:) | VL FR2 (SEQ ID NO:) | VL FR3 (SEQ ID NO:) | VL FR4 (SEQ ID NO:) |
|---|---|---|---|---|
| 20502 | EIVMTQSPAT LSVSPGERAT LSC (SEQ ID NO: 17) | WYQQKPGQ APRLLIY (SEQ ID NO: 18) | GIPARFSG SGSGTEFTL TISSLQSED FAVYYC (SEQ ID NO: 19) | FGGGTKV EIK (SEQ ID NO: 20) |

[4]The VL framework regions described in Table 6 are determined based upon the boundaries of the Kabat numbering system for CDRs. Accordingly, the VL CDRs are determined by Kabat and the framework regions are the amino acid residues surrounding the CDRs in the variable region in the format FR1, CDR1, FR2, CDR2, FR3, CDR3, and FR4.

In certain embodiments, an antibody or antigen-binding fragment thereof in the pharmaceutical compositions provided herein specifically binds to human B7-H4 and comprises the four VH framework regions and the four VL framework regions of the 20502 antibody listed in Tables 5 and 6.

In certain embodiments, an antibody or antigen-binding fragment thereof in the pharmaceutical compositions provided herein specifically binds to human B7-H4 and comprises the heavy chain sequence of the 20502 antibody listed in Table 7.

TABLE 7

Full-length heavy chain amino acid sequences

| Antibody | Full-Length Heavy Chain Amino Acid Sequence (SEQ ID NO) |
|---|---|
| 20502 | QLQLQESGPGLVKPSETLSLTCTVSGGSIKSGSYYWGWIRQP PGKGLEWIGNIYYSGSTYYNPSLRSRVTISVDTSKNQFSLKL SSVTAADTAVYYCAREGSYPNQFDPWGQGTLVTVSSASTKGP SVFPLAPSSKSTSGGTAALGCLVKDYFPEPVTVSWNSGALTS GVHTFPAVLQSSGLYSLSSVVTVPSSSLGTQTYICNVNHKPS NTKVDKKVEPKSCDKTHTCPPCPAPELLGGPSVFLFPPKPKD |

TABLE 7-continued

Full-length heavy chain amino acid sequences

| Antibody | Full-Length Heavy Chain Amino Acid Sequence (SEQ ID NO) |
|---|---|
| | TLMISRTPEVTCVVVDVSHEDPEVKFNWYVDGVEVHNAKTKP REEQYNSTYRVVSVLTVLHQDWLNGKEYKCKVSNKALPAPIE KTISKAKGQPREPQVYTLPPSRDELTKNQVSLTCLVKGFYPS DIAVEWESNGQPENNYKTTPPVLDSDGSFFLYSKLTVDKSRW QQGNVFSCSVMHEALHNHYTQKSLSLSPGK (SEQ ID NO: 21) |

In certain embodiments, an antibody or antigen-binding fragment thereof in the pharmaceutical compositions provided herein specifically binds to human B7-H4 and comprises the light chain sequence of the 20502 antibody listed in Table 8.

TABLE 8

Full-length light chain amino acid sequences

| Antibody | Full-Length Light Chain Amino Acid Sequence (SEQ ID NO) |
|---|---|
| 20502 | EIVMTQSPATLSVSPGERATLSCRASQSVSSNLAWYQQKPG QAPRLLIYGASTRATGIPARFSGSGSGTEFTLTISSLQSED FAVYYCQQYHSFPFTFGGGTKVEIKRTVAAPSVFIFPPSDE QLKSGTASVVCLLNNFYPREAKVQWKVDNALQSGNSQESVT EQDSKDSTYSLSSTLTLSKADYEKHKVYACEVTHQGLSSPV TKSFNRGEC (SEQ ID NO: 22) |

In certain embodiments, an antibody or antigen-binding fragment in the pharmaceutical compositions provided herein specifically binds to human B7-H4 and comprises the heavy chain sequence and the light chain sequence of the 20502 antibody listed in Tables 7 and 8.

In certain aspects, an antibody or antigen-binding fragment thereof in the pharmaceutical compositions provided herein is described by its VL domain alone, or its VH domain alone, or by its 3 VL CDRs alone, or its 3 VH CDRs alone. See, for example, Rader C et al., (1998) PNAS 95: 8910-8915, which is incorporated herein by reference in its entirety, describing the humanization of the mouse anti-αvβ3 antibody by identifying a complementing light chain or heavy chain, respectively, from a human light chain or heavy chain library, resulting in humanized antibody variants having affinities as high or higher than the affinity of the original antibody. See also Clackson T et al., (1991) Nature 352: 624-628, which is incorporated herein by reference in its entirety, describing methods of producing antibodies that specifically bind a specific antigen by using a specific VL domain (or VH domain) and screening a library for the complementary VH domain (or VL domain). The screen produced 14 new partners for a specific VH domain and 13 new partners for a specific VL domain, which were strong binders, as determined by ELISA. See also Kim S J & Hong H J, (2007) J Microbiol 45: 572-577, which is incorporated herein by reference in its entirety, describing methods of producing antibodies that specifically bind a specific antigen by using a specific VH domain and screening a library (e.g., human VL library) for complementary VL domains; the selected VL domains in turn could be used to guide selection of additional complementary (e.g., human) VH domains.

In certain aspects, the CDRs of an antibody or antigen-binding fragment thereof can be determined according to the Chothia numbering scheme, which refers to the location of immunoglobulin structural loops (see, e.g., Chothia C &

Lesk A M, (1987), J Mol Biol 196: 901-917; Al-Lazikani B et al., (1997) J Mol Biol 273: 927-948; Chothia C et al., (1992) J Mol Biol 227: 799-817; Tramontano A et al., (1990) J Mol Biol 215(1): 175-82; and U.S. Pat. No. 7,709,226). Typically, when using the Kabat numbering convention, the Chothia CDR-H1 loop is present at heavy chain amino acids 26 to 32, 33, or 34, the Chothia CDR-H2 loop is present at heavy chain amino acids 52 to 56, and the Chothia CDR-H3 loop is present at heavy chain amino acids 95 to 102, while the Chothia CDR-L1 loop is present at light chain amino acids 24 to 34, the Chothia CDR-L2 loop is present at light chain amino acids 50 to 56, and the Chothia CDR-L3 loop is present at light chain amino acids 89 to 97. The end of the Chothia CDR-H1 loop when numbered using the Kabat numbering convention varies between H32 and H34 depending on the length of the loop (this is because the Kabat numbering scheme places the insertions at H35A and H35B; if neither 35A nor 35B is present, the loop ends at 32; if only 35A is present, the loop ends at 33; if both 35A and 35B are present, the loop ends at 34).

In certain aspects, provided herein are pharmaceutical compositions comprising antibodies and antigen-binding fragments thereof that specifically bind to B7-H4 (e.g., human B7-H4) and comprise the Chothia VH and VL CDRs of the 20502 antibody listed in Tables 3 and 4. In certain embodiments, provided herein are pharmaceutical compositions comprising antibodies or antigen-binding fragments thereof that specifically bind to B7-H4 (e.g., human B7-H4) and comprise one or more CDRs, in which the Chothia and Kabat CDRs have the same amino acid sequence. In certain embodiments, provided herein are pharmaceutical compositions comprising antibodies and antigen-binding fragments thereof that specifically bind to B7-H4 (e.g., human B7-H4) and comprise combinations of Kabat CDRs and Chothia CDRs.

In certain aspects, the CDRs of an antibody or antigen-binding fragment thereof can be determined according to the IMGT numbering system as described in Lefranc M-P, (1999) The Immunologist 7: 132-136 and Lefranc M-P et al., (1999) Nucleic Acids Res 27: 209-212. According to the IMGT numbering scheme, VH-CDR1 is at positions 26 to 35, VH-CDR2 is at positions 51 to 57, VH-CDR3 is at positions 93 to 102, VL-CDR1 is at positions 27 to 32, VL-CDR2 is at positions 50 to 52, and VL-CDR3 is at positions 89 to 97. In a particular embodiment, provided herein are pharmaceutical compositions comprising antibodies and antigen-binding fragments thereof that specifically bind to B7-H4 (e.g., human B7-H4) and comprise the IMGT VH and VL CDRs of the 20502 antibody listed in Tables 3 and 4, for example, as described in Lefranc M-P (1999) supra and Lefranc M-P et al., (1999) supra.

In certain aspects, the CDRs of an antibody or antigen-binding fragment thereof can be determined according to MacCallum R M et al., (1996) J Mol Biol 262: 732-745. See also, e.g., Martin A. "Protein Sequence and Structure Analysis of Antibody Variable Domains," in *Antibody Engineering*, Kontermann and Dübel, eds., Chapter 31, pp. 422-439, Springer-Verlag, Berlin (2001). In a particular embodiment, provided herein are pharmaceutical compositions comprising antibodies or antigen-binding fragments thereof that specifically bind to B7-H4 (e.g., human B7-H4) and comprise VH and VL CDRs of the 20502 antibody listed in Tables 3 and 4 as determined by the method in MacCallum R M et al.

In certain aspects, the CDRs of an antibody or antigen-binding fragment thereof can be determined according to the AbM numbering scheme, which refers AbM hypervariable regions which represent a compromise between the Kabat CDRs and Chothia structural loops, and are used by Oxford Molecular's AbM antibody modeling software (Oxford Molecular Group, Inc.). In a particular embodiment, provided herein are pharmaceutical compositions comprising antibodies or antigen-binding fragments thereof that specifically bind to B7-H4 (e.g., human B7-H4) and comprise VH and VL CDRs of the 20502 antibody listed in Tables 3 and 4 as determined by the AbM numbering scheme.

In specific aspects, provided herein are pharmaceutical compositions comprising antibodies that comprise a heavy chain and a light chain.

With respect to the light chain, in a specific embodiment, the light chain of an antibody described herein is a kappa light chain. The constant region of a human kappa light chain can comprise the following amino acid sequence:

```
                                        (SEQ ID NO: 23)
RTVAAPSVFIFPPSDEQLKSGTASVVCLLNNFYPREAKVQWKVDNALQSG

NSQESVTEQDSKDSTYSLSSTLTLSKADYEKHKVYACEVTHQGLSSPVTK

SFNRGEC.
```

The constant region of a human kappa light chain can be encoded by the following nucleotide sequence:

```
                                        (SEQ ID NO: 24)
CGGACCGTGGCTGCACCATCTGTCTTCATCTTCCCGCCATCTGATGAGCA

GTTGAAATCTGGAACTGCCTCTGTTGTGTGCCTGCTGAATAACTTCTATC

CCAGAGAGGCCAAAGTACAGTGGAAGGTGGATAACGCCCTCCAATCGGGT

AACTCCCAGGAGAGTGTCACAGAGCAGGACAGCAAGGACAGCACCTACAG

CCTCAGCAGCACCCTGACGCTGAGCAAAGCAGACTACGAGAAACACAAAG

TCTACGCCTGCGAAGTCACCCATCAGGGCCTGAGCTCGCCCGTCACAAAG

AGCTTCAACAGGGGAGAGTGT.
```

In a particular embodiment, an antibody which immunospecifically binds to a B7-H4 polypeptide (e.g., human B7-H4) a pharmaceutical composition described herein comprises a light chain wherein the amino acid sequence of the VL domain comprises the sequence set forth in Table 4, and wherein the constant region of the light chain comprises the amino acid sequence of a human kappa light chain constant region.

In a particular embodiment, an antibody which immunospecifically binds to B7-H4 (e.g., human B7-H4) in a pharmaceutical composition described herein comprises a heavy chain wherein the amino acid sequence of the VH domain comprises the amino acid sequence set forth in Table 3 and wherein the constant region of the heavy chain comprises the amino acid sequence of a human gamma (γ) heavy chain constant region.

The constant region of a human IgG$_1$ heavy chain can comprise the following amino acid sequence:

```
                                        (SEQ ID NO: 25)
ASTKGPSVFPLAPSSKSTSGGTAALGCLVKDYFPEPVTVSWNSGALTSGV

HTFPAVLQSSGLYSLSSVVTVPSSSLGTQTYICNVNHKPSNTKVDKKVEP

KSCDKTHTCPPCPAPELLGGPSVFLFPPKPKDTLMISRTPEVTCVVVDVS

HEDPEVKFNWYVDGVEVHNAKTKPREEQYNSTYRVVSVLTVLHQDWLNGK
```

-continued

EYKCKVSNKALPAPIEKTISKAKGQPREPQVYTLPPSRDELTKNQVSLTC

LVKGFYPSDIAVEWESNGQPENNYKTTPPVLDSDGSFFLYSKLTVDKSRW

QQGNVFSCSVMHEALHNHYTQKSLSLSPGK.

The constant region of a human IgG₁ heavy chain can be encoded by the following nucleotide sequence:

(SEQ ID NO: 26)
GCCTCCACCAAGGGCCCATCGGTCTTCCCCCTGGCACCCTCCTCCAAGAG

CACCTCTGGGGGCACAGCGGCCCTGGGCTGCCTGGTCAAGGACTACTTCC

CCGAACCGGTGACGGTGTCGTGGAACTCAGGCGCCCTGACCAGCGGCGTG

CACACCTTCCCGGCTGTCCTACAGTCCTCAGGACTCTACTCCCTCAGCAG

CGTGGTGACCGTGCCCTCCAGCAGCTTGGGCACCCAGACCTACATCTGCA

ACGTGAATCACAAGCCCAGCAACACCAAGGTGGACAAGAAAGTTGAGCCC

AAATCTTGTGACAAAACTCACACATGCCCACCGTGCCCAGCACCTGAACT

CCTGGGGGGACCGTCAGTCTTCCTCTTCCCCCCAAAACCCAAGGACACCC

TCATGATCTCCCGGACCCCTGAGGTCACATGCGTGGTGGTGGACGTGAGC

CACGAAGACCCTGAGGTCAAGTTCAACTGGTACGTGGACGGCGTGGAGGT

GCATAATGCCAAGACAAAGCCGCGGGAGGAGCAGTACAACAGCACGTACC

GGGTGGTCAGCGTCCTCACCGTCCTGCACCAGGACTGGCTGAATGGCAAG

GAGTACAAGTGCAAGGTCTCCAACAAAGCCCTCCCAGCCCCCATCGAGAA

AACCATCTCCAAAGCCAAAGGGCAGCCCCGAGAACCACAGGTGTACACCC

TGCCCCCATCCCGGGATGAGCTGACCAAGAACCAGGTCAGCCTGACCTGC

CTGGTCAAAGGCTTCTATCCCAGCGACATCGCCGTGGAGTGGGAGAGCAA

TGGGCAGCCGGAGAACAACTACAAGACCACGCCTCCCGTGCTGGACTCCG

ACGGCTCCTTCTTCCTCTACAGCAAGCTCACCGTGGACAAGAGCAGGTGG

CAGCAGGGGAACGTCTTCTCATGCTCCGTGATGCATGAGGCTCTGCACAA

CCACTACACGCAGAAGAGCCTCTCCCTGTCTCCGGGTAAA.

In a specific embodiment, an antibody which immunospecifically binds to B7-H4 (e.g., human B7-H4) in a pharmaceutical composition described herein comprises a VH domain and a VL domain comprising an amino acid sequence of any VH and VL domain described herein, and wherein the constant regions comprise the amino acid sequences of the constant regions of an IgG (e.g., a human IgG) immunoglobulin molecule. In another specific embodiment, an antibody which immunospecifically binds to B7-H4 (e.g., human B7-H4) for use in a pharmaceutical composition described herein comprises a VH domain and a VL domain comprising an amino acid sequence of any VH and VL domain described herein, and wherein the constant regions comprise the amino acid sequences of the constant regions of an IgG₁ (e.g. human IgG₁) immunoglobulin molecule.

Antibodies with reduced fucose content have been reported to have an increased affinity for Fc receptors, such as, e.g., FcγRIIIA Accordingly, in certain embodiments, an antibody or antigen-binding fragment thereof in a pharmaceutical composition described herein has reduced fucose content or lacks fucose (i.e., is "afucosylated"). Such antibodies or antigen-binding fragments thereof can be produced using techniques known to one skilled in the art. For example, they can be expressed in cells deficient or lacking the ability to fucosylate. In a specific example, cell lines with a knockout of both alleles of the α1,6-fucosyltransferase gene (FUT8) can be used to produce antibodies or antigen-binding fragments thereof with reduced fucose content. The Potelligent® system (Lonza) is an example of such a system that can be used to produce antibodies and antigen-binding fragments thereof with reduced fucose content. Alternatively, antibodies or antigen-binding fragments thereof with reduced fucose content or no fucose content can be produced by, e.g.: (i) culturing cells under conditions which prevent or reduce fucosylation; (ii) posttranslational removal of fucose (e.g., with a fucosidase enzyme); (iii) post-translational addition of the desired carbohydrate, e.g., after recombinant expression of a non-glycosylated glycoprotein; or (iv) purification of the glycoprotein so as to select for antibodies or antigen-binding fragments thereof which are not fucosylated. See, e.g., Longmore G D & Schachter H (1982) Carbohydr Res 100: 365-92 and Imai-Nishiya H et al., (2007) BMC Biotechnol. 7: 84 for methods for producing antibodies thereof with no fucose content or reduced fucose content.

In some embodiments, an afucosylated B7-H4 antibody or antigen-binding fragment thereof has enhanced ADCC activity in vitro compared to fucosylated B7-H4 antibodies or antigen-binding fragments thereof having the same amino acid sequence. In some embodiments, the afucosylated B7-H4 antibodies or antigen-binding fragments thereof cause specific lysis that is at least 10, at least 15, at least 20, at least 25, at least 30, at least 35, at least 40, at least 45, at least 50, at least 60, at least 65, at least 70, or at least 75 percentage points greater than specific lysis with fucosylated B7-H4 antibodies.

In some embodiments, the B7-H4 antibody or antigen-binding fragment thereof has enhanced affinity for Fc gamma RIIIA compared to fucosylated B7-H4 antibodies or antigen-binding fragments thereof having the same amino acid sequence. In some embodiments, the afucosylated B7-H4 antibodies or antigen-binding fragments thereof bind to Fc gamma RIIIA with at least 2-fold, at least 3-fold, at least 4-fold, at least 5-fold, at least 7-fold, at least 10-fold, at least 12-fold, at least 15-fold, at least 17-fold, or at least 20-fold greater affinity than fucosylated B7-H4 antibodies or antigen-binding fragments thereof. In some embodiments, affinity for Fc gamma RIIIA is determined using surface plasmon resonance. In some embodiments, Fc gamma RIIIA is selected from Fc gamma RIIIA(V158) and Fc gamma RIIIA(F158). In some embodiments, Fc gamma RIIIA is Fc gamma RIIIA(V158).

In some embodiments, the presence of fucose can be determined by a method comprising high performance liquid chromatography (HPLC), capillary electrophoresis, or MALDI-TOF mass spectrometry.

In specific embodiments, an antibody or antigen-binding fragment thereof (i) comprises the CDR sequences of 20502, the VH and VL sequences of 20502, or the heavy and light chain sequences of 20502 and (ii) is afucosylated.

In specific embodiments, a composition comprises antibodies or antigen-binding fragments thereof that (i) comprises the CDR sequences of 20502, the VH and VL sequences of 20502, or the heavy and light chain sequences of 20502 and (ii) are afucosylated, e.g., wherein at least 95% of the antibodies in the composition are afucosylated or wherein fucosylation is undetectable in the composition.

Engineered glycoforms may be useful for a variety of purposes, including but not limited to enhancing or reducing effector function. Methods for generating engineered glycoforms in an antibody or antigen-binding fragment thereof described herein include but are not limited to those disclosed, e.g., in Umaña P et al., (1999) Nat Biotechnol 17: 176-180; Davies J et al., (2001) Biotechnol Bioeng 74: 288-294; Shields R L et al., (2002) J Biol Chem 277: 26733-26740; Shinkawa T et al., (2003) J Biol Chem 278: 3466-3473; Niwa R et al., (2004) Clin Cancer Res 1: 6248-6255; Presta L G et al., (2002) Biochem Soc Trans 30: 487-490; Kanda Y et el., (2007) Glycobiology 17: 104-118; U.S. Pat. Nos. 6,602,684; 6,946,292; and 7,214,775; U.S. Patent Publication Nos. US 2007/0248600; 2007/0178551; 2008/0060092; and 2006/0253928; International Publication Nos. WO 00/61739; WO 01/292246; WO 02/311140; and WO 02/30954; Potelligent™ technology (Biowa, Inc. Princeton, N.J.); and GlycoMAb® glycosylation engineering technology (Glycart biotechnology AG, Zurich, Switzerland). See also, e.g., Ferrara C et al., (2006) Biotechnol Bioeng 93: 851-861; International Publication Nos. WO 07/039818; WO 12/130831; WO 99/054342; WO 03/011878; and WO 04/065540.

In certain embodiments, any of the constant region mutations or modifications described herein can be introduced into one or both heavy chain constant regions of an antibody or antigen-binding fragment thereof described herein having two heavy chain constant regions.

In another particular embodiment, an antibody or antigen-binding fragment thereof described herein, which immunospecifically binds to B7-H4 (e.g., human B7-H4), comprises a heavy chain and a light chain, wherein (i) the heavy chain comprises a VH domain comprising the VH CDR1, VL CDR2, and VL CDR3 amino acid sequences of the 20502 antibody listed in Table 1; (ii) the light chain comprises a VL domain comprising the VL CDR1, VH CDR2, and VH CDR3 amino acid sequences of the 20502 antibody listed in Table 2; (iii) the heavy chain further comprises a constant heavy chain domain comprising the amino acid sequence of the constant domain of a human IgG$_1$ heavy chain; and (iv) the light chain further comprises a constant light chain domain comprising the amino acid sequence of the constant domain of a human kappa light chain.

In another particular embodiment, an antibody or antigen-binding fragment thereof described herein, which immunospecifically binds to B7-H4 (e.g., human B7-H4), comprises a heavy chain and a light chain, wherein (i) the heavy chain comprises a VH domain comprising the amino acid sequence of the VH domain of the 20502 antibody listed in Table 3; (ii) the light chain comprises a VL domain comprising the amino acid sequence of the VL domain of the 20502 antibody listed in Table 4; (iii) and the heavy chain further comprises a constant heavy chain domain comprising the amino acid sequence of the constant domain of a human IgG$_1$ heavy chain; and (iv) the light chain further comprises a constant light chain domain comprising the amino acid sequence of the constant domain of a human kappa light chain.

In specific embodiments, an antibody or antigen-binding fragment thereof described herein, which immunospecifically binds to B7-H4 (e.g., human B7-H4) exhibits T cell checkpoint blockade activity. In specific embodiments, an antibody or antigen-binding fragment thereof described herein, which immunospecifically binds to B7-H4 (e.g., human B7-H4) increases interferon-gamma (IFNγ) production in T cells. In specific embodiments, an antibody or antigen-binding fragment thereof described herein, which immunospecifically binds to B7-H4 (e.g., human B7-H4) increases T cell proliferation. In specific embodiments, an antibody or antigen-binding fragment thereof described herein, which immunospecifically binds to B7-H4 (e.g., human B7-H4) increases CD4+ T cell proliferation. In specific embodiments, an antibody or antigen-binding fragment thereof described herein, which immunospecifically binds to B7-H4 (e.g., human B7-H4) increases CD8+ T cell proliferation.

In specific embodiments, an antibody or antigen-binding fragment thereof described herein, which immunospecifically binds to B7-H4 (e.g., human B7-H4) exhibits antibody-dependent cellular cytotoxicity (ADCC) activity. In specific embodiments, an antibody or antigen-binding fragment thereof described herein, which immunospecifically binds to B7-H4 (e.g., human B7-H4) exhibits antibody-dependent cellular cytotoxicity (ADCC) activity on cell lines with at least 300,000 cell surface B7-H4 molecules (e.g., SK-BR-3 cells). In specific embodiments, an antibody or antigen-binding fragment thereof described herein, which immunospecifically binds to B7-H4 (e.g., human B7-H4) exhibits antibody-dependent cellular cytotoxicity (ADCC) activity on cell lines with at least 100,000 cell surface B7-H4 molecules (e.g., HCC1569 cells). In specific embodiments, an antibody or antigen-binding fragment thereof described herein, which immunospecifically binds to B7-H4 (e.g., human B7-H4) exhibits antibody-dependent cellular cytotoxicity (ADCC) activity on cell lines with at least 50,000 cell surface B7-H4 molecules (e.g., ZR-75-1 cells). In specific embodiments, an antibody or antigen-binding fragment thereof described herein, which immunospecifically binds to B7-H4 (e.g., human B7-H4) exhibits antibody-dependent cellular cytotoxicity (ADCC) activity on cell lines with at least 30,000 cell surface B7-H4 molecules (e.g., MDA-MB-468 cells). In specific embodiments, an antibody or antigen-binding fragment thereof described herein, which immunospecifically binds to B7-H4 (e.g., human B7-H4) exhibits antibody-dependent cellular cytotoxicity (ADCC) activity on cell lines with at least 15,000 cell surface B7-H4 molecules (e.g., HCC1964 cells).

In a specific aspect, an antigen-binding fragment as described herein, which immunospecifically binds to B7-H4 (e.g., human B7-H4), is selected from the group consisting of a Fab, Fab', F(ab')$_2$, and scFv, wherein the Fab, Fab', F(ab')$_2$, or scFv comprises a heavy chain variable region sequence and a light chain variable region sequence of an anti-B7-H4 antibody or antigen-binding fragment thereof as described herein. A Fab, Fab', F(ab')$_2$, or scFv can be produced by any technique known to those of skill in the art. In certain embodiments, the Fab, Fab', F(ab')$_2$, or scFv further comprises a moiety that extends the half-life of the antibody in vivo. The moiety is also termed a "half-life extending moiety." Any moiety known to those of skill in the art for extending the half-life of a Fab, Fab', F(ab')$_2$, or scFv in vivo can be used. For example, the half-life extending moiety can include a Fc region, a polymer, an albumin, or an albumin binding protein or compound. The polymer can include a natural or synthetic, optionally substituted straight or branched chain polyalkylene, polyalkenylene, polyoxylalkylene, polysaccharide, polyethylene glycol, polypropylene glycol, polyvinyl alcohol, methoxypolyethylene glycol, lactose, amylose, dextran, glycogen, or derivative thereof. Substituents can include one or more hydroxy, methyl, or methoxy groups. In certain embodiments, the Fab, Fab', F(ab')$_2$, or scFv can be modified by the addition of one or more C-terminal amino acids for attachment of the half-life extending moiety. In certain embodiments, the half-life extending moiety is polyethylene glycol or human serum albumin. In certain embodiments, the Fab, Fab', F(ab')$_2$, or scFv is fused to an Fc region.

5.4 Antibody Production and Polynucleotides

Antibodies and antigen-binding fragments thereof that immunospecifically bind to B7-H4 (e.g., human B7-H4) can be produced by any method known in the art for the synthesis of antibodies and antigen-binding fragments thereof, for example, by chemical synthesis or by recombinant expression techniques. The methods described herein employ, unless otherwise indicated, conventional techniques in molecular biology, microbiology, genetic analysis, recombinant DNA, organic chemistry, biochemistry, PCR, oligonucleotide synthesis and modification, nucleic acid hybridization, and related fields within the skill of the art. These techniques are described, for example, in the references cited herein and are fully explained in the literature. See, e.g., Sambrook J et al., (2001) Molecular Cloning: A Laboratory Manual, Cold Spring Harbor Laboratory Press, Cold Spring Harbor, NY; Ausubel F M et al., Current Protocols in Molecular Biology, John Wiley & Sons (1987 and annual updates); Current Protocols in Immunology, John Wiley & Sons (1987 and annual updates) Gait (ed.) (1984) Oligonucleotide Synthesis: A Practical Approach, IRL Press; Eckstein (ed.) (1991) Oligonucleotides and Analogues: A Practical Approach, IRL Press; Birren B et al., (eds.) (1999) Genome Analysis: A Laboratory Manual, Cold Spring Harbor Laboratory Press.

In certain aspects, provided herein are pharmaceutical compositions comprising an anti-B7-H4 antibody or antigen-binding fragment, wherein the antibodies or fragments are produced by recombinant expression of a polynucleotide comprising a nucleotide sequence in a host cell.

In certain aspects, the anti-B7-H4 antibody or antigen-binding fragment in the pharmaceutical compositions provided herein comprises a heavy chain variable region encoded by a polynucleotide comprising the nucleotide sequence shown in Table 9 (i.e. SEQ ID NO:27). In certain aspects, the anti-B7-H4 antibody or antigen-binding fragment in the pharmaceutical compositions provided herein comprises a heavy chain variable region encoded by a polynucleotide comprising the nucleotide sequence shown in Table 9 (i.e. SEQ ID NO:27) and a nucleotide sequence encoding a human gamma (γ) heavy chain constant region. In certain aspects, the anti-B7-H4 antibody or antigen-binding fragment in the pharmaceutical compositions provided herein comprises a heavy chain variable region encoded by a polynucleotide comprising the nucleotide sequence shown in Table 9 (i.e. SEQ ID NO:27) and a heavy chain constant domain encoded by a polynucleotide comprising the nucleotide sequence of SEQ ID NO:26.

TABLE 9

Heavy chain variable region-encoding polynucleotide sequences

| Antibody | Heavy Chain Variable Region-Encoding Polynucleotide Sequence (SEQ ID NO) |
|---|---|
| 20502 | CAGCTGCAGCTGCAGGAGTCGGGCCCAGGACTGGTGAAGCC TTCGGAGACCCTGTCCCTCACCTGCACTGTCTCTGGTGGCT CCATCAAAAGTGGTAGTTACTACTGGGGCTGGATCCGCCAG CCCCCAGGGAAGGGGCTGGAGTGGATTGGGAACATCTATTA TAGTGGGAGCACCTACTACAACCCGTCCCTCAGAAGTCGAG TCACCATATCCGTAGACACGTCCAAGAACCAGTTCTCCCTG AAGCTGAGTTCTGTGACCGCCGCAGACACGGCGGTGTACTA |

TABLE 9-continued

Heavy chain variable region-encoding polynucleotide sequences

| Antibody | Heavy Chain Variable Region-Encoding Polynucleotide Sequence (SEQ ID NO) |
|---|---|
| | CTGCGCCAGAGAAGGATCTTACCCCAATCAGTTTGATCCAT GGGGACAGGGTACATTGGTCACCGTCTCCTCA (SEQ ID NO: 27) |

In certain aspects, the anti-B7-H4 antibody or antigen-binding fragment in the pharmaceutical compositions provided herein comprises a light chain variable region encoded by a polynucleotide comprising the nucleotide sequence shown in Table 10 (i.e., SEQ ID NO:28). In certain aspects, the anti-B7-H4 antibody or antigen-binding fragment in the pharmaceutical compositions provided herein comprises a light chain variable region encoded by a polynucleotide comprising the nucleotide sequence shown in Table 10 (i.e. SEQ ID NO:28) and a nucleotide sequence encoding a human lambda light chain constant region. In certain aspects, the anti-B7-H4 antibody or antigen-binding fragment in the pharmaceutical compositions provided herein comprises a light chain variable region encoded by a polynucleotide comprising the nucleotide sequence shown in Table 10 (i.e., SEQ ID NO:28) and a light chain constant domain encoded by a polynucleotide comprising the nucleotide sequence of SEQ ID NO:24.

TABLE 10

Light chain variable region-encoding polynucleotide sequences

| Antibody | Light Chain Variable Region-Encoding Polynucleotide Sequence (SEQ ID NO) |
|---|---|
| 20502 | GAAATAGTGATGACGCAGTCTCCAGCCACCCTGTCTGTGTC TCCAGGGGAAAGAGCCACCCTCTCCTGCAGGGCCAGTCAGA GTGTTAGCAGCAACTTAGCCTGGTACCAGCAGAAACCTGGC CAGGCTCCCAGGCTCCTCATCTATGGTGCATCCACCAGGGC CACTGGTATCCCAGCCAGGTTCAGTGGCAGTGGGTCTGGGA CAGAGTTCACTCTCACCATCAGCAGCCTGCAGTCTGAAGAT TTTGCAGTTTATTACTGTCAGCAGTACCACTCCTTCCCTTT CACTTTTGGCGGAGGGACCAAGGTTGAGATCAAA (SEQ ID NO: 28) |

In certain aspects, the anti-B7-H4 antibody or antigen-binding fragment in the pharmaceutical compositions provided herein comprises a variable heavy chain encoded by a polynucleotide comprising the variable heavy chain-encoding nucleotide sequence shown in Table 9 (i.e. SEQ ID NO:27) and a variable light chain encoded by a polynucleotide comprising the variable light chain-encoding nucleotide sequence shown in Table 10 (i.e., SEQ ID NO:28).

In certain aspects, the anti-B7-H4 antibody or antigen-binding fragment in the pharmaceutical compositions provided herein comprises (i) a heavy chain encoded by a polynucleotide comprising the variable heavy chain-encoding nucleotide sequence shown in Table 9 (i.e. SEQ ID NO:27) and a nucleotide sequence encoding a human gamma (γ) heavy chain constant region and (ii) a light chain encoded by a polynucleotide comprising the variable light chain-encoding nucleotide sequence shown in Table 10 (i.e. SEQ ID NO:28) and a nucleotide sequence encoding a human lambda light chain constant region.

In certain aspects, the anti-B7-H4 antibody or antigen-binding fragment in the pharmaceutical compositions provided herein comprises (i) a heavy chain encoded by a polynucleotide comprising the variable heavy chain-encoding nucleotide sequence shown in Table 9 (i.e. SEQ ID NO:27) and the heavy chain constant domain-encoding nucleotide sequence of SEQ ID NO:26 and (ii) a light chain encoded by a polynucleotide comprising the variable light chain-encoding nucleotide sequence shown in Table 10 (i.e., SEQ ID NO:28) and the light chain constant domain-encoding nucleotide sequence of SEQ ID NO:24.

In certain aspects, the anti-B7-H4 antibodies or antigen-binding fragments in the pharmaceutical compositions provided herein are encoded by polynucleotides encoding anti-B7-H4 antibodies or antigen-binding fragments thereof or a domain thereof that are optimized, e.g., by codon/RNA optimization, replacement with heterologous signal sequences, and elimination of mRNA instability elements. Methods to generate optimized nucleic acids encoding an anti-B7-H4 antibody or antigen-binding fragment thereof or a domain thereof (e.g., heavy chain, light chain, VH domain, or VL domain) for recombinant expression by introducing codon changes (e.g., a codon change that encodes the same amino acid due to the degeneracy of the genetic code) and/or eliminating inhibitory regions in the mRNA can be carried out by adapting the optimization methods described in, e.g., U.S. Pat. Nos. 5,965,726; 6,174,666; 6,291,664; 6,414,132; and 6,794,498, accordingly.

Polynucleotides can be, e.g., in the form of RNA or in the form of DNA. DNA includes cDNA, genomic DNA, and synthetic DNA. DNA can be double-stranded or single-stranded. If single stranded, DNA can be the coding strand or non-coding (anti-sense) strand. In certain embodiments, the polynucleotide is a cDNA or a DNA lacking one or more introns. In certain embodiments, a polynucleotide is a non-naturally occurring polynucleotide. In certain embodiments, a polynucleotide is recombinantly produced. In certain embodiments, the polynucleotides are isolated. In certain embodiments, the polynucleotides are substantially pure. In certain embodiments, a polynucleotide is purified from natural components.

In certain aspects, vectors (e.g., expression vectors) comprise nucleotide sequences encoding anti-B7-H4 antibodies and antigen-binding fragments thereof or a domain thereof for recombinant expression in host cells, preferably in mammalian cells. In certain aspects, cells, e.g. host cells, comprise such vectors for recombinantly expressing anti-B7-H4 antibodies or antigen-binding fragment thereof described herein (e.g., human or humanized antibodies or antigen-binding fragments thereof). Thus, a method for producing an antibody or antigen-binding fragments thereof for use in a pharmaceutical composition described herein can comprise expressing such antibody or antigen-binding fragment thereof in a host cell.

An expression vector can be transferred to a cell (e.g., host cell) by conventional techniques and the resulting cells can then be cultured by conventional techniques to produce an antibody or antigen-binding fragment thereof described herein (e.g., an antibody or antigen-binding fragment thereof comprising the six CDRs, the VH, the VL, the VH and the VL, the heavy chain, the light chain, or the heavy and the light chain of 20502) or a domain thereof (e.g., the VH, the VL, the VH and the VL, the heavy chain, or the light chain of 20502).

In certain embodiments, anti-B7-H4 antibodies or antigen-binding fragment thereof (e.g., an antibody or antigen-binding fragment thereof comprising the CDRs of 20502) in the pharmaceutical compositions provided herein are produced in Potelligent® CHOK1SV cells.

In some embodiments, anti-B7-H4 antibodies or antigen-binding fragments thereof (e.g., an antibody or antigen-binding fragment thereof comprising the CDRs of 20502) in the pharmaceutical compositions provided herein are produced in a host cell that lacks a functional alpha-1,6-fucosyltransferase gene (FUT8) gene. In some embodiments, the host cell is a CHO cell.

In specific embodiments, an antibody or antigen-binding fragment thereof in the pharmaceutical compositions provided herein is isolated or purified. Generally, an isolated antibody or antigen-binding fragment thereof is one that is substantially free of other antibodies or antigen-binding fragments thereof with different antigenic specificities than the isolated antibody or antigen-binding fragment thereof. For example, in a particular embodiment, a preparation of an antibody or antigen-binding fragment thereof described herein is substantially free of cellular material and/or chemical precursors.

5.5 Therapeutic Uses and Methods

In one aspect, provided herein are methods for modulating one or more immune functions in a subject, comprising administering to a subject in need thereof a pharmaceutical composition provided herein comprising a B7-H4 antibody or antigen-binding fragment thereof.

In another embodiment, a pharmaceutical composition provided herein comprising an anti-B7-H4 antibody or antigen-binding fragment thereof is administered to a patient (e.g., a human patient) to increase the proliferation of T cells, CD4+ T cells, or CD8+ T cells in the patient. In another embodiment, a pharmaceutical composition provided herein comprising an anti-B7-H4 antibody or antigen-binding fragment thereof is administered to a patient (e.g., a human patient) to increase interferon-gamma (IFNγ) production in the patient. In another embodiment, a pharmaceutical composition provided herein comprising an anti-B7-H4 antibody or antigen-binding fragment thereof is administered to a patient (e.g., a human patient) to block the inhibitory activity of B7-H4 against T cells in the patient. In another embodiment, a pharmaceutical composition provided herein comprising an anti-B7-H4 antibody or antigen-binding fragment thereof is administered to a patient (e.g., a human patient) to deplete B7-H4 expressing cancer cells in the patient. In another embodiment, a pharmaceutical composition provided herein comprising an anti-B7-H4 antibody or antigen-binding fragment thereof is administered to achieve two or more of the above effects.

In a certain embodiment, provided herein are methods of treating a cancer, e.g., a B7-H4 expressing cancer comprising administering a pharmaceutical composition comprising an anti-B7-H4 antibody or antigen-binding fragment thereof provided herein to a patient (e.g., a human patient) in need thereof. In a certain embodiment, provided herein are methods of treating a solid tumor, e.g., a B7-H4 expressing solid tumor comprising administering a pharmaceutical composition comprising an anti-B7-H4 antibody or antigen-binding fragment thereof provided herein to a patient (e.g., a human patient) in need thereof.

In a certain embodiment, provided herein are pharmaceutical compositions for treating a cancer selected from the group consisting of: breast cancer (e.g., advanced breast cancer, triple negative breast cancer, hormone receptor (HR) positive breast cancer, or ductal carcinoma), endometrial carcinoma, ovarian cancer, urothelial cancer, non-small cell lung cancer (e.g., squamous cell carcinoma), pancreatic cancer, thyroid cancer, kidney cancer (e.g., renal cell carcinoma), and bladder cancer (e.g., urothelial cell carcinoma). In a certain embodiment, provided herein are pharmaceutical compositions for treating advanced breast cancer (including triple-negative breast cancer and hormone receptor (HR) positive breast cancer), ovarian cancer, endometrial cancer, or urothelial cancer. In a certain embodiment, provided herein are pharmaceutical compositions for treating a breast cancer. In a certain embodiment, provided herein are pharmaceutical compositions for treating an ovarian cancer. In a certain embodiment, provided herein are pharmaceutical compositions for treating an endometrial cancer. In a certain embodiment, provided herein are pharmaceutical compositions for treating a urothelial cancer.

In some embodiments, the cancer is a B7-H4 expressing cancer.

In another embodiment, a pharmaceutical composition provided herein is administered to a patient (e.g., a human patient) diagnosed with cancer to increase the proliferation of T cells, CD4+ T cells, or CD8+ T cells in the patient. In another embodiment, a pharmaceutical composition provided herein is administered to a patient (e.g., a human patient) diagnosed with cancer to increase interferon-gamma (IFNγ) production in the patient. In another embodiment, a pharmaceutical composition provided herein is administered to a patient (e.g., a human patient) diagnosed with cancer to block the inhibitory activity of B7-H4 against T cells in the patient. In another embodiment, a pharmaceutical composition provided herein is administered to a patient (e.g., a human patient) diagnosed with cancer to deplete B7-H4 expressing cancer cells in the patient.

The pharmaceutical compositions described herein can be delivered to a patient by an intravenous route. Usually, the patient is a human but non-human mammals including transgenic mammals can also be treated.

6. EXAMPLES

The examples in this Section (i.e., Section 6) are offered by way of illustration, and not by way of limitation.

Example 1: Methods Used in the Formulation Studies

I. Antibody Production 20502 antibodies were generated in a CHO cell line that lacks the FUT8 gene (α1,6-Fucosyltransferase), so the 20502 antibodies used in all of Examples 2-9 are afucosylated. They lack a terminal fucose at ASN297 in the Fc portion of the antibody.

II. General Formulation Procedure

Samples of monoclonal antibody (mAb) were prepared in various formulations by dialysis of the polysorbate-free drug substance (afucosylated 20502) using 20 kD molecular weight cut off (MWCO) dialysis membrane devices. After dialysis, concentration of mAbs was measured by UV spectroscopy using extinction coefficient of 1.47 $cm^{-1}$ $[g/L]^{-1}$. The protein concentrations of the buffer exchanged samples were adjusted to desired values with dialysis buffer, and 10% PS20 stock solution was spiked into each formulation for a final concentration of 0.05% (w/v) PS20. Formulations were sterile filtered using 0.22 µm filter units and filled into appropriate container/closure systems in a laminar flow hood. Samples were placed at various storage conditions per study design, and their stabilities were analyzed using various methods at specified time points.

III. Analytical Methods

Visual inspection (AD-Gen-002/00): Visual assessment was made against both black and white backgrounds under fluorescence lighting. Samples were examined for color, clarity, and presence of visible particles.

Protein Concentration (TM-150-001/00): Protein concentration was determined by UV absorbance at 280 nm using theoretical absorption coefficients of 1.47 $cm^{-1}$ $[g/L]^{-1}$. Samples were diluted to within the linear range of absorbance with Dulbecco's Phosphate Buffer Saline (DPBS) and measured against DPBS as blank. Absorbance was measured using Agilent Cary 8454 UV-Vis Spectrophotometer (Agilent Technologies, CA).

pH (AD-GEN-001/00): Buffer pH was determined using a calibrated Beckman Coulter pHi560 meter (Beckman Coulter, Inc., CA).

Osmolality (TM-GEN-004/00): Buffer osmolality was measured by vapor pressure using a Wescor VAPRO system (Wescor, Inc., UT).

Differential Scanning calorimetry (DSC) Analysis: DSC measurements were performed on a MicroCal VP-Capillary DSC platform (GE Healthcare, UK). The mAb samples were diluted in various formulation buffers to a concentration of 1 mg/mL. Matched formulation buffer was used as a reference. The samples were scanned from 15° C. to 110° C. at a rate of 1° C./min. Data were first normalized for protein concentration, then baseline corrected and buffer subtracted using Origin 7.0 software (OriginLab, MA). Melting transitions were analyzed with cursor initiated DSC peak fit function using non-two-state unfolding model within the origin software.

Unfolding Temperature™ by UNit system: The unfolding temperature (Tm) of a protein provides a measurement of the physical stability of the molecule. Unfolding temperature is defined as the temperature at which equal amounts of native and denatured protein exist in equilibrium. UNit system by Unchained Labs (CA) uses intrinsic fluorescent spectroscopic changes to determine the temperature at which heat-induced unfolding of a protein occurs. Samples at 1 mg/mL were scanned from 20° C. to 90° C. at a rate of 1° C./min. Tm were determined using UNcle software from Unchained Labs (CA).

Imaged Capillary Isoelectric Focusing (iCE) (TM-150-003/02): The charge variants were analyzed by Imaged capillary isoelectric focusing (iCE) on a Protein Simple iCE3 instrument with 720 NV auto-sampler (ProteinSimple, CA). Data were analyzed using iCE CFR software, and the relative amounts of main, acidic, and basic peaks were determined by integrating the area of the peaks observed in the profile and used to calculate the percentage of acidic and basic variants.

Size-Exclusion Chromatography (SEC) (TM-150-004/00): Samples were analyzed on Agilent 1100 Series HPLC equipped with a diode array detector, and absorbance was monitored at 280 nm. Samples were diluted to 1 mg/ml in mobile phase (100 mM sodium phosphate, 400 mM sodium chloride pH 6.8), and 50 µL was injected onto a pre-equilibrated Sepax Zenix SEC-300 7.8×200 mm column (Sepax Technologies, Inc., Delaware). The SEC separation and guard columns were used at 25° C. A flow rate of 1.0 mL/min was used with a 12-min run time. Aggregate, monomer, and fragment peaks were quantified using instrument software for data analysis.

Capillary Electrophoresis with Sodium Dodecyl Sulfate Gel (CE-SDS) (TM-150-002/00): CE-SDS was used to determine the purity of the B7-H4 antibody 20502 under reduced and non-reduced conditions. Samples were analyzed on Beckman Coulter PA800 plus system (Beckman Coulter, CA) using an uncoated 50 µM I.D. capillary. Absorbance was monitored at 220 nm. Purity of 20502 under reduced condition was determined by measuring the peak area of heavy and light chain peaks and comparing with the total area of all detected peaks. Purity of 20502 under non-reduced condition was determined by measuring the peak area of the main intact protein peak and comparing it with the total area of all detected peaks.

Subvisible Particulate Matters by HIAC (AD-GEN-006): An HIAC 9703+ particle counter (Hach, CO), equipped with an HRDL-150 detector and a 1 mL syringe was used. Before use, the system was flushed with particle-free Milli-Q water (Millipore, MA) to generate a clean base line. Four consecutive 0.4 mL aliquots were taken from samples, and particle counts from the last three aliquots were averaged and reported.

Example 2: Biochemical Analysis of Amino Acid Residues of Antibody 20502

Anti-B7-H4 antibody 20502 is a monoclonal antibody. A knowledge-based formulation development approach was used to identify the appropriate compositions that provide maximal stability for the protein. To do this, both intrinsic properties of the molecule and extrinsic formulation components that could affect the stability of the protein are considered.

The full length heavy chain and light chain amino acid sequences of antibody 20502 are shown in Table 11.

TABLE 11

Primary Amino Acid Sequences of the Full Length Heavy Chain and Light Chain of Antibody 20502

Sequence
Designation Sequence (SEQ ID NO)

Heavy Chain QLQLQESGPGLVKPSETLSLTCTVSGGSIKSGSYYWGWI
RQPPGKGLEWIGNIYYSGSTYYNPSLRSRVTISVDTSKN
QFSLKLSSVTAADTAVYYCAREGSYPNQFDPWGQGTLVT
VSSASTKGPSVFPLAPSSKSTSGGTAALGCLVKDYFPEP
VTVSWNSGALTSGVHTFPAVLQSSGLYSLSSVVTVPSSS
LGTQTYICNVNHKPSNTKVDKKVEPKSCDKTHTCPPCPA
PELLGGPSVFLFPPKPKDTLMISRTPEVTCVVVDVSHED
PEVKFNWYVDGVEVHNAKTKPREEQYNSTYRVVSVLTVL
HQDWLNGKEYKCKVSNKALPAPIEKTISKAKGQPREPQV
YTLPPSRDELTKNQVSLTCLVKGFYPSDIAVEWESNGQP
ENNYKTTPPVLDSDGSFFLYSKLTVDKSRWQQGNVFSCS
VMHEALHNHYTQKSLSLSPGK (SEQ ID NO: 21)

Light Chain EIVMTQSPATLSVSPGERATLSCRASQSVSSNLAWYQQK
PGQAPRLLIYGASTRATGIPARFSGSGSGTEFTLTISSL
QSEDFAVYYCQQYHSFPFTFGGGTKVEIKRTVAAPSVFI
FPPSDEQLKSGTASVVCLLNNFYPREAKVQWKVDNALQS
GNSQESVTEQDSKDSTYSLSSTLTLSKADYEKHKVYACE
VTHQGLSSPVTKSFNRGEC (SEQ ID NO: 22)

Analysis of 20502 primary sequence revealed that some amino acid residues could potentially undergo biochemical modifications. These include deamidation in asparagine, isomerization in aspartic acid, and oxidation in methionine, cysteine, histidine, tryptophan, phenylalanine, and tyrosine. The asparagines, aspartic acids, and methionines subject to deamidation, isomerization, and oxidation, respectively, are indicated in bold and gray squares in the sequences in Table 11. The potential biochemical degradation spots in 20502 are noted in Table 12. Those potential degradation spots are outside the CDR regions.

TABLE 12

Potential Amino Acid Residues in 20502 for Chemical Degradation Pathways.

| Degradation Pathways | Sites | Number of sites |
| --- | --- | --- |
| Deamidation | Asparagine-Glycine | 2 |
|  | Asparagine-Serine | 3 |
|  | Asparagine-Asparagine | 2 |
| Isomerization | Aspartic acid-Glycine | 2 |
|  | Aspartic acid-Serine | 3 |
| Oxidation | Methionine | 3 |
|  | Histidine | 12 |
|  | Tryptophan | 11 |
|  | Cysteine | 16 (even number) |
|  | Tyrosine | 30 |
|  | Phenylalanine | 22 |

To develop a liquid formulation that could provide good stability for 20502, different conditions such as pH, buffer types, and excipients were evaluated. The stability of the protein was monitored based on biophysical and biochemical properties of 20502 in each example. The details of the studies and their results are described here.

Example 3: Initial pH Screening Study

Formulation pH affects protein stability. The pH of a formulation can influence biochemical degradation pathways such as deamidation, isomerization, and oxidation, as well as biophysical degradations such as aggregation and fragmentation due to interactions between proteins and with their environment.

A pH screening study was conducted to determine a pH range that provides maximal stability for 20502 and to understand the degradation mechanisms of the protein under these conditions. The details of formulation composition evaluated in the study are listed in Table 13.

TABLE 13

Formulations Evaluated for pH Effect on Protein Stability

| # | 20502 (mg/mL) | Formulation Ingredients and Concentrations | % PS20 (w/v) | pH |
| --- | --- | --- | --- | --- |
| 1 | 1.0 | 20 mM Citrate, 270 mM Sucrose | 0.05 | 4.0 |
| 2 | 1.0 | 20 mM Citrate, 270 mM Sucrose | 0.05 | 5.0 |
| 3 | 1.0 | 20 mM Histidine, 270 mM Sucrose | 0.05 | 6.0 |
| 4 | 1.0 | 20 mM Phosphate, 270 mM Sucrose | 0.05 | 7.0 |
| 5 | 1.0 | 20 mM Tris, 270 mM Sucrose | 0.05 | 8.0 |

To determine the thermal stability of the protein under different pH conditions, unfolding temperatures were measured by intrinsic fluorescent change under different temperature using UNit instrument. The shift in tryptophan fluorescence emission wavelength (Barycentric Mean, BCM) indicates the unfolding event occurs when samples are heated. FIG. 1 shows the measured unfolding temperature (Tm1) of 20502 under different pH conditions. The results indicate Tm1 is pH dependent. At higher pH (e.g., pH≥7), an unfolding temperature of 74° C. was observed. At pH 5 and 6, the unfolding temperatures were 66° C. and 70° C., respectively. At pH 4, the unfolding temperature was 55° C. In addition, the onset temperature appeared to be ~50° C. using pH 4, but the onset temperature was 62° C. or above using pH 5-8. These results demonstrate that compositions with pH≥5 will provide better thermal stability than formulations at pH 4.

Figure 2:
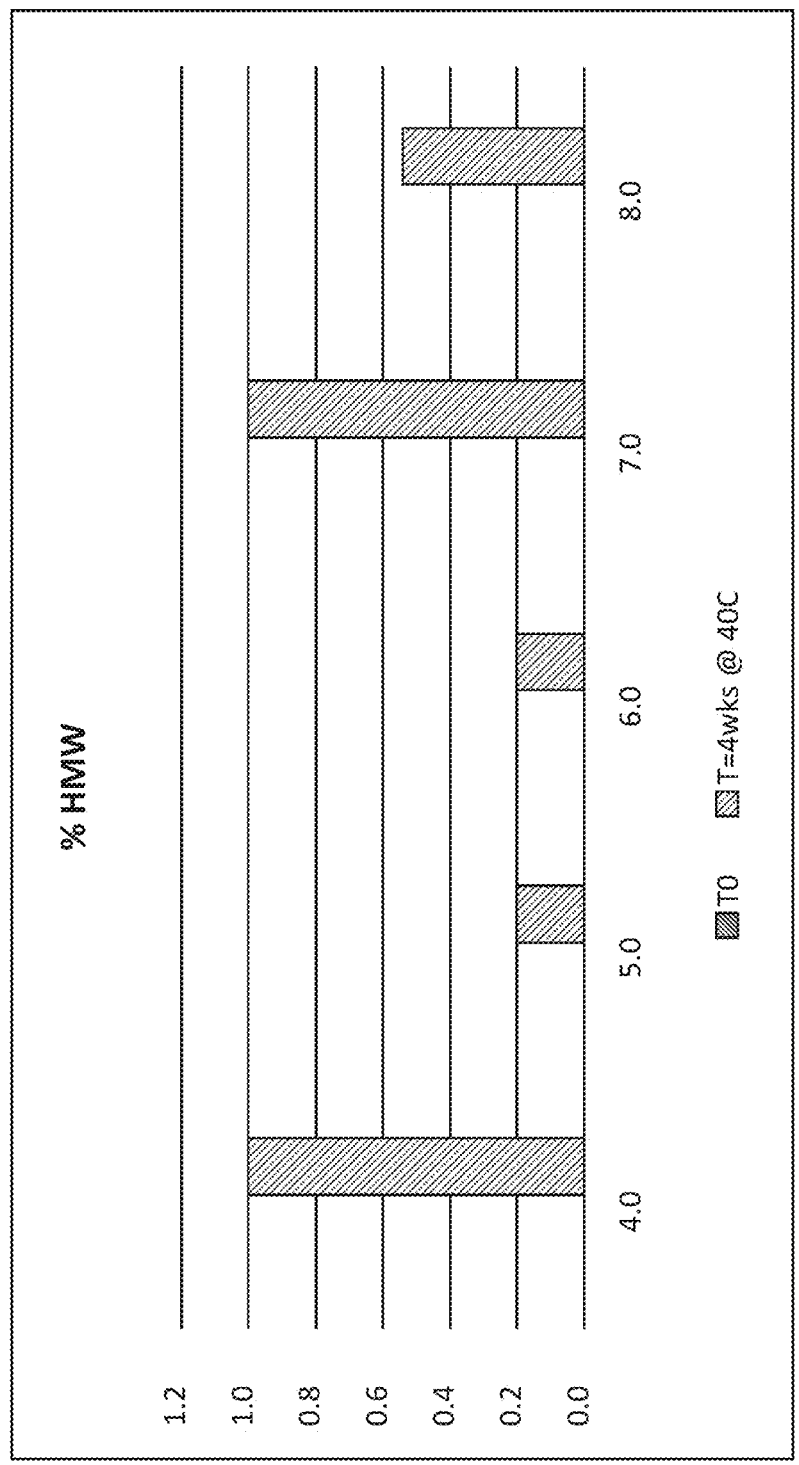
Figure 3:
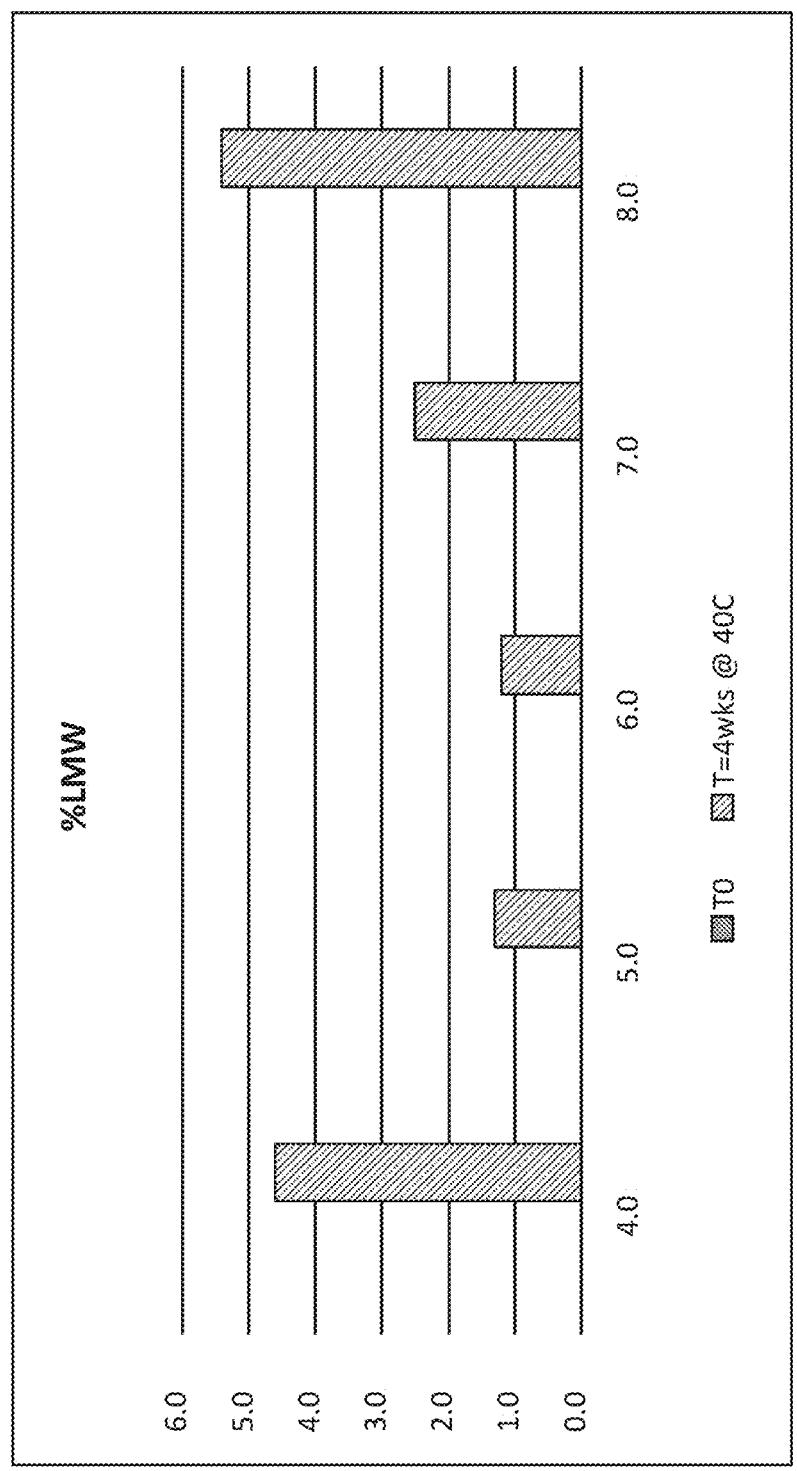

The stability of 20502 under different pHs was also evaluated under stressed conditions at 40° C. for up to four weeks. All samples remained clear and colorless with no particles observed for the duration of the study. Changes in aggregates and fragments were determined by SE-HPLC. At time zero (T0), no apparent aggregates were observed for 20502 at 1 mg/ml concentration in the formulations studied. After four weeks at 40° C., the soluble aggregates increased noticeably in the pH 4, 7, and 8 formulations; only a small increase of aggregates was observed in pH 5 or 6 formulations (FIG. 2). A similar effect of pH on the formation of fragments was observed (FIG. 3). The results from this study showed that 20502 is most stable around pH 5-6 as indicated by SE-HPLC measurement of the indicated properties.

Example 4: Detailed pH Screening Study

The results of the preliminary pH screening study showed that antibody 20502 was most stable around pH 5-6. A detailed pH study was carried out to identify the pH that provides maximum stability in the range of 4.5 to 6.5. The details of the formulation compositions are listed in Table 14. This study was conducted using citrate buffer to minimize the possible impact of buffer types on the stability of the mAb. The stability of antibody 20502 at 10 mg/mL was examined based on visual appearance, aggregation, fragmentation (by SE-HPLC), and charge variants (iCE) under stressed (40° C.) conditions for up to three weeks.

TABLE 14

Formulations Evaluated for Detailed pH Effect on Protein Stability

| # | Formulations | % PS20 (w/v) | pH | Antibody Concentration (mg/mL) |
|---|---|---|---|---|
| 1 | 20 mM Citrate, 270 mM Sucrose | 0.05 | 4.5 | 10 |
| 2 | 20 mM Citrate, 270 mM Sucrose | 0.05 | 5.0 | 10 |
| 3 | 20 mM Citrate, 270 mM Sucrose | 0.05 | 5.5 | 10 |
| 4 | 20 mM Citrate, 270 mM Sucrose | 0.05 | 6.0 | 10 |
| 5 | 20 mM Citrate, 270 mM Sucrose | 0.05 | 6.5 | 10 |

Figure 4:
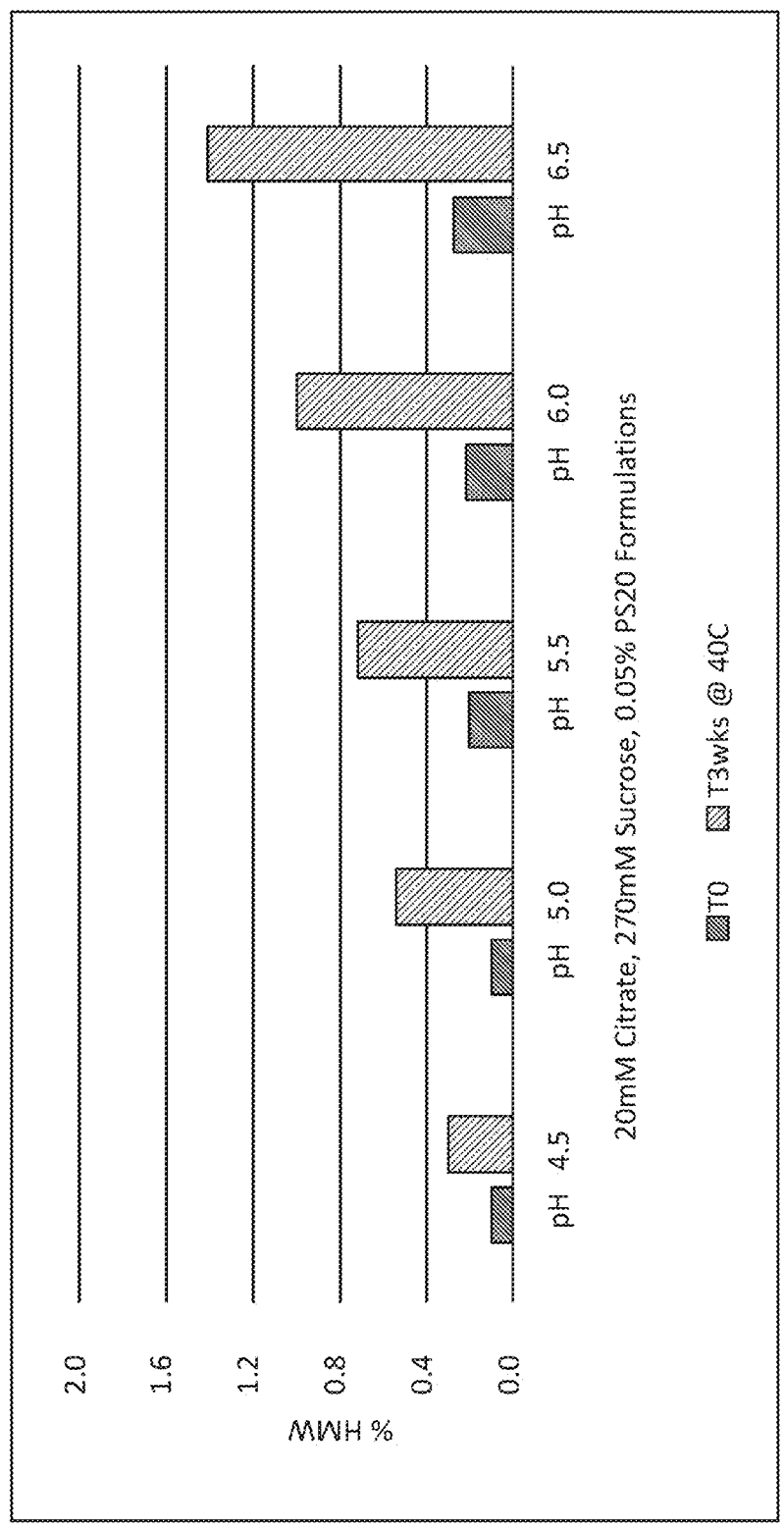
Figure 5:
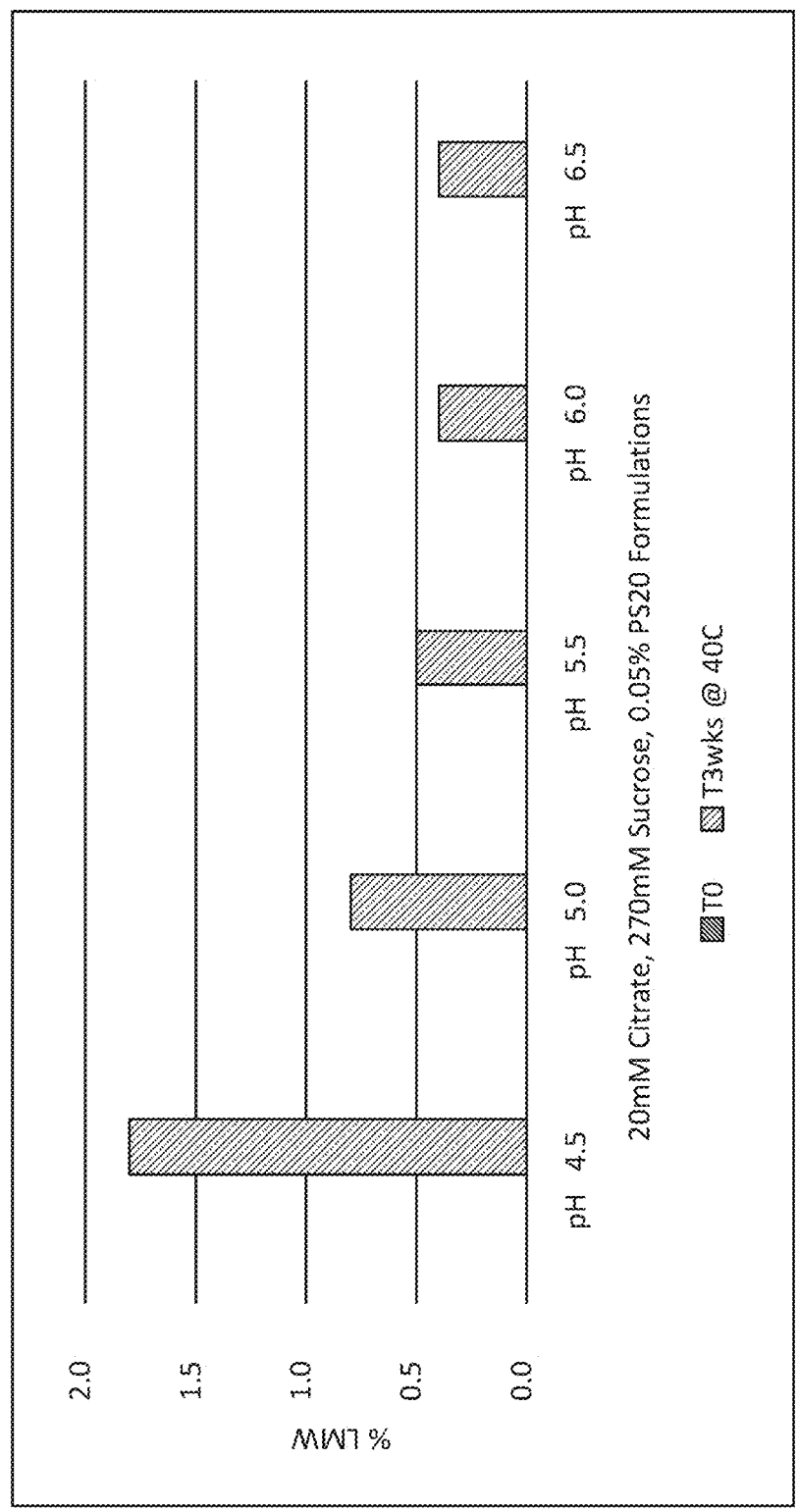

All samples remained clear and colorless with no particles observed for the duration of the study. SE-HPLC results showed that a low level of aggregate was observed for 20502 at 10 mg/ml concentration at the beginning of the study (T0). Thermal stress of three weeks at 40° C. resulted in a pH-dependent increase in aggregation in the order of 4.5<5.0<5.5<6.0<6.5, while the fragmentation showed the opposite trend (FIG. 4 and FIG. 5).

Figure 6:
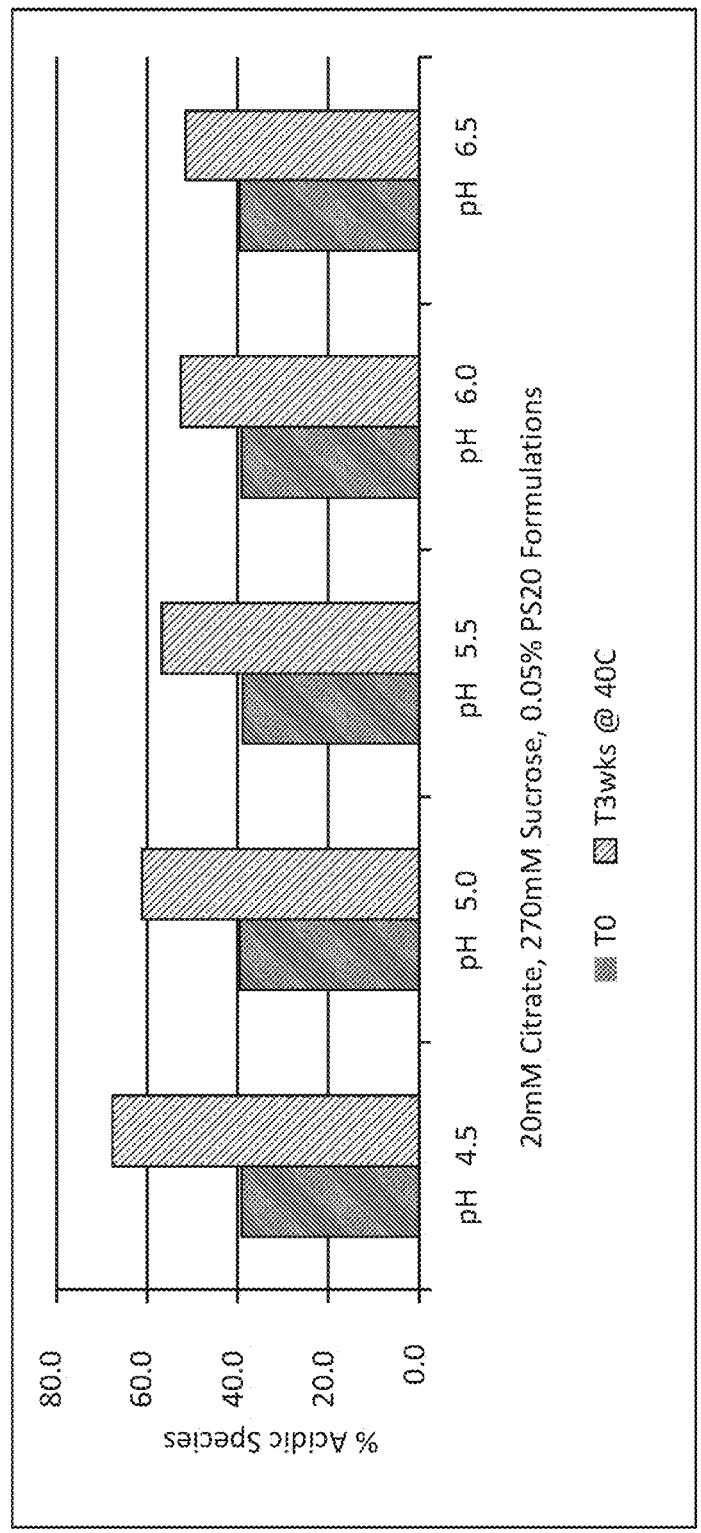
FIG. 6 shows the impact of buffer pH on acidic variants (as determined by Imaged Capillary Isoelectric Focusing (iCE)) at 40° C. (See Example 4.)
Figure 7:
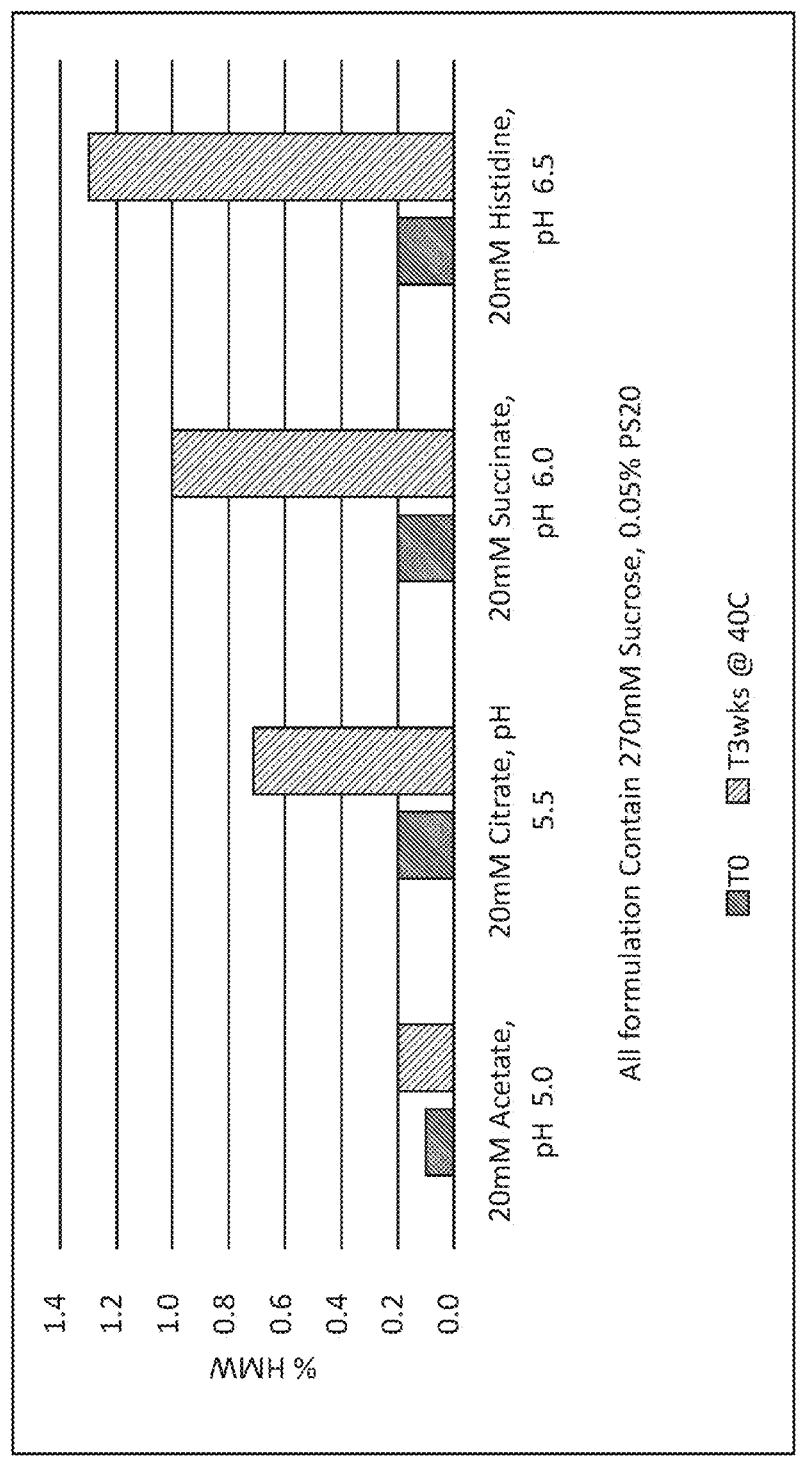
FIG. 7 shows the impact of buffer types on aggregate formation (as determined by SE-HPLC) at 40° C. (See Example 5.)

The iCE data showed the acidic variants increased after 3 weeks at 40° C. The increase of acidic variants was pH dependent, with the increasing order of pH at 6.5/6.0/5.5<5.0<4.5 (FIG. 6).

The fact that higher pHs were associated with increased aggregation and lower pHs were associated with increased fragmentation increased the difficulty of identifying a desirable pharmaceutical formulation. Collectively, the study results demonstrate that formulations at pH 5-6 provide the best overall stability profile for 20502.

Example 5: Buffer Species Screening Study

Like pH, buffer types influence protein stability to various extents. The accelerated stability of 20502 at 10 mg/mL was evaluated in acetate, citrate, succinate, and histidine buffers from pH 5.0 to pH 6.5 in 0.5 unit increments based on their pKa, with the aim of determining a buffer that will provide maximal stability at pH 5.0-6.5. The detailed formulation compositions are provided in Table 15. These buffers were examined for their effect on protein stability based on appearance, aggregation, fragmentation, and charge variants.

TABLE 15

Formulation Buffer Species Evaluated for Protein Stability

| # | Formulations | % PS20 (w/v) | pH | Concentration (mg/mL) |
|---|---|---|---|---|
| 1 | 20 mM Acetate, 270 mM Sucrose | 0.05 | 5.0 | 10 |
| 2 | 20 mM Citrate, 270 mM Sucrose | 0.05 | 5.5 | 10 |
| 3 | 20 mM Succinate, 270 mM Sucrose | 0.05 | 6.0 | 10 |
| 4 | 20 mM Histidine, 270 mM Sucrose | 0.05 | 6.5 | 10 |

Figure 8:
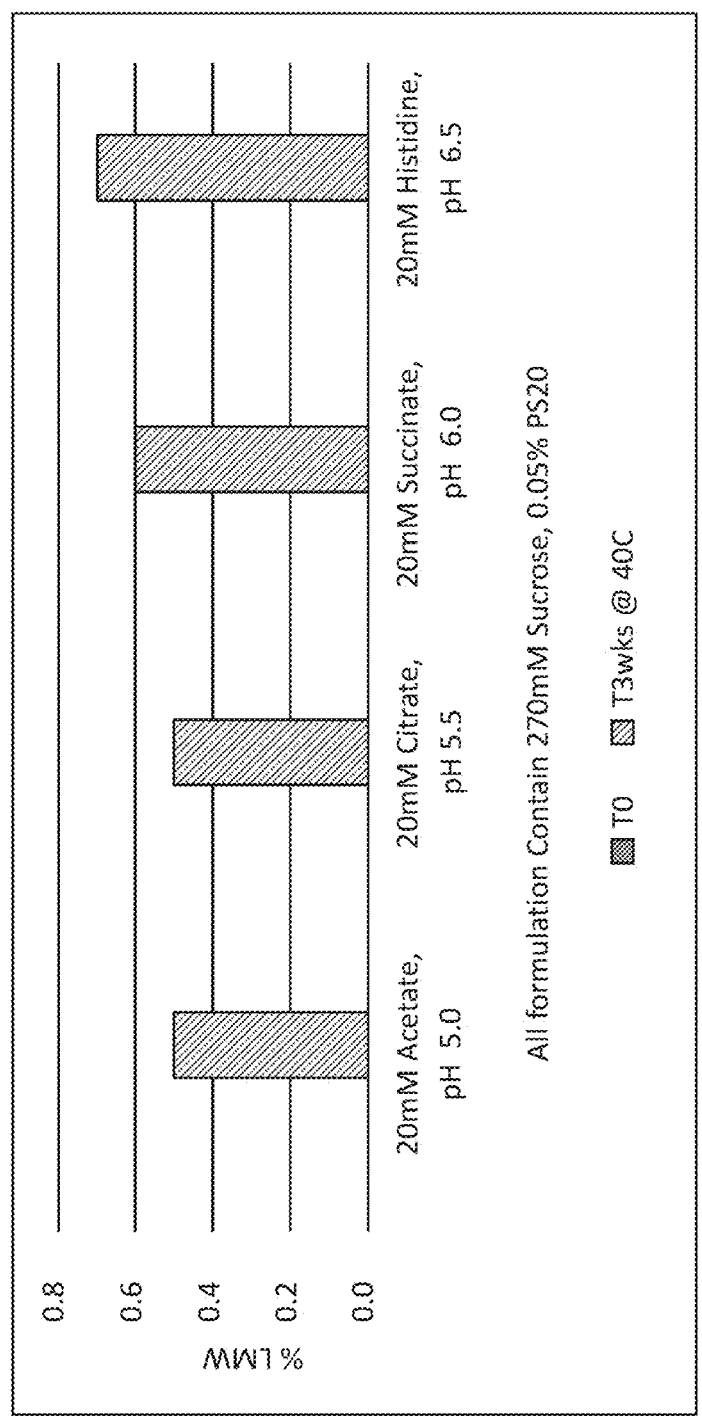
FIG. 8 shows the impact of buffer types on fragment formation (as determined by SE-HPLC) at 40° C. (See Example 5.)

All samples remained clear and colorless with no particles observed for the duration of the study. SE-HPLC results shown in FIG. 16 reveal buffer (pH) dependent increase of aggregates in this study. The aggregates were formed at higher rates at higher pH compared to those at lower pH; in the order of histidine (pH 6.5)>succinate (pH 6)>citrate (pH 5.5)>acetate (pH 5). On the other hand, slightly less fragments were observed in acetate (pH 5) and citrate (pH 5.5) buffers compared to those in histidine (pH 6.5) and succinate (pH 6) buffers, though the overall levels were low (0.5%-0.7%) over 3 weeks at 40° C. (FIG. 8).

Figure 9:
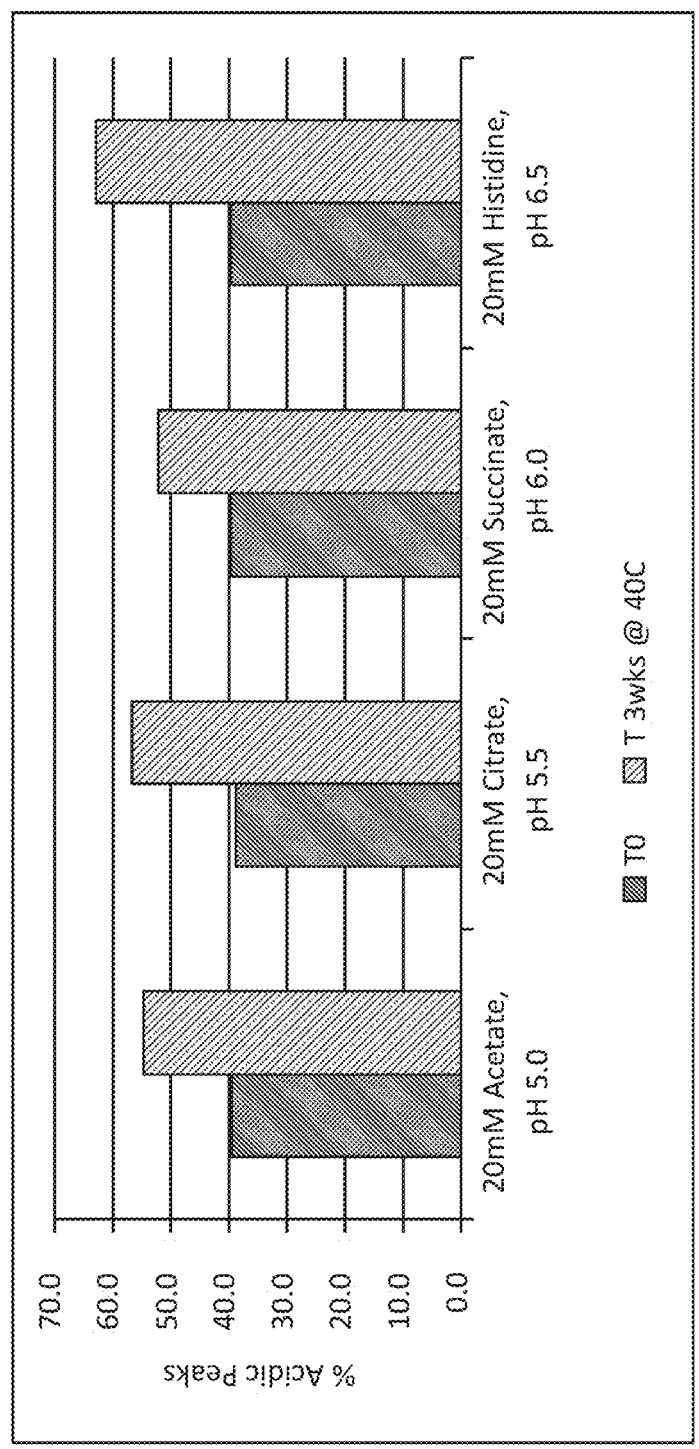
FIG. 9 shows the impact of buffer types on acidic variants formation (as determined by iCE) at 40° C. (See Example 5.)
Figure 10:
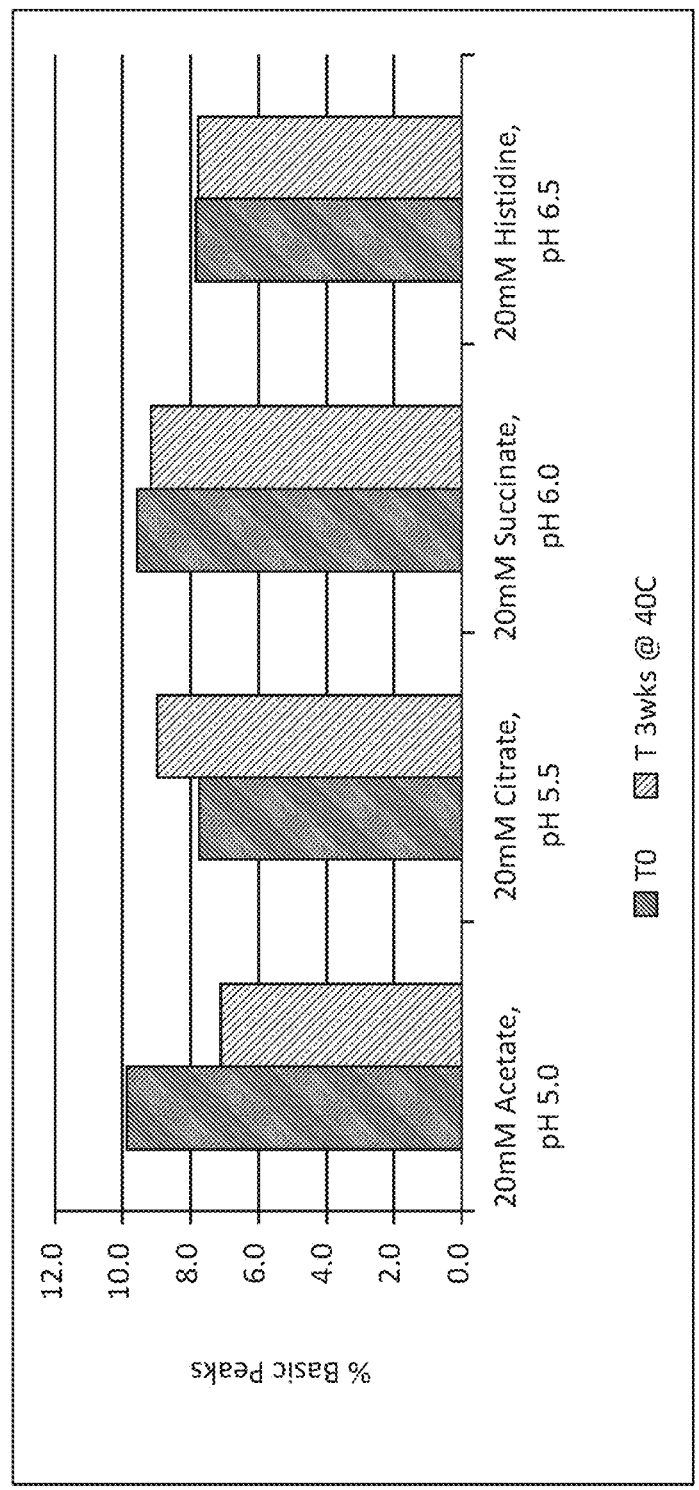
FIG. 10 shows the impact of buffer types on basic variants formation (as determined by iCE) at 40° C. (See Example 5.)

The iCE results showed that buffers had some effect on 20502 charge profile as shown in FIG. 9 and FIG. 10. But the overall difference among them was slightly over 10% in acidic variants and about 2% in basic variants upon storage at 40° C. for three weeks.

The 20502 antibody was tested in two other standard formulations containing histidine, but neither resulted in a composition with the desired stability. Based on these results, it was concluded that 20502 was most stable in acetate buffer at pH 5 among all the formulation conditions tested. Citrate buffer at pH 5.5 also provides a relatively stable buffer for 20502.

Example 6: Excipients Selection Study

Formulation excipients such as bulking agents can affect product stability. To assess the effect of excipients on the stability of antibody 20502, the antibody at 20 mg/mL was formulated into acetate and citrate formulations containing sodium chloride (NaCl), trehalose, sorbitol, or sucrose at isotonic concentrations. Citrate formulations were formulated at pH 5.5 and acetate formulations were formulated at pH 5.0. Two additional acetate formulations with sucrose were also prepared at pHs 4.5 and 5.5. The detailed formulation compositions are provided in Table 16. The excipients were examined for their effect on protein stability based on visual appearance, aggregation, fragmentation and charge variants under the storage conditions of 40° C., 25° C. and 5° C.

TABLE 16

Formulation Excipients Evaluated For Protein Stability

| ID | Buffer | Excipients | pH | % PS20 (w/v) | Concentration (mg/mL) |
|---|---|---|---|---|---|
| 1 | 20 mM Citrate | 0.9% NaCl | 5.5 | 0.05% | 20.0 |
| 2 | 20 mM Citrate | 10% Trehalose | 5.5 | 0.05% | 20.0 |
| 3 | 20 mM Citrate | 4.7% Sorbitol | 5.5 | 0.05% | 20.0 |

TABLE 16-continued

Formulation Excipients Evaluated For Protein Stability

| ID | Buffer | Excipients | pH | % PS20 (w/v) | Concentration (mg/mL) |
|---|---|---|---|---|---|
| 4 | 20 mM Citrate | 270 mM Sucrose | 5.5 | 0.05% | 20.0 |
| 5 | 20 mM Acetate | 0.9% NaCl | 5.0 | 0.05% | 20.0 |
| 6 | 20 mM Acetate | 10% Trehalose | 5.0 | 0.05% | 20.0 |
| 7 | 20 mM Acetate | 4.7% Sorbitol | 5.0 | 0.05% | 20.0 |
| 8 | 20 mM Acetate | 270 mM Sucrose | 5.0 | 0.05% | 20.0 |
| 9 | 20 mM Acetate | 270 mM Sucrose | 4.5 | 0.05% | 20.0 |
| 10 | 20 mM Acetate | 270 mM Sucrose | 5.5 | 0.05% | 20.0 |

Figure 11:
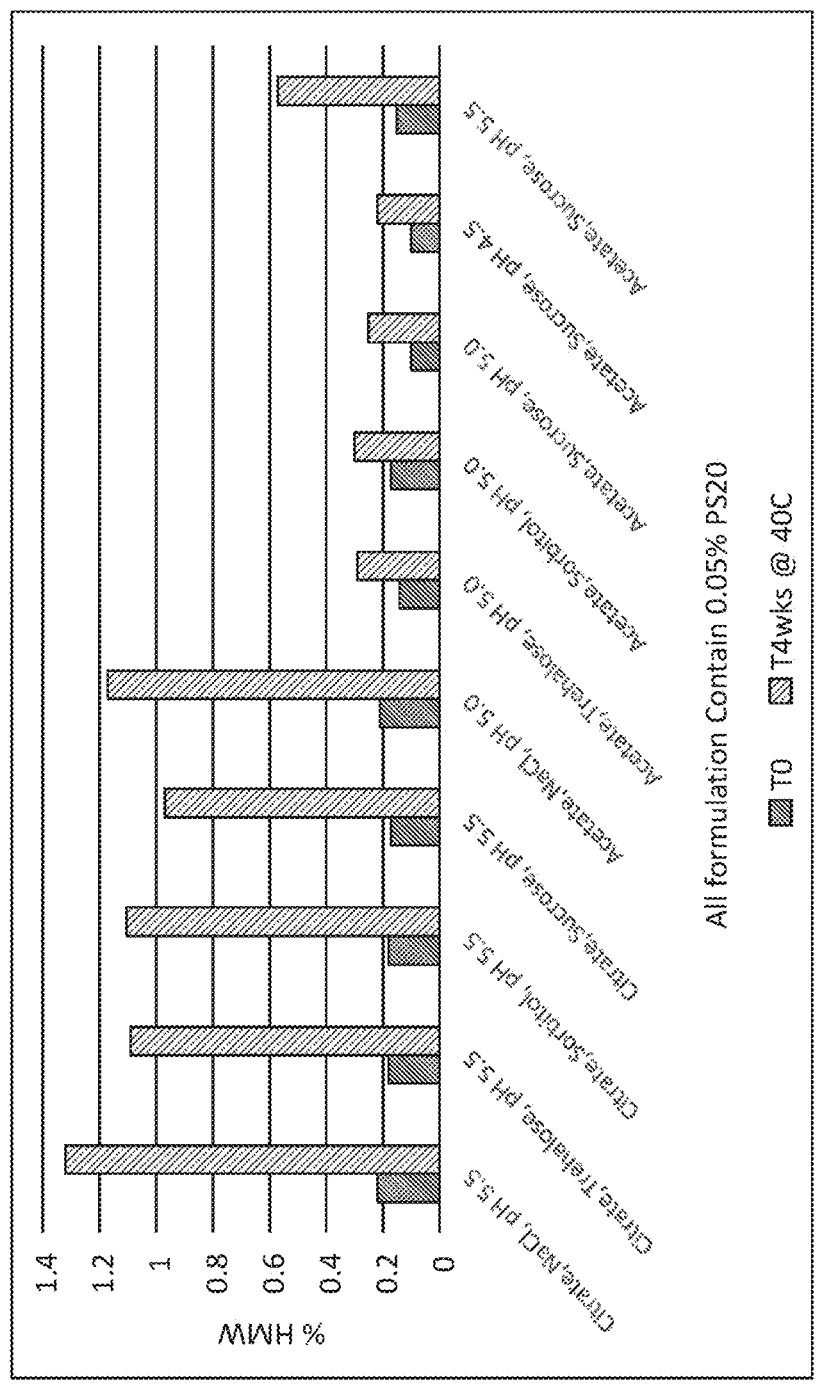
FIG. 11 shows the impact of excipients on aggregate formation (as determined by SE-HPLC) at 40° C. (See Example 6.)
Figure 12:
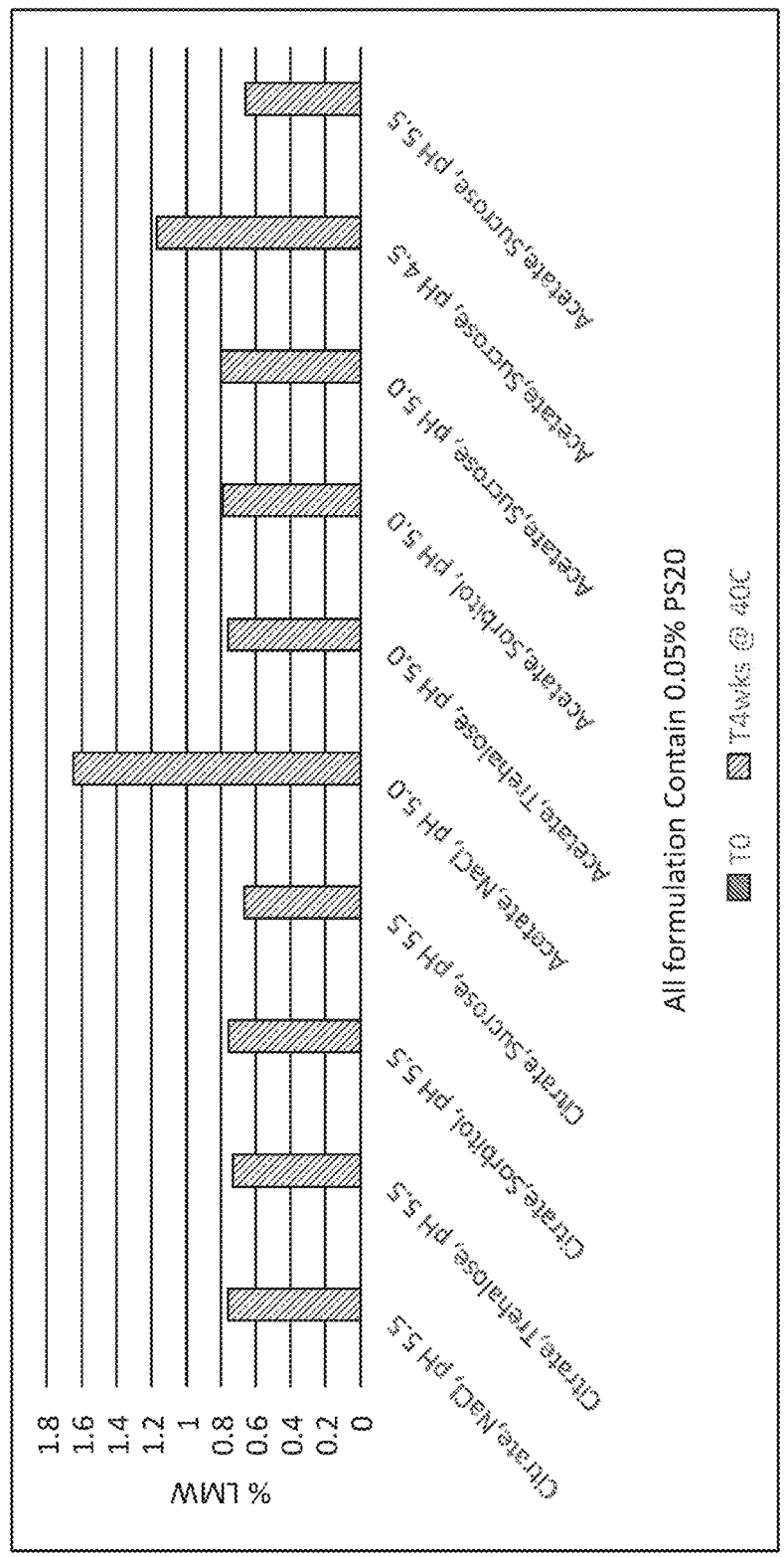
FIG. 12 shows the impact of excipients on fragment formation (as determined by SE-HPLC) at 40° C. (See Example 6.)

All samples remained clear and colorless with no particles observed for the 4-week duration of the study. SE-HPLC results shown in FIG. 11 revealed that 20502 aggregates formed at faster rates in the citrate formulations compared to acetate formulations. Rate of aggregation formation was highest in NaCl formulation, and this was true for both citrate and acetate formulations. Sorbitol, trehalose, and sucrose formulations showed similar changes in aggregation in both citrate and acetate buffers. For fragments, all formulations were similar except for formulation containing acetate and NaCl, which showed slightly more fragments (FIG. 12). Thus, although NaCl is widely used in pharmaceutical compositions, it resulted in increased aggregation and fragmentation of 20502. The amount of fragments observed in this study was slightly higher compared with those in the earlier studies. This could be due to the higher concentration of protein (20 mg/mL) used in this study.

Figure 13:
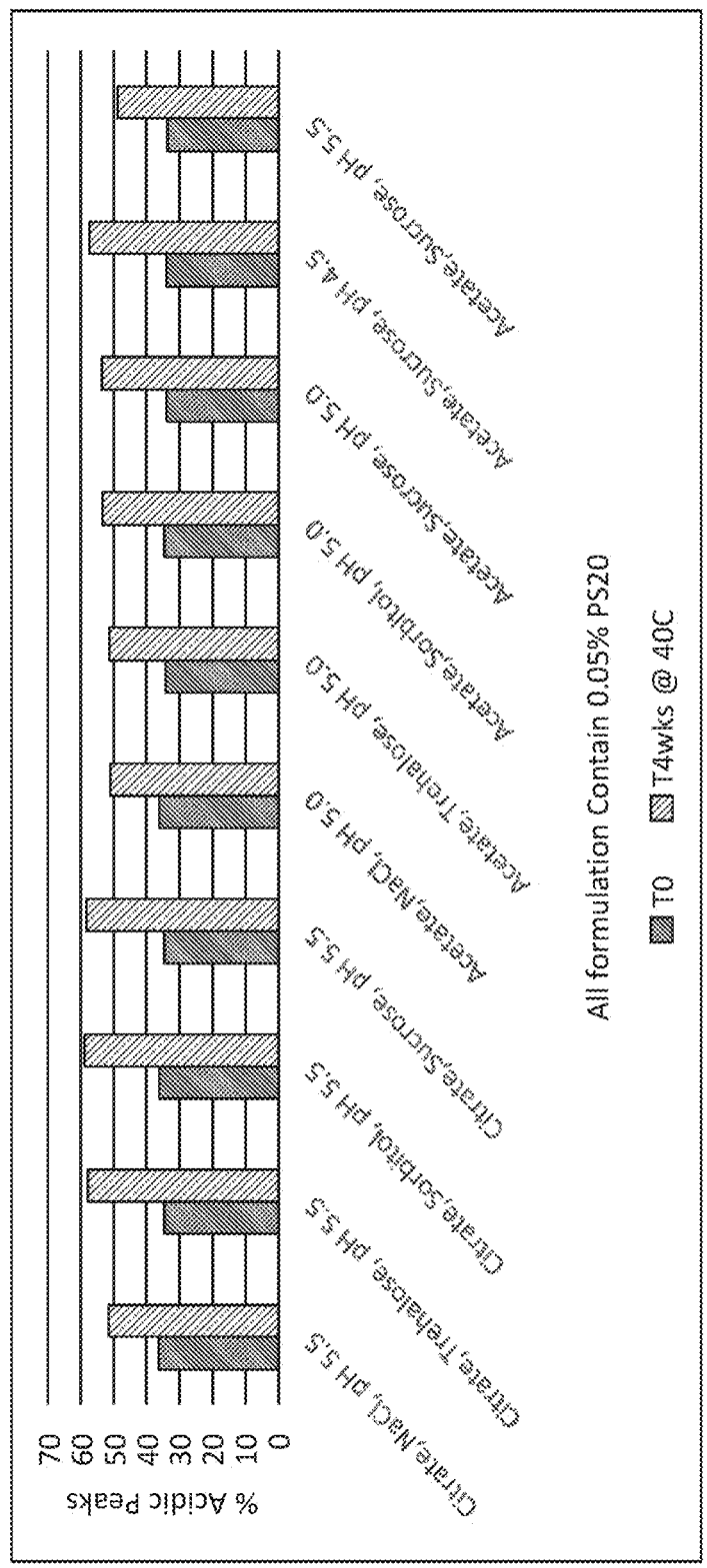
FIG. 13 shows the impact of excipients on acidic variants (as determined by iCE) at 40° C. (See Example 6.)
Figure 14:
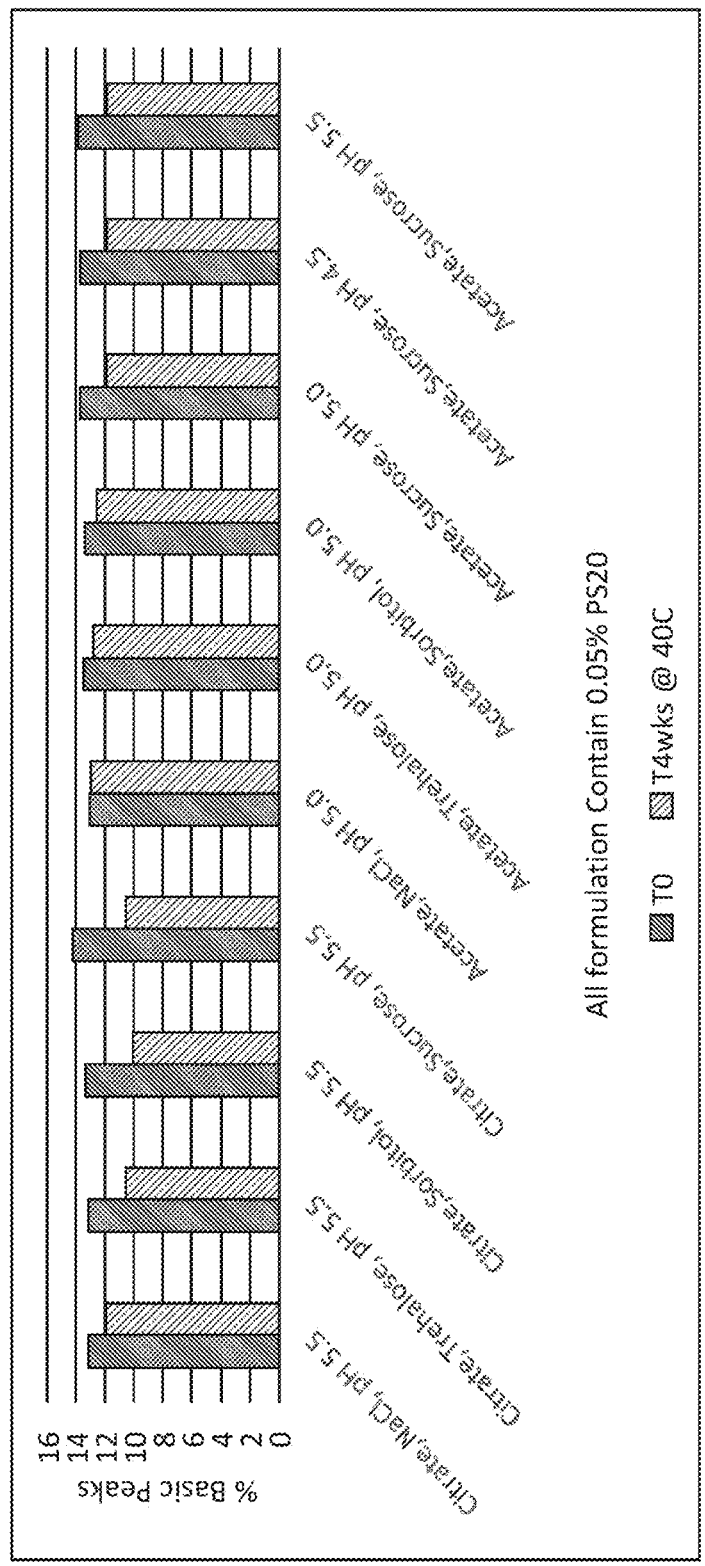
FIG. 14 shows the impact of excipients on basic variants (as determined by iCE) at 40° C. (See Example 6.)

Formulation excipients had less impact on the 20502 charge profile upon storage. As shown in FIG. 13, less than 10% difference of acidic variants among all the formulations was observed. Similarly, less than 2% difference of basic variants was observed in all the formulations within each buffer type (FIG. 14).

Based on the results of excipient selection study, sucrose was selected over NaCl due to the aggregates level observed. Sucrose showed similar aggregation and charge profile as sorbitol and trehalose. However, sucrose is more reliable from raw material supply perspective with better quality and regulatory experience.

Collectively, the results of pH, buffer species, and excipient screening studies indicate that the 20502 antibody was most stable in a formulation containing 20 mM acetate, 270 mM sucrose, and 0.05% PS20 at pH 5.0. The formulation containing 20 mM citrate, 270 mM sucrose, 0.05% PS20 at pH 5.5 also provided good stability.

Figure 15:
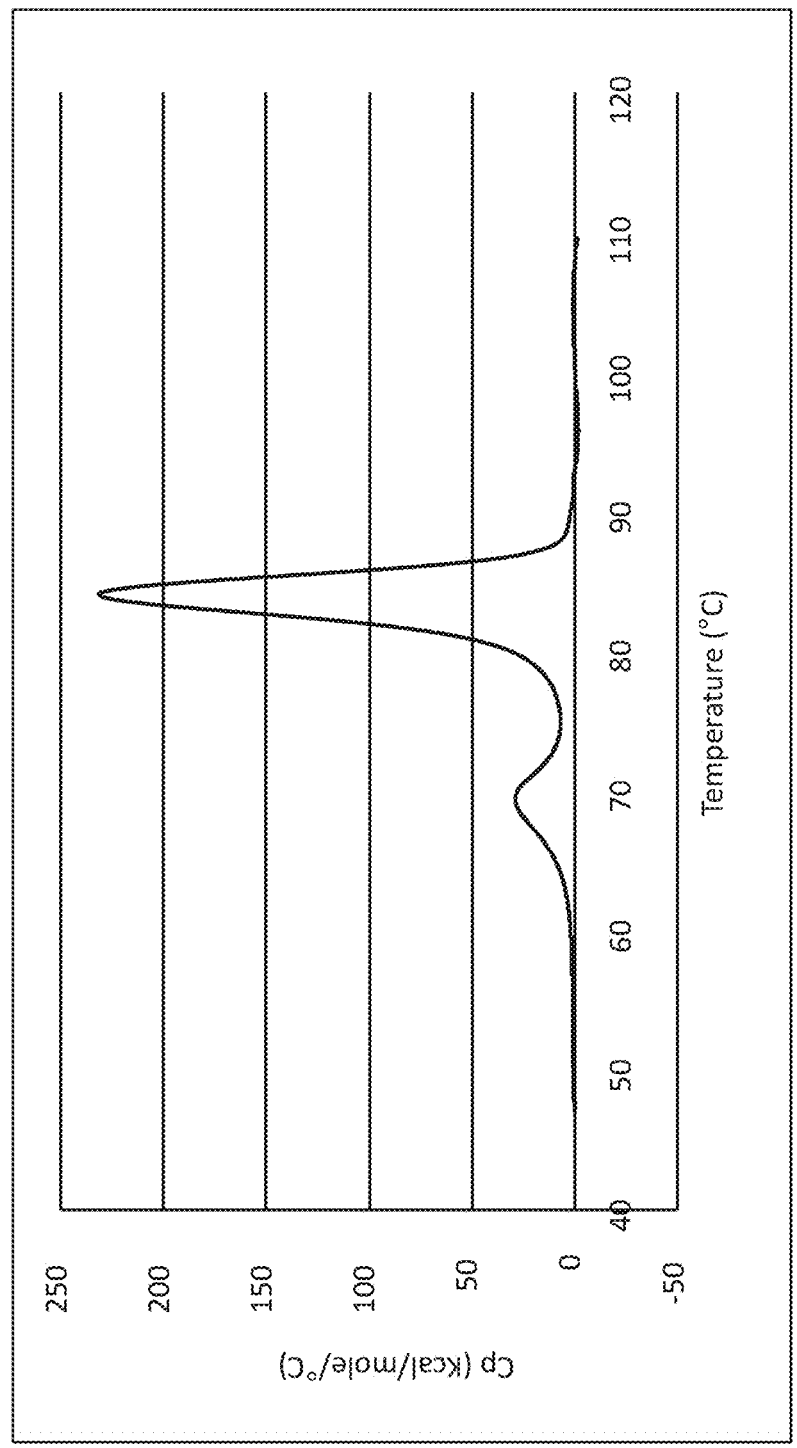
FIG. 15 shows the Differential Scanning calorimetry (DSC) profile of 20502 (afucosylated) in selected formulation. (See Example 6.)

A Differential Scanning calorimetry (DSC) profile of the 20502 antibody in a formulation containing 20 mM acetate, 270 mM sucrose, 0.05% PS20 at pH 5.0 was collected and is shown in FIG. 15. Two peaks were observed, with Tm1=69° C. and Tm2=84° C.

Example 7: Freeze-thaw Stability of 20502

A freeze/thaw study was performed by freezing 20502 bulk drug substance formulated as 20 mg/mL protein in 20 mM acetate, 270 mM sucrose, 0.05% PS20 formulation at pH 5.0 at 500 mL scale at −70° C. and thawing at ambient temperature through 5 cycles. No apparent changes in appearance, soluble aggregates, or subvisible particulate matter were detected (Table 17).

TABLE 17

Stability of 20502 Formulation After Freeze-Thaw

| Time Points (Months) | Temperature (° C.) | Appearance | | SEC | | | Subvisible Particulate Matter (cumulative count/1.7 mL vile) | | | |
|---|---|---|---|---|---|---|---|---|---|---|
| | | Clarity | Color | % HMW | % Main | % LMW | ≥2 μm | ≥5 μm | ≥10 μm | ≥25 μm |
| 0 FT | Frozen −70° C. | clear | colorless | 0.1 | 99.9 | NA | 68 | 30 | 17 | 2 |
| 1 FT | and thawed at | clear | colorless | 0.1 | 99.9 | NA | 38 | 11 | 2 | 0 |
| 2 FT | room | clear | colorless | 0.1 | 99.9 | NA | 23 | 2 | 0 | 0 |
| 3 FT | temperature | clear | colorless | 0.1 | 99.9 | NA | 34 | 9 | 0 | 0 |
| 4 FT | | clear | colorless | 0.1 | 99.9 | NA | 34 | 2 | 0 | 0 |
| 5 FT | | clear | colorless | 0.1 | 99.9 | NA | 25 | 2 | 0 | 0 |

Example 8: Agitation Stability of 20502

Agitation stress was exerted on 20502 by filling 20502 drug substance into 3 cc glass vials, placing the sample vials horizontally on an orbital shaker, and shaking the samples at 300 RPM for 72 hours at room temperature. The 20502 was formulated as 20 mg/mL protein in 20 mM acetate, 270 mM sucrose, 0.05% PS20 formulation at pH 5.0. No apparent changes in appearance, soluble aggregates, charge variants profiles, or subvisible particulate matter were detected in the 20502 formulation samples (Table 18). All studies were conducted at room temperature at 20±5° C. All samples had a clear and colorless appearance with no visible particles.

TABLE 18

Stability of 20502 Formulation After Agitation For 72 Hours

| Time Points | Condition | SEC | | | iCE | | | Subvisible Particulate Matter (cumulative count/ 1.7 mL vail) | | | |
| --- | --- | --- | --- | --- | --- | --- | --- | --- | --- | --- | --- |
| | | % HMW | % Main | % LMW | % Acidic | % Main | % Basic | ≥2 μm | ≥5 μm | ≥10 μm | ≥25 μm |
| 0 | Control | 0.1 | 99.9 | N/A | 44.3 | 32.9 | 22.8 | 55 | 21 | 5 | 0 |
| T24 h | Control | 0.1 | 99.9 | N/A | 44.7 | 31.5 | 23.8 | 68 | 18 | 2 | 0 |
| | Stressed | 0.1 | 99.9 | N/A | 44.7 | 31.5 | 23.8 | 105 | 9 | 2 | 0 |
| T48 h | Control | 0.1 | 99.9 | N/A | 45.4 | 32.9 | 21.7 | 106 | 45 | 19 | 0 |
| | Stressed | 0.1 | 99.9 | N/A | 43.3 | 34.3 | 22.4 | 123 | 23 | 11 | 0 |
| T72 h | Control | 0.1 | 99.9 | N/A | 44.1 | 32.7 | 23.1 | 94 | 23 | 2 | 0 |
| | Stressed | 0.1 | 99.9 | N/A | 44.9 | 34.5 | 20.6 | 62 | 9 | 2 | 0 |

Example 9: Confirmation Stability Studies

A stability study was performed to evaluate the stability of 20502 in two formulation (i) a formulation comprising 20 mg/mL protein in 20 mM acetate, 270 mM sucrose, and 0.05% PS20 at pH 5.0 and (ii) a formulation containing 20 mg/mL protein in 20 mM citrate, 270 mM sucrose, and 0.05% PS20 at pH 5.5. 1.5 mL of the formulated solutions were filled into 3 cc type 1 glass vials with 13 mm necks, capped with 13 mm West 4023/50 gray bromobutyl serum stoppers, and sealed with aluminum seals. The compatibility of the container closure system with antibody 20502 was evaluated by placing the vials in inverted positions. Storage conditions at 5° C., 25° C., and 40° C. were used for this stability study. Six months stability data shown in Table 19 to Table 21 for the acetate formulation and in Table 22 to Table 24 for the citrate formulation.

TABLE 19

Stability of 20502 Drug Product in Acetate Formulation at 5° C.

| Assay | Acceptance Criteria | T0 | 2-8° C. | | | |
| --- | --- | --- | --- | --- | --- | --- |
| | | | | 1 Month | 2 Months | 3 | 6 Months |
| Visual Appearance | Clear to slightly opalescent, colorless to slightly yellowish, may contain a few proteinaceous | Complies | Complies | Complies | Complies | Complies |
| pH | 4.5-5.5 | 4.9 | 4.9 | 5.0 | 4.9 | 5.0 |
| Osmolality | 270-370 | 321 | 325 | 337 | 324 | 323 |
| Concentration | 18-22 mg/mL | 19 | 19 | 20 | 20 | 20 |
| iCIEF | Report % Acidic | 37.8 | 37.9 | 36.4 | 35.3 | 37.2 |

TABLE 19-continued

Stability of 20502 Drug Product in Acetate Formulation at 5° C.

| Assay | Acceptance Criteria | T0 | 2-8° C. | | | |
|---|---|---|---|---|---|---|
| | | | 1 Month | 2 Months | 3 | 6 Months |
| | Report % Main | 51.2 | 49.4 | 51.3 | 49.5 | 47.1 |
| | Report % Basic | 11.0 | 12.7 | 12.2 | 15.2 | 15.8 |
| SE-HPLC | ≤5% Aggregate | 0.2 | 0.1 | 0.1 | 0.2 | 0.2 |
| | ≥90% Monomer | 99.9 | 99.9 | 99.8 | 99.6 | 99.6 |
| | Report % Low molecular weight | 0 | 0 | 0.1 | 0.3 | 0.3 |
| CE-SDS Reduced | ≥90% Heavy chain and light | 98.8 | 99.4 | 99.5 | 99.2 | 99.4 |
| CE-SDS Non- | Report value (% Main peak) | 94.0 | 93.6 | 93.8 | 93.8 | 93.7 |
| Potency by Binding | 50-150% of Reference | 100 | 102 | NT | 99 | 106 |
| Potency by ADCC | Report result (% Reference | 107 | NP | NP | NP | 95 |

Abbreviations:
NP = Not planned
NT = Not tested;
T0 = Time zero.

TABLE 20

Stability of 20502 Drug Product in Acetate Formulation at 25° C.

| Assay | Acceptance Criteria | T0 | 25° C. | | | |
|---|---|---|---|---|---|---|
| | | | 1 Month | 2 Months | 3 Months | 6 Months |
| Visual Appearance | Clear to slightly opalescent, colorless to slightly yellowish, may contain a few proteinaceous particles | Complies | Complies | Complies | Complies | Complies |
| pH | 4.5-5.5 | 4.9 | 5.0 | 54.9 | 4.9 | 5.0 |
| Osmolality | 270-370 mOSm/kg | 321 | 330 | 340 | 329 | 330 |
| Concentration | 18-22 mg/mL | 19 | 19 | 20 | 20 | 20 |
| iCIEF | Report % Acidic peaks | 37.8 | 40.7 | 41.0 | 44.8 | 52.0 |
| | Report % Main peaks | 51.2 | 47.0 | 47.2 | 41.3 | 35.5 |
| | Report % Basic peaks | 11.0 | 12.4 | 11.8 | 13.9 | 13.5 |
| SE-HPLC | ≤5% Aggregate | 0.2 | 0.2 | 0.2 | 0.3 | 0.4 |
| | ≥90% Monomer | 99.9 | 99.7 | 99.5 | 99.0 | 99.6 |
| | Report % Low molecular weight | 0 | 0.1 | 0.3 | 0.7 | 1.0 |
| CE-SDS Reduced | ≥90% Heavy chain and light chain | 98.8 | 99.1 | 99.4 | 98.8 | 98.6 |
| CE-SDS Non- | Report value (% Main peak) | 94.0 | 93.3 | 92.8 | 92.1 | 91.2 |
| Potency by Binding | 50-150% of Reference Material | 100 | 101 | NT | 89 | 107 |
| Potency by ADCC | Report result (% Reference | 107 | NP | NP | NP | 80 |

TABLE 21

Stability of 20502 Drug Product in Acetate Formulation at 40° C.

| Assay | Acceptance Criteria | T0 | 40° C. | | | |
|---|---|---|---|---|---|---|
| | | | 2 Weeks | 1 Month | 2 Months | 3 Months |
| Visual Appearance | Clear to slightly opalescent, colorless to slightly yellowish, may contain a few proteinaceous | Complies | Complies | Complies | Complies | Complies |

TABLE 21-continued

Stability of 20502 Drug Product in Acetate Formulation at 40° C.

| Assay | Acceptance Criteria | T0 | 40° C. | | | |
|---|---|---|---|---|---|---|
| | | | 2 Weeks | 1 Month | 2 Months | 3 Months |
| | particles | | | | | |
| pH | 4.5-5.5 | 4.9 | 5.0 | 5.0 | 5.0 | 5.0 |
| Osmolality | 270-370 mOSm/kg | 321 | 325 | 330 | 356 | 350 |
| Concentration | 18-22 mg/mL | 19 | 19 | 19 | 20 | 20 |
| iCIEF | Report % Acidic | 37.8 | 50.1 | 61.8 | 76.4 | 85.1 |
| | Report % Main peaks | 51.2 | 37.6 | 28.5 | 16.3 | 7.5 |
| | Report % Basic peaks | 11.0 | 12.3 | 9.7 | 7.3 | 7.5 |
| SE-HPLC | ≤5% Aggregate | 0.2 | 0.3 | 0.4 | 0.6 | 1.3 |
| | ≥90% Monomer | 99.9 | 99.3 | 98.8 | 97.6 | 95.0 |
| | Report % Low molecular weight | 0 | 0.4 | 0.8 | 1.9 | 3.7 |
| CE-SDS | ≥90% Heavy chain and | 98.8 | 98.0 | 97.1 | 94.3 | 81.9 |
| CE-SDS Non- | Report value (% Main peak) | 94.0 | 92.7 | 90.2 | 87.0 | 69.7 |
| Potency by Binding | 50-150% of Reference | 100 | 88 | 93 | NT | 73 |
| Potency by ADCC | Report result (% Reference | 107 | NP | NP | NP | 31 |

TABLE 22

Stability of 20502 Drug Product in Citrate Formulation at 5° C.

| Assay | Acceptance Criteria | T0 | 2-8° C. | | | |
|---|---|---|---|---|---|---|
| | | | 1 Month | 2 Months | 3 Months | 6 Months |
| Visual Appearance | Clear to slightly opalescent, colorless to slightly yellowish, may contain a few proteinaceous particles | Complies | Complies | Complies | Complies | Complies |
| pH | 5.0-6.0 | 5.5 | 5.5 | 5.5 | 5.5 | 5.5 |
| Osmolality | 270-370 mOSm/kg | 330 | 333 | 343 | 329 | 326 |
| Concentration | 18-22 mg/mL | 21 | 21 | 21 | 20 | 21 |
| iCIEF | Report % Acidic peaks | 37.6 | 38.0 | 36.8 | 35.7 | 37.3 |
| | Report % Main peaks | 51.5 | 49.4 | 51.8 | 49.6 | 47.2 |
| | Report % Basic peaks | 11.0 | 12.6 | 11.4 | 14.6 | 15.5 |
| SE-HPLC | ≤5% Aggregate | 0.2 | 0.3 | 0.3 | 0.4 | 0.5 |
| | ≥90% Monomer | 99.8 | 99.8 | 99.7 | 99.6 | 99.3 |
| | Report % Low molecular | 0 | 0 | 0.1 | 0 | 0.2 |
| CE-SDS Reduced | ≥90% Heavy chain and light chain | 99.1 | 99.5 | 99.7 | 98.8 | 99.3 |
| CE-SDS Non- | Report value (% Main peak) | 94.1 | 93.5 | 93.6 | 93.9 | 93.3 |
| Potency by Binding ELISA | 50-150% of Reference Material | 105 | 114 | NT | 110 | 102 |
| Potency by ADCC | Report result (% Reference Material) | 97 | NP | NP | NP | 94 |

TABLE 23

Stability of 20502 Drug Product in Citrate Formulation at 25° C.

| Assay | Acceptance Criteria | T0 | 25° C. | | | |
|---|---|---|---|---|---|---|
| | | | 1 Month | 2 Months | 3 Months | 6 Months |
| Visual Appearance | Clear to slightly opalescent, colorless to slightly yellowish, may contain a few proteinaceous particles | Complies | Complies | Complies | Complies | Complies |

TABLE 23-continued

Stability of 20502 Drug Product in Citrate Formulation at 25° C.

| | | | 25° C. | | | |
|---|---|---|---|---|---|---|
| Assay | Acceptance Criteria | T0 | 1 Month | 2 Months | 3 Months | 6 Months |
| pH | 5.0-6.0 | 5.5 | 5.5 | 5.5 | 5.5 | 5.5 |
| Osmolality | 270-370 mOSm/kg | 330 | 333 | 345 | 334 | 328 |
| Concentration | 18-22 mg/mL | 21 | 21 | 21 | 20 | 21 |
| iCIEF | Report % Acidic peaks | 37.6 | 39.8 | 41.6 | 45.2 | 53.3 |
| | Report % Main peaks | 51.5 | 48.2 | 47.0 | 40.7 | 33.4 |
| | Report % Basic peaks | 11.0 | 12.0 | 11.5 | 14.1 | 13.4 |
| SE-HPLC | ≤5% Aggregate | 0.2 | 0.6 | 0.7 | 1.0 | 1.3 |
| | ≥90% Monomer | 99.8 | 99.3 | 99.1 | 98.5 | 97.9 |
| | Report % Low molecular weight | 0 | 0.1 | 0.2 | 0.5 | 0.9 |
| CE-SDS Reduced | ≥90% Heavy chain and light | 99.1 | 99.1 | 99.5 | 98.9 | 98.8 |
| CE-SDS Non-Reduced | Report value (% Main peak) | 94.1 | 93.5 | 93.5 | 92.2 | 91.6 |
| Potency by Binding ELISA | 50-150% of Reference Material | 105 | 111 | NT | 106 | 97 |
| Potency by ADCC | Report result (% Reference) | 97 | NP | NP | NP | 62 |

TABLE 24

Stability of 20502 Drug Product in Citrate Formulation at 40° C.

| | | | 40° C. | | | |
|---|---|---|---|---|---|---|
| Assay | Acceptance Criteria | T0 | 2 Weeks | 1 Month | 2 Months | 3 Months |
| Visual Appearance | Clear to slightly opalescent, colorless to slightly yellowish, may contain a few proteinaceous particles | Complies | Complies | Complies | Complies | Complies |
| pH | 5.0-6.0 | 5.5 | 5.5 | 5.5 | 5.5 | 5.5 |
| Osmolality | 270-370 mOSm/kg | 330 | 334 | 336 | 359 | 344 |
| Concentration | 18-22 mg/mL | 21 | 20 | 21 | 19 | 20 |
| iCIEF | Report % Acidic | 37.6 | 50.6 | 59.5 | 74.5 | 82.9 |
| | Report % Main | 51.5 | 38.1 | 30.6 | 18.2 | 10.0 |
| | Report % Basic | 11.0 | 11.3 | 9.9 | 7.3 | 7.2 |
| SE-HPLC | ≤5% Aggregate | 0.2 | 1.0 | 1.3 | 1.8 | 2.7 |
| | ≥90% Monomer | 99.8 | 98.7 | 98.0 | 96.8 | 94.7 |
| | Report % Low molecular weight | 0 | 0.4 | 0.6 | 1.4 | 2.7 |
| CE-SDS Reduced | ≥90% Heavy chain and | 99.1 | 97.9 | 97.5 | 96.2 | 87.1 |
| CE-SDS Non-Reduced | Report value (% Main peak) | 94.1 | 93.1 | 91.0 | 88.0 | 77.3 |
| Potency by Binding ELISA | 50-150% of Reference | 105 | 104 | 101 | NT | 82 |
| Potency by ADCC | Report result (% Reference) | 97 | NP | NP | NP | 40 |

Stability data of 20502 drug product under the long-term storage condition of 2-8° C. were collected in real-time in acetate and citrate formulations for 6 months. All stability data met the acceptance criteria (Table 19 and Table 22). No clear trend of stability changes was observed in any of the attributes tested. The results demonstrate 20502 drug product is stable in both formulations under the long-term storage condition at 2-8° C. for at least 6 months.

Stability data at the accelerated condition of 25° C. were collected in acetate and citrate formulations for 6 months. Overall, storage at the accelerated condition for 6 months resulted in an increase of acidic peaks and decrease of main peak as determined by iCE; slight increase of aggregates and fragments as determined by SE-HPLC; slight decrease of purity as determined by reduced and non-reduced CE-SDS; and slight decrease potency as determined by a cell-based ADCC assay. No change in other product attributes was observed. All stability data were within the acceptance criteria.

Stability data at the stressed condition of 40° C. were collected for 3 months. Some changes were more noticeable in data collected over time. The trends were similar to those shown at the accelerated storage condition (25° C.). An increase of acidic peaks and decrease of main and basic peaks by iCE was observed. An increase of aggregate and fragment with a decrease of monomer was observed by SE-HPLC. In addition, the purity decreased under this condition as demonstrated by reduced and non-reduced CE-SDS analysis. Decrease of potency in cell based ADCC assay was also observed. These results are consistent with changes expected for protein therapeutics stored under this condition.

The above studies were conducted to identify formulation conditions that provide maximal stability for 20502. These include pH screening, buffer species selection, and excipient selection studies. 20502 was most stable in the range of pH 5-6 in the acetate or citrate buffer. 20502 was also stable when sucrose was used as excipient. A formulation containing 20 mg/mL protein in 20 mM acetate, 270 mM sucrose, and 0.05% PS20 at pH 5.0 was selected. A backup formulation as 20 mg/mL protein in 20 mM citrate, 270 mM sucrose, 0.05% PS20, pH 5.5 was also selected.

Antibody 20502 is also stable in the acetate formulation under freeze-thaw and agitation conditions. 20502 in acetate formulation is expected to be stable both as drug substance when stored at −70° C. and as drug product when stored at 2-8° C. for at least 12 months.

The invention is not to be limited in scope by the specific embodiments described herein. Indeed, various modifications provided herein in addition to those described will become apparent to those skilled in the art from the foregoing description and accompanying figures. Such modifications are intended to fall within the scope of the appended claims.

All references (e.g., publications or patents or patent applications) cited herein are incorporated herein by reference in their entirety and for all purposes to the same extent as if each individual reference (e.g., publication or patent or patent application) was specifically and individually indicated to be incorporated by reference in its entirety for all purposes.

Other embodiments are within the following claims.

What is claimed:

1. A pharmaceutical composition comprising (i) an antibody or antigen-binding fragment thereof that specifically binds to human B7-H4 and comprises the VH CDR1, VH CDR2, VH CDR3 and VL CDR1, CDR2, and CDR3 sequences of SEQ ID NOs: 5-10, respectively, (ii) a buffer, and (iii) a pH of about 4.5 to about 6.

2. The composition of claim 1, wherein the buffer is acetate or citrate and the composition comprises about 30% to about 40% of acidic variants of the antibody or antigen-binding fragment thereof after 6 months at 5° C.

3. The composition of claim 1, wherein the buffer is acetate or citrate and the composition comprises about 10% to about 17% of basic variants of the antibody or antigen-binding fragment thereof after 6 months at 5° C.

4. The composition of claim 1, wherein the buffer is acetate or citrate and the composition comprises no more than 55% of acidic and basic variants of the antibody or antigen-binding fragment thereof after 6 months at 5° C.

5. The composition of claim 1, wherein the composition further comprises a sugar.

6. The composition of claim 1, wherein the concentration of the buffer is about 15 to about 25 mM.

7. The composition of claim 5, wherein the concentration of the sugar is about 225 mM to about 300 mM.

8. The composition of claim 1, wherein the composition further comprises a surfactant.

9. The composition of claim 1, wherein the concentration of the antibody or antigen-binding fragment thereof is about 5 mg/ml to about 30 mg/ml.

10. The composition of claim 1 comprising about 20 mM acetate, about 270 mM sucrose, about 20 mg/ml of the antibody or antigen-binding fragment thereof, and about 0.05% polysorbate 20, wherein the pH is about 5.0.

11. The composition of claim 1, comprising about 20 mM citrate, about 270 mM sucrose, about 20 mg/ml of the antibody or antigen-binding fragment thereof, and about 0.05% polysorbate 20, wherein the pH is about 5.5.

12. The composition of claim 1, wherein the antibody comprises a VH comprising the amino acid sequence set forth in SEQ ID NO:11 and/or a VL comprising the amino acid sequence set forth in SEQ ID NO:12.

13. The composition of claim 12, wherein the antibody or antigen-binding fragment thereof comprises a heavy chain comprising the amino acid sequence set forth in SEQ ID NO:21 and/or a light chain comprising the amino acid sequence set forth in SEQ ID NO:22.

14. The composition of claim 1, wherein at least 95% of the antibodies or antigen-binding fragments thereof in the composition are afucosylated.

15. A pharmaceutical composition consisting of (i) an antibody comprising a heavy chain comprising the amino acid sequence set forth in SEQ ID NO: 21 and/or a light chain comprising the amino acid sequence set forth in SEQ ID NO:22, (ii) about 20 mM acetate, (iii) about 270 mM sucrose, and (iv) about 0.05% weight/volume polysorbate 20, wherein the pH of the composition is about 5.0 to about 5.5.

16. A syringe or vial comprising the pharmaceutical composition of claim 1.

17. A method of treating a B7-H4 expressing cancer in a subject, the method comprising administering to the subject the pharmaceutical composition of claim 1.

18. The method of claim 17, wherein the cancer is selected from the group consisting of breast cancer, ductal carcinoma, endometrial carcinoma, ovarian cancer, non-small cell lung cancer, pancreatic cancer, thyroid cancer, kidney cancer, and bladder cancer.

19. The method of claim 17, wherein the pharmaceutical composition is administered parenterally or intravenously.

* * * * *

```
                        SEQUENCE LISTING

<160> NUMBER OF SEQ ID NOS: 28

<210> SEQ ID NO 1
<211> LENGTH: 282
<212> TYPE: PRT
<213> ORGANISM: Artificial Sequence
<220> FEATURE:
<223> OTHER INFORMATION: human B7-H4

<400> SEQUENCE: 1

Met Ala Ser Leu Gly Gln Ile Leu Phe Trp Ser Ile Ile Ser Ile Ile
1               5                   10                  15

Ile Ile Leu Ala Gly Ala Ile Ala Leu Ile Ile Gly Phe Gly Ile Ser
                20                  25                  30

Gly Arg His Ser Ile Thr Val Thr Val Ala Ser Ala Gly Asn Ile
            35                  40                  45

Gly Glu Asp Gly Ile Leu Ser Cys Thr Phe Glu Pro Asp Ile Lys Leu
    50                  55                  60

Ser Asp Ile Val Ile Gln Trp Leu Lys Glu Gly Val Leu Gly Leu Val
65                  70                  75                  80

His Glu Phe Lys Glu Gly Lys Asp Glu Leu Ser Glu Gln Asp Glu Met
                85                  90                  95

Phe Arg Gly Arg Thr Ala Val Phe Ala Asp Gln Val Ile Val Gly Asn
            100                 105                 110

Ala Ser Leu Arg Leu Lys Asn Val Gln Leu Thr Asp Ala Gly Thr Tyr
        115                 120                 125

Lys Cys Tyr Ile Ile Thr Ser Lys Gly Lys Gly Asn Ala Asn Leu Glu
    130                 135                 140

Tyr Lys Thr Gly Ala Phe Ser Met Pro Glu Val Asn Val Asp Tyr Asn
145                 150                 155                 160

Ala Ser Ser Glu Thr Leu Arg Cys Glu Ala Pro Arg Trp Phe Pro Gln
                165                 170                 175

Pro Thr Val Val Trp Ala Ser Gln Val Asp Gln Gly Ala Asn Phe Ser
            180                 185                 190

Glu Val Ser Asn Thr Ser Phe Glu Leu Asn Ser Glu Asn Val Thr Met
        195                 200                 205

Lys Val Val Ser Val Leu Tyr Asn Val Thr Ile Asn Asn Thr Tyr Ser
    210                 215                 220

Cys Met Ile Glu Asn Asp Ile Ala Lys Ala Thr Gly Asp Ile Lys Val
225                 230                 235                 240
```

```
Thr Glu Ser Glu Ile Lys Arg Arg Ser His Leu Gln Leu Leu Asn Ser
            245                 250                 255

Lys Ala Ser Leu Cys Val Ser Ser Phe Ala Ile Ser Trp Ala Leu
        260                 265                 270

Leu Pro Leu Ser Pro Tyr Leu Met Leu Lys
        275                 280

<210> SEQ ID NO 2
<211> LENGTH: 282
<212> TYPE: PRT
<213> ORGANISM: Artificial Sequence
<220> FEATURE:
<223> OTHER INFORMATION: Cynomolgus monkey B7-H4

<400> SEQUENCE: 2

Met Ala Ser Leu Gly Gln Ile Leu Phe Trp Ser Ile Ile Ser Ile Ile
1               5                   10                  15

Phe Ile Leu Ala Gly Ala Ile Ala Leu Ile Ile Gly Phe Gly Ile Ser
            20                  25                  30

Gly Arg His Ser Ile Thr Val Thr Thr Val Ala Ser Ala Gly Asn Ile
        35                  40                  45

Gly Glu Asp Gly Ile Leu Ser Cys Thr Phe Glu Pro Asp Ile Lys Leu
    50                  55                  60

Ser Asp Ile Val Ile Gln Trp Leu Lys Glu Gly Val Ile Gly Leu Val
65                  70                  75                  80

His Glu Phe Lys Glu Gly Lys Asp Glu Leu Ser Glu Gln Asp Glu Met
                85                  90                  95

Phe Arg Gly Arg Thr Ala Val Phe Ala Asp Gln Val Ile Val Gly Asn
            100                 105                 110

Ala Ser Leu Arg Leu Lys Asn Val Gln Leu Thr Asp Ala Gly Thr Tyr
        115                 120                 125

Lys Cys Tyr Ile Ile Thr Ser Lys Gly Lys Gly Asn Ala Asn Leu Glu
    130                 135                 140

Tyr Lys Thr Gly Ala Phe Ser Met Pro Glu Val Asn Val Asp Tyr Asn
145                 150                 155                 160

Ala Ser Ser Glu Thr Leu Arg Cys Glu Ala Pro Arg Trp Phe Pro Gln
                165                 170                 175

Pro Thr Val Val Trp Ala Ser Gln Val Asp Gln Gly Ala Asn Phe Ser
            180                 185                 190

Glu Val Ser Asn Thr Ser Phe Glu Leu Asn Ser Glu Asn Val Thr Met
        195                 200                 205

Lys Val Val Ser Val Leu Tyr Asn Val Thr Ile Asn Asn Thr Tyr Ser
    210                 215                 220

Cys Met Ile Glu Asn Asp Ile Ala Lys Ala Thr Gly Asp Ile Lys Val
225                 230                 235                 240

Thr Glu Ser Glu Ile Lys Arg Arg Ser His Leu Gln Leu Leu Asn Ser
                245                 250                 255

Lys Ala Ser Leu Cys Val Ser Ser Phe Leu Ala Ile Ser Trp Ala Leu
            260                 265                 270

Leu Pro Leu Ala Pro Tyr Leu Met Leu Lys
        275                 280

<210> SEQ ID NO 3
<211> LENGTH: 283
<212> TYPE: PRT
<213> ORGANISM: Artificial Sequence
```

```
<220> FEATURE:
<223> OTHER INFORMATION: Murine B7-H4

<400> SEQUENCE: 3

Met Ala Ser Leu Gly Gln Ile Ile Phe Trp Ser Ile Ile Asn Ile Ile
1               5                   10                  15

Ile Ile Leu Ala Gly Ala Ile Ala Leu Ile Ile Gly Phe Gly Ile Ser
                20                  25                  30

Gly Lys His Phe Ile Thr Val Thr Thr Phe Thr Ser Ala Gly Asn Ile
            35                  40                  45

Gly Glu Asp Gly Thr Leu Ser Cys Thr Phe Glu Pro Asp Ile Lys Leu
        50                  55                  60

Asn Gly Ile Val Ile Gln Trp Leu Lys Glu Gly Ile Lys Gly Leu Val
65                  70                  75                  80

His Glu Phe Lys Glu Gly Lys Asp Asp Leu Ser Gln Gln His Glu Met
                85                  90                  95

Phe Arg Gly Arg Thr Ala Val Phe Ala Asp Gln Val Val Val Gly Asn
            100                 105                 110

Ala Ser Leu Arg Leu Lys Asn Val Gln Leu Thr Asp Ala Gly Thr Tyr
        115                 120                 125

Thr Cys Tyr Ile Arg Thr Ser Lys Gly Lys Gly Asn Ala Asn Leu Glu
130                 135                 140

Tyr Lys Thr Gly Ala Phe Ser Met Pro Glu Ile Asn Val Asp Tyr Asn
145                 150                 155                 160

Ala Ser Ser Glu Ser Leu Arg Cys Glu Ala Pro Arg Trp Phe Pro Gln
                165                 170                 175

Pro Thr Val Ala Trp Ala Ser Gln Val Asp Gln Gly Ala Asn Phe Ser
            180                 185                 190

Glu Val Ser Asn Thr Ser Phe Glu Leu Asn Ser Glu Asn Val Thr Met
        195                 200                 205

Lys Val Val Ser Val Leu Tyr Asn Val Thr Ile Asn Asn Thr Tyr Ser
210                 215                 220

Cys Met Ile Glu Asn Asp Ile Ala Lys Ala Thr Gly Asp Ile Lys Val
225                 230                 235                 240

Thr Asp Ser Glu Val Lys Arg Arg Ser Gln Leu Gln Leu Leu Asn Ser
                245                 250                 255

Gly Pro Ser Pro Cys Val Phe Ser Ala Phe Val Ala Gly Trp Ala
            260                 265                 270

Leu Leu Ser Leu Ser Cys Cys Leu Met Leu Arg
        275                 280

<210> SEQ ID NO 4
<211> LENGTH: 282
<212> TYPE: PRT
<213> ORGANISM: Artificial Sequence
<220> FEATURE:
<223> OTHER INFORMATION: Rat B7-H4

<400> SEQUENCE: 4

Met Ala Ser Leu Gly Gln Ile Ile Phe Trp Ser Ile Ile Asn Val Ile
1               5                   10                  15

Ile Ile Leu Ala Gly Ala Ile Val Leu Ile Ile Gly Phe Gly Ile Ser
                20                  25                  30

Gly Lys His Phe Ile Thr Val Thr Thr Phe Thr Ser Ala Gly Asn Ile
            35                  40                  45

Gly Glu Asp Gly Thr Leu Ser Cys Thr Phe Glu Pro Asp Ile Lys Leu
```

```
                50                  55                  60
Asn Gly Ile Val Ile Gln Trp Leu Lys Glu Gly Ile Lys Gly Leu Val
 65                  70                  75                  80

His Glu Phe Lys Glu Gly Lys Asp Leu Ser Gln Gln His Glu Met
                 85                  90                  95

Phe Arg Gly Arg Thr Ala Val Phe Ala Asp Gln Val Val Gly Asn
                100                 105                 110

Ala Ser Leu Arg Leu Lys Asn Val Gln Leu Thr Asp Ala Gly Thr Tyr
                115                 120                 125

Thr Cys Tyr Ile His Thr Ser Lys Gly Lys Gly Asn Ala Asn Leu Glu
                130                 135                 140

Tyr Lys Thr Gly Ala Phe Ser Met Pro Glu Ile Asn Val Asp Tyr Asn
145                 150                 155                 160

Ala Ser Ser Glu Ser Leu Arg Cys Glu Ala Pro Arg Trp Phe Pro Gln
                165                 170                 175

Pro Thr Val Ala Trp Ala Ser Gln Val Asp Gln Gly Ala Asn Phe Ser
                180                 185                 190

Glu Val Ser Asn Thr Ser Phe Glu Leu Asn Ser Glu Asn Val Thr Met
                195                 200                 205

Lys Val Val Ser Val Leu Tyr Asn Val Thr Ile Asn Asn Thr Tyr Ser
210                 215                 220

Cys Met Ile Glu Asn Asp Ile Ala Lys Ala Thr Gly Asp Ile Lys Val
225                 230                 235                 240

Thr Asp Ser Glu Val Lys Arg Arg Ser Gln Leu Glu Leu Leu Asn Ser
                245                 250                 255

Gly Pro Ser Pro Cys Val Ser Val Ser Ala Ala Gly Trp Ala Leu
                260                 265                 270

Leu Ser Leu Ser Cys Cys Leu Met Leu Arg
                275                 280

<210> SEQ ID NO 5
<211> LENGTH: 11
<212> TYPE: PRT
<213> ORGANISM: Artificial Sequence
<220> FEATURE:
<223> OTHER INFORMATION: VH CDR1

<400> SEQUENCE: 5

Gly Ser Ile Lys Ser Gly Ser Tyr Tyr Trp Gly
1               5                   10

<210> SEQ ID NO 6
<211> LENGTH: 16
<212> TYPE: PRT
<213> ORGANISM: Artificial Sequence
<220> FEATURE:
<223> OTHER INFORMATION: VH CDR2

<400> SEQUENCE: 6

Asn Ile Tyr Tyr Ser Gly Ser Thr Tyr Tyr Asn Pro Ser Leu Arg Ser
1               5                   10                  15

<210> SEQ ID NO 7
<211> LENGTH: 12
<212> TYPE: PRT
<213> ORGANISM: Artificial Sequence
<220> FEATURE:
<223> OTHER INFORMATION: VH CDR3

<400> SEQUENCE: 7
```

Ala Arg Glu Gly Ser Tyr Pro Asn Gln Phe Asp Pro
1               5                   10

<210> SEQ ID NO 8
<211> LENGTH: 11
<212> TYPE: PRT
<213> ORGANISM: Artificial Sequence
<220> FEATURE:
<223> OTHER INFORMATION: VL CDR1

<400> SEQUENCE: 8

Arg Ala Ser Gln Ser Val Ser Ser Asn Leu Ala
1               5                   10

<210> SEQ ID NO 9
<211> LENGTH: 7
<212> TYPE: PRT
<213> ORGANISM: Artificial Sequence
<220> FEATURE:
<223> OTHER INFORMATION: VL CDR2

<400> SEQUENCE: 9

Gly Ala Ser Thr Arg Ala Thr
1               5

<210> SEQ ID NO 10
<211> LENGTH: 9
<212> TYPE: PRT
<213> ORGANISM: Artificial Sequence
<220> FEATURE:
<223> OTHER INFORMATION: VL CDR3

<400> SEQUENCE: 10

Gln Gln Tyr His Ser Phe Pro Phe Thr
1               5

<210> SEQ ID NO 11
<211> LENGTH: 120
<212> TYPE: PRT
<213> ORGANISM: Artificial Sequence
<220> FEATURE:
<223> OTHER INFORMATION: Variable Heavy Chain (VH)

<400> SEQUENCE: 11

Gln Leu Gln Leu Gln Glu Ser Gly Pro Gly Leu Val Lys Pro Ser Glu
1               5                   10                  15

Thr Leu Ser Leu Thr Cys Thr Val Ser Gly Gly Ser Ile Lys Ser Gly
                20                  25                  30

Ser Tyr Tyr Trp Gly Trp Ile Arg Gln Pro Pro Gly Lys Gly Leu Glu
            35                  40                  45

Trp Ile Gly Asn Ile Tyr Tyr Ser Gly Ser Thr Tyr Tyr Asn Pro Ser
        50                  55                  60

Leu Arg Ser Arg Val Thr Ile Ser Val Asp Thr Ser Lys Asn Gln Phe
65                  70                  75                  80

Ser Leu Lys Leu Ser Ser Val Thr Ala Ala Asp Thr Ala Val Tyr Tyr
                85                  90                  95

Cys Ala Arg Glu Gly Ser Tyr Pro Asn Gln Phe Asp Pro Trp Gly Gln
            100                 105                 110

Gly Thr Leu Val Thr Val Ser Ser
        115                 120

<210> SEQ ID NO 12

```
<211> LENGTH: 107
<212> TYPE: PRT
<213> ORGANISM: Artificial Sequence
<220> FEATURE:
<223> OTHER INFORMATION: Variable Light Chain (VL)

<400> SEQUENCE: 12

Glu Ile Val Met Thr Gln Ser Pro Ala Thr Leu Ser Val Ser Pro Gly
1               5                   10                  15

Glu Arg Ala Thr Leu Ser Cys Arg Ala Ser Gln Ser Val Ser Ser Asn
            20                  25                  30

Leu Ala Trp Tyr Gln Gln Lys Pro Gly Gln Ala Pro Arg Leu Leu Ile
        35                  40                  45

Tyr Gly Ala Ser Thr Arg Ala Thr Gly Ile Pro Ala Arg Phe Ser Gly
50                  55                  60

Ser Gly Ser Gly Thr Glu Phe Thr Leu Thr Ile Ser Ser Leu Gln Ser
65                  70                  75                  80

Glu Asp Phe Ala Val Tyr Tyr Cys Gln Gln Tyr His Ser Phe Pro Phe
                85                  90                  95

Thr Phe Gly Gly Gly Thr Lys Val Glu Ile Lys
            100                 105

<210> SEQ ID NO 13
<211> LENGTH: 26
<212> TYPE: PRT
<213> ORGANISM: Artificial Sequence
<220> FEATURE:
<223> OTHER INFORMATION: VH FR1

<400> SEQUENCE: 13

Gln Leu Gln Leu Gln Glu Ser Gly Pro Gly Leu Val Lys Pro Ser Glu
1               5                   10                  15

Thr Leu Ser Leu Thr Cys Thr Val Ser Gly
            20                  25

<210> SEQ ID NO 14
<211> LENGTH: 14
<212> TYPE: PRT
<213> ORGANISM: Artificial Sequence
<220> FEATURE:
<223> OTHER INFORMATION: VH FR2

<400> SEQUENCE: 14

Trp Ile Arg Gln Pro Pro Gly Lys Gly Leu Glu Trp Ile Gly
1               5                   10

<210> SEQ ID NO 15
<211> LENGTH: 30
<212> TYPE: PRT
<213> ORGANISM: Artificial Sequence
<220> FEATURE:
<223> OTHER INFORMATION: VH FR3

<400> SEQUENCE: 15

Arg Val Thr Ile Ser Val Asp Thr Ser Lys Asn Gln Phe Ser Leu Lys
1               5                   10                  15

Leu Ser Ser Val Thr Ala Ala Asp Thr Ala Val Tyr Tyr Cys
            20                  25                  30

<210> SEQ ID NO 16
<211> LENGTH: 11
<212> TYPE: PRT
<213> ORGANISM: Artificial Sequence
```

```
<220> FEATURE:
<223> OTHER INFORMATION: VH FR4

<400> SEQUENCE: 16

Trp Gly Gln Gly Thr Leu Val Thr Val Ser Ser
1               5                   10

<210> SEQ ID NO 17
<211> LENGTH: 23
<212> TYPE: PRT
<213> ORGANISM: Artificial Sequence
<220> FEATURE:
<223> OTHER INFORMATION: VL FR1

<400> SEQUENCE: 17

Glu Ile Val Met Thr Gln Ser Pro Ala Thr Leu Ser Val Ser Pro Gly
1               5                   10                  15

Glu Arg Ala Thr Leu Ser Cys
            20

<210> SEQ ID NO 18
<211> LENGTH: 15
<212> TYPE: PRT
<213> ORGANISM: Artificial Sequence
<220> FEATURE:
<223> OTHER INFORMATION: VL FR2

<400> SEQUENCE: 18

Trp Tyr Gln Gln Lys Pro Gly Gln Ala Pro Arg Leu Leu Ile Tyr
1               5                   10                  15

<210> SEQ ID NO 19
<211> LENGTH: 32
<212> TYPE: PRT
<213> ORGANISM: Artificial Sequence
<220> FEATURE:
<223> OTHER INFORMATION: VL FR3

<400> SEQUENCE: 19

Gly Ile Pro Ala Arg Phe Ser Gly Ser Gly Ser Gly Thr Glu Phe Thr
1               5                   10                  15

Leu Thr Ile Ser Ser Leu Gln Ser Glu Asp Phe Ala Val Tyr Tyr Cys
            20                  25                  30

<210> SEQ ID NO 20
<211> LENGTH: 10
<212> TYPE: PRT
<213> ORGANISM: Artificial Sequence
<220> FEATURE:
<223> OTHER INFORMATION: VL FR4

<400> SEQUENCE: 20

Phe Gly Gly Gly Thr Lys Val Glu Ile Lys
1               5                   10

<210> SEQ ID NO 21
<211> LENGTH: 450
<212> TYPE: PRT
<213> ORGANISM: Artificial Sequence
<220> FEATURE:
<223> OTHER INFORMATION: Full-Length Heavy Chain Amino Acid Sequence

<400> SEQUENCE: 21

Gln Leu Gln Leu Gln Glu Ser Gly Pro Gly Leu Val Lys Pro Ser Glu
1               5                   10                  15
```

-continued

```
Thr Leu Ser Leu Thr Cys Thr Val Ser Gly Gly Ser Ile Lys Ser Gly
             20                  25                  30
Ser Tyr Tyr Trp Gly Trp Ile Arg Gln Pro Pro Gly Lys Gly Leu Glu
         35                  40                  45
Trp Ile Gly Asn Ile Tyr Tyr Ser Gly Ser Thr Tyr Tyr Asn Pro Ser
     50                  55                  60
Leu Arg Ser Arg Val Thr Ile Ser Val Asp Thr Ser Lys Asn Gln Phe
65                  70                  75                  80
Ser Leu Lys Leu Ser Ser Val Thr Ala Ala Asp Thr Ala Val Tyr Tyr
                 85                  90                  95
Cys Ala Arg Glu Gly Ser Tyr Pro Asn Gln Phe Asp Pro Trp Gly Gln
            100                 105                 110
Gly Thr Leu Val Thr Val Ser Ser Ala Ser Thr Lys Gly Pro Ser Val
        115                 120                 125
Phe Pro Leu Ala Pro Ser Ser Lys Ser Thr Ser Gly Gly Thr Ala Ala
    130                 135                 140
Leu Gly Cys Leu Val Lys Asp Tyr Phe Pro Glu Pro Val Thr Val Ser
145                 150                 155                 160
Trp Asn Ser Gly Ala Leu Thr Ser Gly Val His Thr Phe Pro Ala Val
                165                 170                 175
Leu Gln Ser Ser Gly Leu Tyr Ser Leu Ser Ser Val Val Thr Val Pro
            180                 185                 190
Ser Ser Ser Leu Gly Thr Gln Thr Tyr Ile Cys Asn Val Asn His Lys
        195                 200                 205
Pro Ser Asn Thr Lys Val Asp Lys Lys Val Glu Pro Lys Ser Cys Asp
    210                 215                 220
Lys Thr His Thr Cys Pro Pro Cys Pro Ala Pro Glu Leu Leu Gly Gly
225                 230                 235                 240
Pro Ser Val Phe Leu Phe Pro Pro Lys Pro Lys Asp Thr Leu Met Ile
                245                 250                 255
Ser Arg Thr Pro Glu Val Thr Cys Val Val Val Asp Val Ser His Glu
            260                 265                 270
Asp Pro Glu Val Lys Phe Asn Trp Tyr Val Asp Gly Val Glu Val His
        275                 280                 285
Asn Ala Lys Thr Lys Pro Arg Glu Glu Gln Tyr Asn Ser Thr Tyr Arg
    290                 295                 300
Val Val Ser Val Leu Thr Val Leu His Gln Asp Trp Leu Asn Gly Lys
305                 310                 315                 320
Glu Tyr Lys Cys Lys Val Ser Asn Lys Ala Leu Pro Ala Pro Ile Glu
                325                 330                 335
Lys Thr Ile Ser Lys Ala Lys Gly Gln Pro Arg Glu Pro Gln Val Tyr
            340                 345                 350
Thr Leu Pro Pro Ser Arg Asp Glu Leu Thr Lys Asn Gln Val Ser Leu
        355                 360                 365
Thr Cys Leu Val Lys Gly Phe Tyr Pro Ser Asp Ile Ala Val Glu Trp
    370                 375                 380
Glu Ser Asn Gly Gln Pro Glu Asn Asn Tyr Lys Thr Thr Pro Pro Val
385                 390                 395                 400
Leu Asp Ser Asp Gly Ser Phe Phe Leu Tyr Ser Lys Leu Thr Val Asp
                405                 410                 415
Lys Ser Arg Trp Gln Gln Gly Asn Val Phe Ser Cys Ser Val Met His
            420                 425                 430
Glu Ala Leu His Asn His Tyr Thr Gln Lys Ser Leu Ser Leu Ser Pro
```

```
                      435                 440                 445

Gly Lys
    450

<210> SEQ ID NO 22
<211> LENGTH: 214
<212> TYPE: PRT
<213> ORGANISM: Artificial Sequence
<220> FEATURE:
<223> OTHER INFORMATION: Full-Length Light Chain Amino Acid Sequence

<400> SEQUENCE: 22

Glu Ile Val Met Thr Gln Ser Pro Ala Thr Leu Ser Val Ser Pro Gly
1               5                   10                  15

Glu Arg Ala Thr Leu Ser Cys Arg Ala Ser Gln Ser Val Ser Ser Asn
            20                  25                  30

Leu Ala Trp Tyr Gln Gln Lys Pro Gly Gln Ala Pro Arg Leu Leu Ile
        35                  40                  45

Tyr Gly Ala Ser Thr Arg Ala Thr Gly Ile Pro Ala Arg Phe Ser Gly
    50                  55                  60

Ser Gly Ser Gly Thr Glu Phe Thr Leu Thr Ile Ser Ser Leu Gln Ser
65                  70                  75                  80

Glu Asp Phe Ala Val Tyr Tyr Cys Gln Gln Tyr His Ser Phe Pro Phe
                85                  90                  95

Thr Phe Gly Gly Gly Thr Lys Val Glu Ile Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
    130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210

<210> SEQ ID NO 23
<211> LENGTH: 107
<212> TYPE: PRT
<213> ORGANISM: Artificial Sequence
<220> FEATURE:
<223> OTHER INFORMATION: constant region of a human kappa light chain

<400> SEQUENCE: 23

Arg Thr Val Ala Ala Pro Ser Val Phe Ile Phe Pro Pro Ser Asp Glu
1               5                   10                  15

Gln Leu Lys Ser Gly Thr Ala Ser Val Val Cys Leu Leu Asn Asn Phe
            20                  25                  30

Tyr Pro Arg Glu Ala Lys Val Gln Trp Lys Val Asp Asn Ala Leu Gln
        35                  40                  45

Ser Gly Asn Ser Gln Glu Ser Val Thr Glu Gln Asp Ser Lys Asp Ser
    50                  55                  60
```

Thr Tyr Ser Leu Ser Ser Thr Leu Thr Leu Ser Lys Ala Asp Tyr Glu
65                  70                  75                  80

Lys His Lys Val Tyr Ala Cys Glu Val Thr His Gln Gly Leu Ser Ser
                85                  90                  95

Pro Val Thr Lys Ser Phe Asn Arg Gly Glu Cys
            100                 105

<210> SEQ ID NO 24
<211> LENGTH: 321
<212> TYPE: DNA
<213> ORGANISM: Artificial Sequence
<220> FEATURE:
<223> OTHER INFORMATION: constant region of a human kappa light chain
      nucleotide sequence

<400> SEQUENCE: 24
cggaccgtgg ctgcaccatc tgtcttcatc ttcccgccat ctgatgagca gttgaaatct    60
ggaactgcct ctgttgtgtg cctgctgaat aacttctatc ccagagaggc caaagtacag   120
tggaaggtgg ataacgccct ccaatcgggt aactcccagg agagtgtcac agagcaggac   180
agcaaggaca gcacctacag cctcagcagc accctgacgc tgagcaaagc agactacgag   240
aaacacaaag tctacgcctg cgaagtcacc catcagggcc tgagctcgcc cgtcacaaag   300
agcttcaaca ggggagagtg t                                             321

<210> SEQ ID NO 25
<211> LENGTH: 330
<212> TYPE: PRT
<213> ORGANISM: Artificial Sequence
<220> FEATURE:
<223> OTHER INFORMATION: constant region of a human IgG1 heavy chain

<400> SEQUENCE: 25

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
                20                  25                  30

Phe Pro Glu Pro Val Thr Val Ser Trp Asn Ser Gly Ala Leu Thr Ser
            35                  40                  45

Gly Val His Thr Phe Pro Ala Val Leu Gln Ser Ser Gly Leu Tyr Ser
        50                  55                  60

Leu Ser Ser Val Val Thr Val Pro Ser Ser Ser Leu Gly Thr Gln Thr
65                  70                  75                  80

Tyr Ile Cys Asn Val Asn His Lys Pro Ser Asn Thr Lys Val Asp Lys
                85                  90                  95

Lys Val Glu Pro Lys Ser Cys Asp Lys Thr His Thr Cys Pro Pro Cys
            100                 105                 110

Pro Ala Pro Glu Leu Leu Gly Gly Pro Ser Val Phe Leu Phe Pro Pro
        115                 120                 125

Lys Pro Lys Asp Thr Leu Met Ile Ser Arg Thr Pro Glu Val Thr Cys
130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
            180                 185                 190

His Gln Asp Trp Leu Asn Gly Lys Glu Tyr Lys Cys Lys Val Ser Asn 195                 200                 205
Lys Ala Leu Pro Ala Pro Ile Glu Lys Thr Ile Ser Lys Ala Lys Gly
    210                 215                 220

Gln Pro Arg Glu Pro Gln Val Tyr Thr Leu Pro Pro Ser Arg Asp Glu
225                 230                 235                 240

Leu Thr Lys Asn Gln Val Ser Leu Thr Cys Leu Val Lys Gly Phe Tyr
                245                 250                 255

Pro Ser Asp Ile Ala Val Glu Trp Glu Ser Asn Gly Gln Pro Glu Asn
            260                 265                 270

Asn Tyr Lys Thr Thr Pro Pro Val Leu Asp Ser Asp Gly Ser Phe Phe
        275                 280                 285

Leu Tyr Ser Lys Leu Thr Val Asp Lys Ser Arg Trp Gln Gln Gly Asn
    290                 295                 300

Val Phe Ser Cys Ser Val Met His Glu Ala Leu His Asn His Tyr Thr
305                 310                 315                 320

Gln Lys Ser Leu Ser Leu Ser Pro Gly Lys
                325                 330

<210> SEQ ID NO 26
<211> LENGTH: 990
<212> TYPE: DNA
<213> ORGANISM: Artificial Sequence
<220> FEATURE:
<223> OTHER INFORMATION: constant region of a human IgG1 heavy chain
      nucleotide sequence

<400> SEQUENCE: 26
gcctccacca agggcccatc ggtcttcccc ctggcaccct cctccaagag cacctctggg      60
ggcacagcgg ccctgggctg cctggtcaag gactacttcc ccgaaccggt gacggtgtcg     120
tggaactcag gcgccctgac cagcggcgtg cacaccttcc cggctgtcct acagtcctca     180
ggactctact ccctcagcag cgtggtgacc gtgccctcca gcagcttggg cacccagacc     240
tacatctgca acgtgaatca caagcccagc aacaccaagg tggacaagaa agttgagccc     300
aaatcttgtg acaaaactca cacatgccca ccgtgcccag cacctgaact cctggggggga    360 ccgtcagtct tcctcttccc cccaaaaccc aaggacaccc tcatgatctc ccggacccct     420
gaggtcacat gcgtggtggt ggacgtgagc cacgaagacc ctgaggtcaa gttcaactgg     480
tacgtggacg gcgtggaggt gcataatgcc aagacaaagc cgcgggagga gcagtacaac     540
agcacgtacc gggtggtcag cgtcctcacc gtcctgcacc aggactggct gaatggcaag     600
gagtacaagt gcaaggtctc caacaaagcc ctcccagccc ccatcgagaa aaccatctcc     660
aaagccaaag ggcagccccg agaaccacag gtgtacaccc tgcccccatc ccgggatgag     720
ctgaccaaga accaggtcag cctgacctgc ctggtcaaag gcttctatcc cagcgacatc     780
gccgtggagt gggagagcaa tgggcagccg gagaacaact acaagaccac gcctcccgtg     840
ctggactccg acggctcctt cttcctctac agcaagctca ccgtggacaa gagcaggtgg     900 cagcaggga acgtcttctc atgctccgtg atgcatgagg ctctgcacaa ccactacacg     960
cagaagagcc tctccctgtc tccgggtaaa                                      990

<210> SEQ ID NO 27
<211> LENGTH: 360
<212> TYPE: DNA
<213> ORGANISM: Artificial Sequence
<220> FEATURE:
<223> OTHER INFORMATION: Heavy Chain Variable Region-Encoding
      Polynucleotide Sequence 20502

-continued

```
<400> SEQUENCE: 27
cagctgcagc tgcaggagtc gggcccagga ctggtgaagc cttcggagac cctgtccctc      60
acctgcactg tctctggtgg ctccatcaaa agtggtagtt actactgggg ctggatccgc     120
cagcccccag ggaaggggct ggagtggatt gggaacatct attatagtgg gagcacctac     180
tacaacccgt ccctcagaag tcgagtcacc atatccgtag acacgtccaa gaaccagttc     240
tccctgaagc tgagttctgt gaccgccgca gacacggcgg tgtactactg cgccagagaa     300
ggatcttacc ccaatcagtt tgatccatgg ggacaggta cattggtcac cgtctcctca      360

<210> SEQ ID NO 28
<211> LENGTH: 321
<212> TYPE: DNA
<213> ORGANISM: Artificial Sequence
<220> FEATURE:
<223> OTHER INFORMATION: Light Chain Variable Region-Encoding
      Polynucleotide Sequence 20502

<400> SEQUENCE: 28
gaaatagtga tgacgcagtc tccagccacc ctgtctgtgt ctccagggga aagagccacc      60
ctctcctgca gggccagtca gagtgttagc agcaacttag cctggtacca gcagaaacct     120
ggccaggctc ccaggctcct catctatggt gcatccacca gggccactgg tatcccagcc     180
aggttcagtg gcagtgggtc tgggacagag ttcactctca ccatcagcag cctgcagtct     240
gaagattttg cagtttatta ctgtcagcag taccactcct tcctttcac ttttggcgga      300 gggaccaagg ttgagatcaa a                                               321
```